(12) United States Patent
Goldfine et al.

(10) Patent No.: US 12,491,231 B2
(45) Date of Patent: Dec. 9, 2025

(54) METHODS OF TREATING METABOLIC DISORDERS WITH FGF21 VARIANTS

(71) Applicant: NOVARTIS AG, Basel (CH)

(72) Inventors: Allison Goldfine, Wayland, MA (US); Byungdoo Alexander Yi, Cambridge, MA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 18/359,559

(22) Filed: Jul. 26, 2023

(65) Prior Publication Data

US 2024/0115661 A1    Apr. 11, 2024

Related U.S. Application Data

(63) Continuation of application No. 16/955,023, filed as application No. PCT/IB2018/060538 on Dec. 21, 2018, now abandoned.

(60) Provisional application No. 62/609,489, filed on Dec. 22, 2017.

(51) Int. Cl.
| | | |
|---|---|---|
| A61K 38/00 | (2006.01) |
| A61K 38/18 | (2006.01) |
| A61K 45/06 | (2006.01) |
| A61P 3/00 | (2006.01) |
| A61P 3/06 | (2006.01) |

(52) U.S. Cl.
CPC .......... *A61K 38/1825* (2013.01); *A61K 45/06* (2013.01); *A61P 3/00* (2018.01); *A61P 3/06* (2018.01)

(58) Field of Classification Search
None
See application file for complete search history.

(56) References Cited

U.S. PATENT DOCUMENTS

| | | | |
|---|---|---|---|
| 6,716,626 B1 | 4/2004 | Itoh et al. | |
| 7,576,190 B2 | 8/2009 | Glaesner et al. | |
| 8,188,040 B2 | 5/2012 | Belouski et al. | |
| 9,006,400 B2 | 4/2015 | Boettcher et al. | |
| 9,023,791 B2 | 5/2015 | Boettcher et al. | |
| 9,266,935 B2 | 2/2016 | Boettcher et al. | |
| 10,076,554 B2 * | 9/2018 | Boettcher | A61P 3/00 |
| 10,669,323 B2 * | 6/2020 | Boettcher | C07K 14/50 |
| 11,129,874 B2 | 9/2021 | Boettcher et al. | |
| 2007/0237768 A1 | 10/2007 | Glaesner et al. | |
| 2010/0285131 A1 | 11/2010 | Belouski et al. | |
| 2012/0052069 A1 | 3/2012 | Belouski et al. | |
| 2012/0129766 A1 | 5/2012 | Boettcher et al. | |
| 2013/0079500 A1 | 3/2013 | Boettcher et al. | |
| 2013/0085098 A1 | 4/2013 | Dickinson et al. | |
| 2013/0129724 A1 | 5/2013 | Boettcher et al. | |
| 2013/0129725 A1 | 5/2013 | Fachin et al. | |
| 2014/0142023 A1 | 5/2014 | Sommerfeld et al. | |
| 2016/0051628 A1 | 2/2016 | Boettcher et al. | |
| 2016/0193297 A1 * | 7/2016 | Boeltcher | A61P 43/00 424/134.1 |
| 2017/0065678 A1 | 3/2017 | Diener et al. | |
| 2017/0166621 A1 * | 6/2017 | Boettcher | A61P 3/00 |
| 2020/0101137 A1 | 4/2020 | Diener et al. | |
| 2021/0386824 A1 | 12/2021 | Boettcher et al. | |

FOREIGN PATENT DOCUMENTS

| | | |
|---|---|---|
| CN | 106432510 A | 2/2017 |
| EP | 312592 B1 | 10/1991 |
| EP | 2392927 A1 | 12/2011 |
| EP | 3321276 A2 | 5/2018 |
| EP | 2760475 B1 | 7/2018 |
| JP | 2014-534172 A | 12/2014 |
| JP | 2017-519024 A | 7/2017 |
| RU | 2525393 C2 | 8/2014 |
| RU | 2593960 C2 | 8/2016 |
| TW | 201326213 A1 | 7/2013 |
| WO | WO-2001/018172 A2 | 3/2001 |
| WO | WO-2003/011213 A2 | 2/2003 |
| WO | WO-2004/003179 A1 | 1/2004 |
| WO | WO-2004/110472 A2 | 12/2004 |
| WO | WO-2005/000892 A2 | 1/2005 |
| WO | WO-2005/046682 A1 | 5/2005 |
| WO | WO-2005/061712 A1 | 7/2005 |
| WO | WO-2005/074916 A1 | 8/2005 |
| WO | WO-2005/113606 A2 | 12/2005 |
| WO | WO-2006/050247 A2 | 5/2006 |
| WO | WO-2006/078463 A2 | 7/2006 |
| WO | WO-2008/121563 A2 | 10/2008 |
| WO | WO-2009/020802 A2 | 2/2009 |
| WO | WO-2009/117622 A2 | 9/2009 |
| WO | WO-2009/149171 A2 | 12/2009 |
| WO | WO-2010/042747 A2 | 4/2010 |
| WO | WO-2010/084169 A2 | 7/2010 |

(Continued)

OTHER PUBLICATIONS

Kharitonenkov et al., "FGF-21 as a novel metabolic regulator," The Journal of Clinical Investigation 115(6):1627-1635 (2005).

Rader et al., "LLF580, an FGF21 Analog, Reduces Triglycerides and Hepatic Fat in Obese Adults With Modest Hypertriglyceridemia," J Clin Endocrinol Metab. 107(1):e57-e70 (2021) (14 pages).

Singhania et al., "Lipodystrophy in HIV patients: its challenges and management approaches," HIV/AIDS—Research and Palliative Care 3:135-143 (2011).

(Continued)

*Primary Examiner* — Li N Komatsu
*Assistant Examiner* — Mercy H Sabila
(74) *Attorney, Agent, or Firm* — Morgan, Lewis & Bockius LLP

(57) ABSTRACT

Provided herein are methods of treating, preventing, and managing metabolic or cardiovascular disorders and methods of reducing cardiovascular risk with FGF21 protein variants, including Fc-FGF21 variant fusion proteins.

13 Claims, No Drawings

Specification includes a Sequence Listing.

(56) References Cited

FOREIGN PATENT DOCUMENTS

| WO | WO-2010/129503 A1 | 11/2010 | |
|---|---|---|---|
| WO | WO-2010/129600 A2 | 11/2010 | |
| WO | WO-2011/047267 A1 | 4/2011 | |
| WO | WO-2011/071783 A1 | 6/2011 | |
| WO | WO-2011/089170 A2 | 7/2011 | |
| WO | WO-2011/089203 A1 | 7/2011 | |
| WO | WO-2011/130417 A2 | 10/2011 | |
| WO | WO-2011/154349 A2 | 12/2011 | |
| WO | WO-2012/010553 A1 | 1/2012 | |
| WO | WO-2012/040518 A2 | 3/2012 | |
| WO | WO-2012/059873 A2 | 5/2012 | |
| WO | WO-2012/066075 A1 | 5/2012 | |
| WO | WO-2012/170438 A2 | 12/2012 | |
| WO | WO-2012/177481 A2 | 12/2012 | |
| WO | WO-2013/006486 A2 | 1/2013 | |
| WO | WO-2013/010780 A1 | 1/2013 | |
| WO | WO-2013/033452 A2 | 3/2013 | |
| WO | WO-2013/049234 A2 | 4/2013 | |
| WO | WO-2013/049247 A1 | 4/2013 | |
| WO | WO-2013/052311 A1 | 4/2013 | |
| WO | WO-2013/188181 A1 | 12/2013 | |
| WO | WO-2014/031420 A1 | 2/2014 | |
| WO | WO-2014/037373 A1 | 3/2014 | |
| WO | WO-2014/085365 A2 | 6/2014 | |
| WO | WO-2014/105939 A1 | 7/2014 | |
| WO | WO-2014/149699 A1 | 9/2014 | |
| WO | WO-2015/148708 A1 | 10/2015 | |
| WO | WO-2015/183890 A2 | 12/2015 | |
| WO | WO-2015/195509 A2 | 12/2015 | |
| WO | WO-2015/200078 A1 | 12/2015 | |
| WO | WO-2016/048999 A2 | 3/2016 | |
| WO | WO-2016065326 A2 * | 4/2016 | ............ A61K 38/00 |
| WO | WO-2017/074117 A1 | 5/2017 | |

OTHER PUBLICATIONS

Seckeler et al., "The worldwide epidemiology of acute rheumatic fever and rheumatic heart disease," Clin Epidemiol. 3:67-84 (Feb. 2011).

Armstrong, "Bristol Myers becomes latest victim of unforgiving NASH as midstage asset shelved," Fierce Biotech, <https://www.fiercebiotech.com/biotech/bristol-myers-becomes-latest-victim-unforgiving-nash-as-mid-stage-asset-shelved#:~:text=Bristol%20Myers%20becomes%20latest%20victim%20of%20unforgiving%20NASH%20as%20midstage%20asset%20shelved,-By%20Annalee%20Armstrong&text=Nonalcoholic%20fatty%20liver%20disease%20research,of%20the%20midstage%20asset%20pegbelfermin.> published Nov. 18, 2021, retrieved Feb. 6, 2022 (3 pages).

Charles et al., "Pegbelfermin (BMS-986036), PEGylated FGF21, in Patients with Obesity and Type 2 Diabetes: Results from a Randomized Phase 2 Study," Obesity. 27(1):41-49 (Jan. 2019).

Clinical Trials: "Safety Study of LLF580 in Obese Volunteers," <https://clinicaltrials.gov/ct2/show/NCT03466203>, dated Oct. 12, 2021, retrieved on Nov. 9, 2022 (7 pages).

Dong et al., "Pharmacokinetics and pharmacodynamics of PF-05231023, a novel long-acting FGF21 mimetic, in a first-in-human study," Br J Clin Pharmacol. 80(5):1051-63 (Nov. 2015).

Gaich et al., "The effects of LY2405319, an FGF21 analog, in obese human subjects with type 2 diabetes," Cell Metab. 18(3):333-40 (Sep. 3, 2013).

Kaufman et al., "AKR-001, an Fc-FGF21 Analog, Showed Sustained Pharmacodynamic Effects on Insulin Sensitivity and Lipid Metabolism in Type 2 Diabetes Patients," Cell Rep Med. 1(4):100057 (Jul. 21, 2020) (19 pages).

Kim et al., "Once-weekly administration of a long-acting fibroblast growth factor 21 analogue modulates lipids, bone turnover markers, blood pressure and body weight differently in obese hypertriglyceridemic subjects and in non-human primates," Diabetes Obes Metab. 19(12):1762-1772 (Dec. 2017) (33 pages).

Sanyal et al., "Pegbelfermin (BMS-986036), a PEGylated fibroblast growth factor 21 analogue, in patients with non-alcoholic steatohepatitis: a randomised, double-blind, placebo-controlled, phase 2a trial," Lancet. 392(10165):2705-2717 (Dec. 22, 2019) (13 pages).

Talukdar et al., "A Long-Acting FGF21 Molecule, PF-05231023, Decreases Body Weight and Improves Lipid Profile in Non-human Primates and Type 2 Diabetic Subjects," Cell Metab. 23(3):427-40 (Mar. 8, 2016) (15 pages).

Verzijl et al., "Pegbelfermin (BMS-986036): an investigational PEGylated fibroblast growth factor 21 analogue for the treatment of nonalcoholic steatohepatitis," Expert Opin Investig Drugs. 29(2):125-133 (Feb. 2020) (10 pages).

Kharitonenkov et al., "The metabolic state of diabetic monkeys is regulated by fibroblast growth factor-21," Endocrinology. 148(2):774-81 (2007).

Office Action and Search Report for Russian Patent Application No. 2020123964/10(041376) mailed Aug. 3, 2022 (19 pages).

Harald Staiger et al: "Fibroblast Growth Factor 21-Metabolic Role in Mice and Men", Endocrine Reviews, vol. 38, No. 5, Jul. 28, 2017 (Jul. 28, 2017), pp. 468-488, XP055575030, US, ISSN: 0163-769X, DOI: 10.1210/er.2017-00016.

Murielle M. Veniant et al: "Long-Acting FGF21 Has Enhanced Efficacy in Diet-Induced Obese Mice and in Obese Rhesus Monkeys", Endocrinology, vol. 153, No. 9, Sep. 1, 2012 (Sep. 1, 2012), pp. 4192-4203, XP055268892, US, ISSN: 0013-7227, DOI: 10.1210/en.2012-1211.

Brown, T., et al., "Section 4.5 Concentrations of Solutions," in: Chemistry The Central Science (New Jersey, Pearson Education, 2003) 9th Ed., pp. 134-136, ISBN: 0-13-066997-0.

Creighton, Thomas, "1.5 Determination of the Sizes of Proteins," in: Proteins Structures and Molecular Properties (New York, W. H. Freeman and Company, 1993) 2nd Ed., pp. 23-24, ISBN: 0-7167-7030-X.

Harrison, et al., "Safety and efficacy of once-weekly efruxifermin versus placebo in non-alcoholic steatohepatitis (Harmony): a multicentre, randomised, double-blind, placebo-controlled, phase 2b trial," (2023) Lancet Gastroenterol. Hepatol., vol. 8, No. 12, pp. 1080-1093.

Harrison, et al., "Efruxifermin in non-alcoholic steatohepatitis: a randomized, double-blind, placebo-controlled, phase 2a trial," Nature Medicine, vol. 27, pp. 1262-1271, 2021.

Heckt, et at., "Rationale-Based Engineering of a Potent Long-Acting FGF21 Analog for the Treatment of Type 2 Diabetes," PLOS One (2012) vol. 7, No. 11, e49345 (14 pages).

International Nonproprietary Name (INN), "Efimosfermin alpha," WHO Drug Information, vol. 38, No. 3, (2024).

International Nonproprietary Name (INN), "Efruxifermin," WHO Drug Information, vol. 35, No. 3, (2021).

International Nonproprietary Name (INN), "Pegozafermin," WHO Drug Information, vol. 37, No. 1, (2023).

Loomba, et al., "Expert Panel Review to Compare FDA and EMA Guidelines on Drug Development and Endpoints in Nonalcoholic Steatohepatitis," Gastroenterology (2022) vol. 162, No. 3, pp. 680-688.

Loomba, R, et al., "Randomized, Controlled Trial of the FGF21 Analogue Pegozafermin in Nash," N Engl J Med. (2023) vol. 389, No. 11, pp. 998-1008.

Mathaes, et al., "Subcutaneous Injection Volume of Biopharmaceuticals—Pushing the Boundaries," J. Pharm. Sci. (2016) vol. 105, No. 8: pp. 2255-2259.

Noureddin, et al., "Once-monthly Efimosfermin Alpha (BOS-580) in Metabolic Dysfunction-associated Steatohepatitis with FL/F3 Fibrosis: Results from a 24 Week, Randomized, Double-Blind, Placebo-controlled, Phase 2 Trial," (2024) American Association for the Study of Liber Diseases (AASLD), San Diego, CA (17 pages).

Weng, et al., "Glyco-engineered Long Acting FGF21 Variant with Optimal Pharmaceutical and Pharmacokinetic Properties to Enable Weekly to Twice Monthly Subcutaneous Dosing," Sci. Rep. (2018) vol. 8: 4241 (15 pages).

* cited by examiner

SEQUENCE LISTING

```
Sequence total quantity: 14
SEQ ID NO: 1            moltype = AA  length = 209
FEATURE                 Location/Qualifiers
source                  1..209
                        mol_type = protein
                        organism = Homo sapiens
SEQUENCE: 1
MDSDETGFEH SGLWVSVLAG LLLGACQAHP IPDSSPLLQF GGQVRQRYLY TDDAQQTEAH    60
LEIREDGTVG GAADQSPESL LQLKALKPGV IQILGVKTSR FLCQRPDGAL YGSLHFDPEA  120
CSFRELLLED GYNVYQSEAH GLPLHLPGNK SPHRDPAPRG PARFLPLPGL PPALPEPPGI  180
LAPQPPDVGS SDPLSMVGPS QGRSPSYAS                                    209

SEQ ID NO: 2            moltype = DNA  length = 940
FEATURE                 Location/Qualifiers
source                  1..940
                        mol_type = other DNA
                        organism = Homo sapiens
SEQUENCE: 2
ctgtcagctg aggatccagc cgaaagagga gccaggcact caggccacct gagtctactc    60
acctggacaa ctggaatctg gcaccaattc taaaccactc agcttctccg agctcacacc   120
ccggagatca cctgaggacc cgagccattg atggactcgg acgagaccgg gttcgagcac   180
tcaggactgt gggtttctgt gctggctggt cttctgctgg gagcctgcca ggcacacccc   240
atccctgact ccagtcctct cctgcaattc gggggccaag tccggcaacg gtacctctac   300
acagatgatg cccagcagac agaagcccac ctggagatca gggaggatgg gacggtgggg   360
ggcgctgctg accagagccc cgaaagtctc ctgcagctga aagccttgaa gccgggagtt   420
attcaaatct tgggagtcaa gacatccagg ttcctgtgcc agcggccaga tggggccctg   480
tatggatcgc tccactttga ccctgaggcc tgcagcttcc gggagctgct tcttgaggac   540
ggatacaatg tttaccagtc cgaagcccac ggcctcccgc tgcacctgcc agggaacaag   600
```

-continued

```
tccccacacc gggaccctgc acccgagga ccagctcgct tcctgccact accaggcctg    660
cccccgcac  tccgagcc   acccggaatc ctggccccc  agccccga   tgtgggctcc   720
tcggaccctc tgagcatggt gggaccttcc cagggccgaa gccccagcta cgcttcctga   780
agccagaggc tgtttactat gacatctcct ctttatttat taggttattt atcttattta   840
ttttttatt  tttcttactt gagataataa agagttccag aggagaaaaa aaaaaaaaaa   900
aaaaaaaaaa aaaaaaaaaa aaaaaaaaaa aaaaaaaaa                           940

SEQ ID NO: 3              moltype = AA  length = 181
FEATURE                   Location/Qualifiers
source                    1..181
                          mol_type = protein
                          organism = Homo sapiens
SEQUENCE: 3
HPIPDSSPLL QFGGQVRQRY LYTDDAQQTE AHLEIREDGT VGGAADQSPE SLLQLKALKP    60
GVIQILGVKT SRFLCQRPDG ALYGSLHFDP EACSFRELLL EDGYNVYQSE AHGLPLHLPG   120
NKSPHRDPAP RGPARFLPLP GLPPALPEPP GILAPQPPDV GSSDPLSMVG PSQGRSPSYA   180
S                                                                   181

SEQ ID NO: 4              moltype = DNA  length = 546
FEATURE                   Location/Qualifiers
source                    1..546
                          mol_type = other DNA
                          organism = Homo sapiens
SEQUENCE: 4
cacccccatcc ctgactccag tcctctcctg caattcgggg ccaagtccg  gcagcggtac    60
ctctacacag atgatgccca gcagacagaa gcccacctgg agatcaggga ggatgggacg   120
gtgggggggcg ctgctgacca gagccccgaa agtctcctgc agctgaaagc cttgaagccg   180
ggagttattc aaatcttggg agtcaagaca tccaggttcc tgtgccagcg gccagatggg   240
gccctgtatg gatcgctcca ctttgaccct gaggcctgca gcttccggga gctgcttctt   300
gaggacggat acaatgttta ccagtccgaa gcccacggcc tcccgctgca cctgccaggg   360
aacaagtccc cacaccggga ccctgcaccc cgaggaccag ctcgcttcct gccactacca   420
ggcctgcccc ccgcactccc ggagccaccc ggaatcctgg ccccccagcc cccgatgtg    480
ggctcctcgg accctctgag catggtggga ccttcccagg gccgaagccc cagctacgct   540
tcctga                                                             546

SEQ ID NO: 5              moltype =   length =
SEQUENCE: 5
000

SEQ ID NO: 6              moltype =   length =
SEQUENCE: 6
000

SEQ ID NO: 7              moltype = AA  length = 406
FEATURE                   Location/Qualifiers
source                    1..406
                          mol_type = protein
                          organism = synthetic construct
SEQUENCE: 7
DKTHTCPPCP APEAAGGPSV FLFPPKPKDT LMISRTPEVT CVVVDVSHED PEVKFNWYVD    60
GVEVHNAKTK PREEQYNSTY RVVSVLTVLH QDWLNGKEYK CKVSNKALPA PIEKTISKAK   120
GQPREPQVYT LPPSREEMTK NQVSLTCLVK GFYPSDIAVE WESNGQPENN YKTTPPVLDS   180
DGSFFLYSKL TVDKSRWQQG NVFSCSVMHE ALHNHYTQKS LSLSPGKGSD SSPLLQFGGQ   240
VRQRYLYTDD AQQTEAHLEI REDGTVGGAA DQSPESLLQL KALKPGVIQI LGVKTSRFLC   300
QRPDGALYGS LHFDPEACSF RELLLEDGYN VYQSEAHGLP LHLPGNKSPH RDPAPRGPAR   360
FLPLPGLPPA LPEPPGILAP QPPDVGSSDP LSMVGPSQGR SPSYAS                   406

SEQ ID NO: 8              moltype = AA  length = 419
FEATURE                   Location/Qualifiers
source                    1..419
                          mol_type = protein
                          organism = synthetic construct
SEQUENCE: 8
DKTHTCPPCP APEAAGGPSV FLFPPKPKDT LMISRTPEVT CVVVDVSHED PEVKFNWYVD    60
GVEVHNAKTK PREEQYNSTY RVVSVLTVLH QDWLNGKEYK CKVSNKALPA PIEKTISKAK   120
GQPREPQVYT LPPSREEMTK NQVSLTCLVK GFYPSDIAVE WESNGQPENN YKTTPPVLDS   180
DGSFFLYSKL TVDKSRWQQG NVFSCSVMHE ALHNHYTQKS LSLSPGKGGG GSGGGGSGGG   240
GSDSSPLLQF GGQVRQRYLY TDDAQQTEAH LEIREDGTVG GAADQSPESL LQLKALKPGV   300
IQILGVKTSR FLCQRPDGAL YGSLHFDPEA CSFRELLLED GYNVYQSEAH GLPLHLPGNK   360
SPHRDPAPRG PARFLPLPGL PPALPEPPGI LAPQPPDVGS SDPLSMVGPS QGRSPSYAS    419

SEQ ID NO: 9              moltype = AA  length = 177
FEATURE                   Location/Qualifiers
source                    1..177
                          mol_type = protein
                          organism = synthetic construct
SEQUENCE: 9
DSSPLLQFGG QVRQRYLYTD DAQETEAHLE IREDGTVGGA AHQSPESLLE LKALKPGVIQ    60
ILGVKTSRFL CQKPDGALYG SLHFDPEACS FRELLLEDGY NVYQSEAHGL PLHLPGNRSP   120
```

```
HCDPAPQGPA RFLPLPGLPP ALPEPPGILA PQPPDVGSSD PLAMVGPSQG RSPSYAS       177

SEQ ID NO: 10           moltype = AA   length = 406
FEATURE                 Location/Qualifiers
source                  1..406
                        mol_type = protein
                        organism = synthetic construct
SEQUENCE: 10
DKTHTCPPCP APEAAGGPSV FLFPPKPKDT LMISRTPEVT CVVVDVSHED PEVKFNWYVD    60
GVEVHNAKTK PREEQYNSTY RVVSVLTVLH QDWLNGKEYK CKVSNKALPA PIEKTISKAK   120
GQPREPQVYT LPPSREEMTK NQVSLTCLVK GFYPSDIAVE WESNGQPENN YKTTPPVLDS   180
DGSFFLYSKL TVDKSRWQQG NVFSCSVMHE ALHNHYTQKS LSLSPGKGSD SSPLLQFGGQ   240
VRQRYLYTDD ACQTEAHLEI REDGTVGGAA DQSPESLLQL KALKPGVIQI LGVKTSRFLC   300
QRPDGTLYGS LHFDPEACSF RELLLEDGYN VYQSEAHGLP LHLPCNRSPH RDPASRGPAR   360
FLPLPGLPPA LPEPPGILAP QPPDVGSSDP LAMVGGSQAR SPSYAS                  406

SEQ ID NO: 11           moltype = AA   length = 406
FEATURE                 Location/Qualifiers
source                  1..406
                        mol_type = protein
                        organism = synthetic construct
SEQUENCE: 11
DKTHTCPPCP APEAAGGPSV FLFPPKPKDT LMISRTPEVT CVVVDVSHED PEVKFNWYVD    60
GVEVHNAKTK PREEQYNSTY RVVSVLTVLH QDWLNGKEYK CKVSNKALPA PIEKTISKAK   120
GQPREPQVYT LPPSREEMTK NQVSLTCLVK GFYPSDIAVE WESNGQPENN YKTTPPVLDS   180
DGSFFLYSKL TVDKSRWQQG NVFSCSVMHE ALHNHYTQKS LSLSPGKGSD SSPLLQFGGQ   240
VRQRYLYTDD ACQTEAHLEI REDGTVGGAA DQSPESLLQL KALKPGVIQI LGVKTSRFLC   300
QKPDGALYGS LHFDPEACSF RELLLEDGYN VYQSEAHGLP LHLPCNRSPH RDPASRGPAR   360
FLPLPGLPPA LPEPPGILAP QPPDVGSSDP LAMVGGSQAR SPSYAS                  406

SEQ ID NO: 12           moltype = AA   length = 419
FEATURE                 Location/Qualifiers
source                  1..419
                        mol_type = protein
                        organism = synthetic construct
SEQUENCE: 12
DKTHTCPPCP APEAAGGPSV FLFPPKPKDT LMISRTPEVT CVVVDVSHED PEVKFNWYVD    60
GVEVHNAKTK PREEQYNSTY RVVSVLTVLH QDWLNGKEYK CKVSNKALPA PIEKTISKAK   120
GQPREPQVYT LPPSREEMTK NQVSLTCLVK GFYPSDIAVE WESNGQPENN YKTTPPVLDS   180
DGSFFLYSKL TVDKSRWQQG NVFSCSVMHE ALHNHYTQKS LSLSPGKGGG GSGGGGSGGG   240
GSDSSPLLQF GGQVRQRYLY TDDACQTEAH LEIREDGTVG GAADQSPESL LQLKALKPGV   300
IQILGVKTSR FLCQKPDGAL YGSLHFDPEA CSFRELLLED GYNVYQSEAH GLPLHLPCNR   360
SPHRDPASRG PARFLPLPGL PPALPEPPGI LAPQPPDVGS SDPLAMVGGS QARSPSYAS    419

SEQ ID NO: 13           moltype = AA   length = 419
FEATURE                 Location/Qualifiers
source                  1..419
                        mol_type = protein
                        organism = synthetic construct
SEQUENCE: 13
DKTHTCPPCP APEAAGGPSV FLFPPKPKDT LMISRTPEVT CVVVDVSHED PEVKFNWYVD    60
GVEVHNAKTK PREEQYNSTY RVVSVLTVLH QDWLNGKEYK CKVSNKALPA PIEKTISKAK   120
GQPREPQVYT LPPSREEMTK NQVSLTCLVK GFYPSDIAVE WESNGQPENN YKTTPPVLDS   180
DGSFFLYSKL TVDKSRWQQG NVFSCSVMHE ALHNHYTQKS LSLSPGKGGG GSGGGGSGGG   240
GSDSSPLLQF GGQVRQRYLY TDDACQTEAH LEIREDGTVG GAADQSPESL LQLKALKPGV   300
IQILGVKTSR FLCQRPDGTL YGSLHFDPEA CSFRELLLED GYNVYQSEAH GLPLHLPCNR   360
SPHRDPASRG PARFLPLPGL PPALPEPPGI LAPQPPDVGS SDPLAMVGGS QARSPSYAS    419

SEQ ID NO: 14           moltype = AA   length = 15
FEATURE                 Location/Qualifiers
source                  1..15
                        mol_type = protein
                        organism = synthetic construct
SEQUENCE: 14
GGGGSGGGGS GGGGS                                                    15
```

METHODS OF TREATING METABOLIC DISORDERS WITH FGF21 VARIANTS

CROSS-REFERENCE TO RELATED APPLICATIONS

This application is a continuation of U.S. patent application Ser. No. 16/955,023, filed Jun. 17, 2020, which is a national stage entry of PCT Application No. PCT/IB2018/060538, filed Dec. 21, 2018, which claims the benefit of and priority to U.S. Provisional Application No. 62/609,489 filed on Dec. 22, 2017, each of which is hereby incorporated by reference in its entirety.

FIELD OF THE INVENTION

The present disclosure relates to methods of treating, preventing, and managing metabolic or cardiovascular disorders and to methods of reducing cardiovascular risk with FGF21 protein variants, including Fc-FGF21 variant fusion proteins.

SEQUENCE LISTING

This instant application contains a Sequence Listing that has been submitted in XML format via EFS-Web and is hereby incorporated by reference in its entirety. Said XML copy, created on Jul. 25, 2023, is named BPH-005C1_Sequence_Listing.xml and is 16,250 bytes in size.

BACKGROUND OF THE INVENTION

Insulin resistance is common and plays a central role in the pathogenesis of multiple diseases. Central adiposity is an important source of inflammatory cytokines and non-esterified fatty acids, which have been demonstrated to have detrimental effects on insulin sensitivity. Metabolic disorders associated with insulin resistance and adiposity manifest in various forms such as diabetes, obesity, dyslipidemia, coronary heart disease, and NAFLD/NASH. Fibroblast growth factor 21 (FGF21) is thought to act on liver and adipose tissue to improve insulin sensitivity, lower triglycerides, and reduce adiposity. Therefore, an FGF21 analog with clinically acceptable dosing regimen is expected to become a frontline therapy for these metabolic disorders.

FGF21 is a member of the fibroblast growth factor family and has multiple metabolic functions. FGF21 is predominantly released from hepatocytes and to a lesser extent from adipose and pancreatic β-cells. In mice, FGF21 has been shown to be a critical regulator of metabolism where expression is induced under conditions of both starvation and obesity. FGF21 induces various beneficial metabolic effects including body weight reduction, improved insulin sensitivity, increased high density lipoprotein-cholesterol (HDL-C), and decreased low density lipoprotein-cholesterol (LDL-C), triglycerides (TG), and hepatic TG content in both nonclinical models and in patients with type 2 diabetes mellitus (T2DM). Furthermore, FGF21 effectively lowers glucose without inducing hypoglycemia in nonclinical animal models of diabetes. In T2DM patients with increased body mass index, four week treatment with an FGF21 protein analog resulted in significant improvements in lipid profiles, indicating the translatability of the metabolic effects observed in animal models to humans (Gaich et al., 2013, Cell Metab. 18(3):333-40; Dong et al., 2015, Br J Clin Pharmacol. doi: 10.1111/bcp.12676). Gaich et al. describes LY2405319, a variant of FGF21, in a randomized, placebo-controlled, double-blind proof-of-concept trial in patients with obesity and type 2 diabetes, where patients received placebo or 3, 10, or 20 mg of LY2405319 daily for 28 days. Dong et al. describes a first-in-human study to evaluate the pharmacokinetics/pharmacodynamics (PK/PD), safety and tolerability of single intravenous (IV) doses of PF-05231023, a long acting fibroblast growth factor 21 (FGF21) analogue, and report that PF-0.5231023 levels peaked immediately post-IV dosing, with mean terminal half-lives of 6.5-7.7 h and 66.5-96.6 h for intact C- and N-termini, respectively.

There remains a need for improved FGF21 therapies with clinically acceptable dosing regimen useful for the treatment of metabolic diseases and for reduction of cardiovascular risk in patients.

SUMMARY OF THE INVENTION

Novel modifications to FGF21 can improve the half-life and/or potency over wild-type FGF21 to provide an FGF21 therapeutic for treating or managing (e.g., alleviating one or more symptoms of a disorder) metabolic or cardiovascular disorders or for reducing cardiovascular risk, with clinically preferred dosing regimens.

In specific aspects, provided herein are FGF21 protein variants (for example, FGF21 protein variants described in Table 1, e.g., such as Fe-fusion proteins) and pharmaceutical compositions comprising such FGF21 protein variants, for use in methods of treating, preventing, and/or managing hypertriglyceridemia and cardiac risk, insulin resistance such as patients with genetic mutations of insulin receptor and lipodystrophy, diabetes, obesity, and nonalcoholic fatty liver disease (NAFLD)/nonalcoholic steatohepatitis (NASH).

V103 is a genetically engineered variant of human FGF21, stabilized via introduction of a novel disulfide bond, and fused at its N-terminus to human IgG1 Fc (see PCT Publication WO 2013/049247, which hereby incorporated by reference in its entirety). This combination of stability and fusion of a human FGF21 mutant to IgG1 Fc results in an approximately 50-100 fold improvement in half-life in cynomolgus monkeys (5 to 8 days) compared with wild-type (WT) human FGF21 (~2 hours).

V103 has replicated published effects of FGF21 in animal models of insulin resistant T2DM including: reductions in body weight, glucose, insulin, serum TGs and liver TG content. V103 also demonstrated a significant reduction in hepatic lipid, fibrosis and inflammation in a mouse model of nonalcoholic steatohepatitis (NASH). Therefore, provided herein are pharmaceutical compositions comprising FGF21 protein variant V103 (SEQ ID NO: 11) for the treatment, prevention, and/or management of metabolic disorders including hypertriglyceridemia and cardiac risk, insulin resistance such as patients with genetic mutations of insulin receptor and lipodystrophy, diabetes, obesity, and nonalcoholic fatty liver disease (NAFLD)/nonalcoholic steatohepatitis (NASH).

In one aspect, provided herein is a human FGF21 protein variant for use in a method of treating, preventing, or managing a metabolic disorder or a cardiovascular disorder in a human subject, wherein the human FGF21 protein variant is provided for administration at a dose in the range of 100 mg to 600 mg. In one aspect, provided herein is a human FGF21 protein variant for use in a method of treating, preventing, or managing a metabolic disorder or a cardiovascular disorder in a human subject, wherein the human FGF21 protein variant is provided for administration at an amount in the range of 100 mg to 600 mg.

In some embodiments of this aspect, the metabolic disorder or cardiovascular disorder is selected from hypercholesterolemia, dyslipidemia, hypertriglyceridemia, nonalcoholic fatty liver disease (NAFLD), nonalcoholic steatohepatitis (NASH), type 2 diabetes, and obesity.

In some embodiments of this aspect, treating, preventing, or managing the metabolic disorder or cardiovascular disorder comprises or is characterized by reducing one or more of the following: body weight, liver fat content, elevated LDL-C, total-C, triglyceride, and Apo B levels in the subject. In certain embodiments thereof, treating, preventing, or managing the metabolic disorder or cardiovascular disorder comprises or is characterized by increasing HDL-C levels in the subject. In some embodiments thereof, treating, preventing, or managing the metabolic disorder or cardiovascular disorder comprises or is characterized by reducing triglyceride levels in the subject by at least about 40% or at least about 50%. In some embodiments thereof, treating, preventing, or managing the metabolic disorder or cardiovascular disorder comprises or is characterized by reducing cardiovascular risk in the subject.

In some embodiments of this aspect, the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1. In certain embodiments thereof, the human FGF21 protein variant comprises the amino acid sequence of SEQ ID NO: 11.

In some embodiments of this aspect, the human FGF21 protein variant is provided for administration at a dose of at least 100 mg, 150 mg, 200 mg, 250 mg, 300 mg, 350 mg, or 400 mg. In some embodiments thereof, the human FGF21 protein variant is provided for administration at a dose of approximately 100 mg, 110 mg, 120 mg, 130 mg, 140 mg, 150 mg, 160 mg, 170 mg, 180 mg, or 190 mg, optionally wherein the human FGF21 protein variant is provided at a dose of approximately 100 mg or 150 mg. In some embodiments thereof, the human FGF21 protein variant is provided for administration at a dose of approximately 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 3.50 mg, optionally wherein the human FGF21 protein variant is provided at a dose of approximately 200 mg, 250 mg, or 300 mg.

In some embodiments of this aspect, the human FGF21 protein variant is provided in a form for subcutaneous administration. In some embodiments, the human FGF21 protein variant is provided for administration once a month or once every 4 weeks, once every 3 weeks, once every 2 weeks, or once every week. In some embodiments thereof, the human FGF21 protein variant is provided in a form for administration once a month or once every 4 weeks, once every 3 weeks, once every 2 weeks, or once every week. In some embodiments thereof, the human FGF21 protein variant is provided in a form to be administered subcutaneously.

In one aspect, provided herein is a human FGF21 protein variant in the manufacture of a medicament for the treatment, prevention, or management of a metabolic disorder or a cardiovascular disorder, wherein the unit dose of the human FGF21 protein variant is in the range of 100 mg to 600 mg. In one aspect, provided herein is a human FGF21 protein variant in the manufacture of a medicament for the treatment, prevention, or management of a metabolic disorder or a cardiovascular disorder, wherein the amount of the human FGF21 protein variant is in the range of 100 mg to 600 mg.

In some embodiments of this aspect, the metabolic disorder or cardiovascular disorder is selected from hypercholesterolemia, dyslipidemia, hypertriglyceridemia, nonalcoholic fatty liver disease (NAFLD), nonalcoholic steatohepatitis (NASH), type 2 diabetes, and obesity.

In some embodiments of this aspect, treating, preventing, or managing the metabolic disorder or cardiovascular disorder comprises or is characterized by reducing one or more of the following: body weight, liver fat content, elevated LDL-C, total-C, triglyceride, and Apo B levels. In some embodiments thereof, treating, preventing, or managing the metabolic disorder or cardiovascular disorder comprises or is characterized by increasing HDL-C levels. In some embodiments thereof, triglyceride levels are reduced by at least about 40% or at least about 50%. In some embodiments thereof, treating, preventing, or managing the metabolic disorder or cardiovascular disorder comprises or is characterized by reducing cardiovascular risk.

In some embodiments of this aspect, the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1. In some embodiments thereof, the human FGF21 protein variant comprises the amino acid sequence of SEQ ID NO: 11.

In some embodiments of this aspect, the human FGF21 protein variant is provided for administration at a dose of at least 100 mg, 150 mg, 200 mg, 250 mg, 300 mg, 350 mg, or 400 mg. In some embodiments, the human FGF21 protein variant is provided for administration at a dose of approximately 100 mg, 150 mg, 200 mg, 250 mg, 300 mg, 350 mg, or 400 mg. In some embodiments, the human FGF21 protein variant is provided for administration at a dose of approximately 100 mg, 110 mg, 120 mg, 130 mg, 140 mg, 150 mg, 160 mg, 170 mg, 180 mg, or 190 mg, optionally wherein the human FGF21 protein variant is provided for administration at a dose of approximately 100 mg or 150 mg. In some embodiments, the human FGF21 protein variant is provided for administration at a dose of approximately 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided for administration at a dose of approximately 200 mg, 250 mg, or 300 mg.

In some embodiments, the human FGF21 protein variant is provided for administration once a month or once every 4 weeks, once every 3 weeks, once every 2 weeks, or once every week. In some embodiments, the human FGF21 protein variant is provided in a form for administration once a month or once every 4 weeks, once every 3 weeks, once every 2 weeks, or once every week. In some embodiments, the human FGF21 protein variant is formulated for subcutaneous administration. In some embodiments, the human FGF21 protein variant is provided in a form to be administered subcutaneously.

In one aspect, provided herein is a method of treating, preventing, or managing a metabolic disorder or a cardiovascular disorder in a human subject, wherein the method comprises administering a human FGF21 protein variant at a dose in the range of 100 mg to 600 mg to the subject. In one aspect, provided herein is a method of treating, preventing, or managing a metabolic disorder or a cardiovascular disorder in a human subject, wherein the method comprises administering a human FGF21 protein variant at an amount in the range of 100 mg to 600 mg to the subject.

In some embodiments, the metabolic disorder or cardiovascular disorder is selected from hypercholesterolemia, dyslipidemia, hypertriglyceridemia, nonalcoholic fatty liver disease (NAFLD), nonalcoholic steatohepatitis (NASH), type 2 diabetes, and obesity.

In some embodiments, treating, preventing, or managing the metabolic disorder or cardiovascular disorder comprises or is characterized by reducing one or more of the following: body weight, liver fat content, elevated LDL-C, total-C, triglyceride, and Apo B levels in the subject. In certain embodiments, treating, preventing, or managing the metabolic disorder or cardiovascular disorder comprises or is characterized by increasing HDL-C levels in the subject. In some embodiments, treating, preventing, or managing the metabolic disorder or cardiovascular disorder comprises or is characterized by reducing triglyceride levels in the subject by at least about 40% or at least about 50%. In some embodiments, treating, preventing, or managing the metabolic disorder or cardiovascular disorder comprises or is characterized by reducing cardiovascular risk in the subject.

In some embodiments, the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1. In certain embodiments, the human FGF21 protein variant comprises the amino acid sequence of SEQ ID NO: 11.

In some embodiments, the method comprises administering the human FGF21 protein variant at a dose of at least 100 mg, 150 mg, 200 mg, 250 mg, 300 mg, 350 mg, or 400 mg to the subject. In some embodiments, the method comprises administering the human FGF21 protein variant at a dose of approximately 100 mg, 110 mg, 120 mg, 130 mg, 140 mg, 150 mg, 160 mg, 170 mg, 180 mg, or 190 mg to the subject. In some embodiments, the method comprises administering the human FGF21 protein variant at a dose of approximately 100 mg or 150 mg to the subject. In some embodiments, the method comprises administering the human FGF21 protein variant at a dose of approximately 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg to the subject. In some embodiments, the method comprises administering the human FGF21 protein variant at a dose of approximately 200 mg, 250 mg, or 300 mg to the subject.

In some embodiments, the human FGF21 protein variant is administered once a month or once every 4 weeks, once every 3 weeks, once every 2 weeks, or once every week. In some embodiments, the human FGF21 protein variant is administered once a month or once every 4 weeks, once every 3 weeks, once every 2 weeks, or once every week. In some embodiments, the method comprises administering the human FGF21 protein variant in a form suitable for subcutaneous administration. In some embodiments, the method comprises subcutaneously administering the human FGF21 protein variant. In some embodiments, the human FGF21 protein variant is administered subcutaneously.

Each of the foregoing aspects and embodiments, as well as other elements described herein, may be combined in any manner without limitation.

DETAILED DESCRIPTION OF THE INVENTION

Provided herein are methods and pharmaceutical composition for use in treating, preventing, or managing (e.g., alleviating one or more symptoms of a disorder) a metabolic disorder or a cardiovascular disorder, comprising administering to a subject in need thereof a human FGF21 protein variant (for example, an Fc-FGF21 mutant fusion protein such as V103 (SEQ ID NO: 11)) at a dose or an amount in the range of 100 mg to 600 mg. In specific aspects, a human FGF21 protein variant, such as V103 (SEQ ID NO: 11) is administered at a dose in the range of 200 mg to 400 mg. In specific aspects, a human FGF21 protein variant, such as V103 (SEQ ID NO: 11) is administered at a dose of at least 200 mg, at least 300 mg, or at least 400 mg. In specific aspects, a human FGF21 protein variant, for example, an Fc-FGF21 mutant fusion protein such as V103 (SEQ ID NO: 11) is administered at a dose in the range of 100 mg to 600 mg, for example, 250 mg to 350 mg, once every 4 weeks (or once every month), or once every 3 weeks or once every 2 weeks.

In one aspect, non-limiting examples of metabolic disorders or cardiovascular disorders to be treated, prevented or managed, by the methods provided herein include hypertriglyceridemia, diabetes, e.g., type 2 diabetes mellitus, obesity, type 1 diabetes mellitus, pancreatitis, dyslipidemia, nonalcoholic fatty liver disease (NAFLD), nonalcoholic steatohepatitis (NASH), insulin resistance, hyperinsulinemia, glucose intolerance, hyperglycemia, metabolic syndrome, hypertension, cardiovascular disease, acute myocardial infarction, atherosclerosis, peripheral arterial disease, stroke, heart failure, coronary heart disease, kidney disease, diabetic complications, neuropathy, disorders associated with severe inactivating mutations in the insulin receptor, and/or gastroparesis.

Terminology

The term "native" or "wild-type," in reference to FGF21, refers to biologically active, naturally-occurring FGF21, including biologically active, naturally-occurring FGF21 variants. An exemplary human FGF21 wild-type sequence has NCBI reference sequence number NP 061986.1, and can be found in such issued patents as, e.g., U.S. Pat. No. 6,716,626B 1, (SEQ ID NO: 1).

```
Met Asp Ser Asp Glu Thr Gly Phe Glu His Ser Gly Leu Trp Val Ser
 1               5                  10                  15

Val Leu Ala Gly Leu Leu Leu Gly Ala Cys Gln Ala His Pro Ile Pro
            20                  25                  30

Asp Ser Ser Pro Leu Leu Gln Phe Gly Gly Gln Val Arg Gln Arg Tyr
                35                  40                  45

Leu Tyr Thr Asp Asp Ala Gln Gln Thr Glu Ala His Leu Glu Ile Arg
            50                      55                  60
```

-continued

```
Glu Asp Gly Thr Val Gly Ala Ala Asp Gln Ser Pro Glu Ser Leu
 65                  70                  75                  80

Leu Gln Leu Lys Ala Leu Lys Pro Gly Val Ile Gln Ile Leu Gly Val
                 85                  90                  95

Lys Thr Ser Arg Phe Leu Cys Gln Arg Pro Asp Gly Ala Leu Tyr Gly
                100                 105                 110

Ser Leu His Phe Asp Pro Glu Ala Cys Ser Phe Arg Glu Leu Leu Leu
                115                 120                 125

Glu Asp Gly Tyr Asn Val Tyr Gln Ser Glu Ala His Gly Leu Pro Leu
                130                 135                 140

His Leu Pro Gly Asn Lys Ser Pro His Arg Asp Pro Ala Pro Arg Gly
145                 150                 155                 160

Pro Ala Arg Phe Leu Pro Leu Pro Gly Leu Pro Pro Ala Leu Pro Glu
                165                 170                 175

Pro Pro Gly Ile Leu Ala Pro Gln Pro Pro Asp Val Gly Ser Ser Asp
                180                 185                 190

Pro Leu Ser Met Val Gly Pro Ser Gln Gly Arg Ser Pro Ser Tyr Ala
                195                 200                 205

Ser
209
```

The corresponding mRNA sequence coding for the full-length FGF21 polypeptide (NCBI reference sequence number NM 019113.2) is shown below (SEQ ID NO:2):

```
  1 ctgtcagctg aggatccagc cgaaagagga gccaggcact caggccacct gagtctactc 61 acctggacaa ctggaatctg caccaattc taaaccactc agcttctccg agctcacacc 121 ccggagatca cctgaggacc cgagccattg atggactcgg acgagaccgg gttcgagcac 181 tcaggactgt gggtttctgt gctggctggt cttctgctgg agcctgcca ggcacacccc 241 atccctgact ccagtcctct cctgcaattc gggggccaag tccggcagcg gtacctctac 301 acagatgatg cccagcagac agaagcccac ctggagatca gggaggatgg gacggtgggg 361 ggcgctgctg accagagccc cgaaagtctc ctgcagctga aagccttgaa gccgggagtt 421 attcaaatct gggagtcaa gacatccagg ttcctgtgcc agcggccaga tggggccctg 481 tatggatcgc tccactttga ccctgaggcc tgcagcttcc gggagctgct tcttgaggac 541 ggatacaatg tttaccagtc gaagcccac ggcctcccgc tgcacctgcc agggaacaag 601 tccccacacc gggaccctgc accccgagga ccagctcgct tcctgccact accaggcctg 661 ccccccgcac tcccggagcc acccggaatc ctggcccccc agccccccga tgtgggctcc 721 tcggaccctc tgagcatggt gggaccttcc cagggccgaa gccccagcta cgcttcctga 781 agccagaggc tgtttactat gacatctcct ctttatttat taggttattt atcttattta 841 ttttttttatt tttcttactt gagataataa agagttccag aggagaaaaa aaaaaaaaaa 901 aaaaaaaaaa aaaaaaaaaa aaaaaaaaaa aaaaaaaaa
```

The mature FGF21 sequence lacks a leader sequence and may also include other modifications of a polypeptide such as proteolytic processing of the amino terminus (with or without a leader sequence) and/or the carboxyl terminus, cleavage of a smaller polypeptide from a larger precursor, N-linked and/or O-linked glycosylation, and other post-translational modifications understood by those with skill in the art. A representative example of a mature FGF21 sequence has the following sequence (SEQ ID NO:3, which represents amino acid positions 29-209 of full length FGF21 protein sequence (NCBI reference sequence number NP_061986.1)):

```
His Pro Ile Pro Asp Ser Ser Pro Leu Leu Gln Phe Gly Gly Gln Val
                  5                  10                 15

Arg Gln Arg Tyr Leu Tyr Thr Asp Asp Ala Gln Gln Thr Glu Ala His
             20                  25                  30

Leu Glu Ile Arg Glu Asp Gly Thr Val Gly Gly Ala Ala Asp Gln Ser
         35                  40                  45

Pro Glu Ser Leu Leu Gln Leu Lys Ala Leu Lys Pro Gly Val Ile Gln
     50                  55                  60

Ile Leu Gly Val Lys Thr Ser Arg Phe Leu Cys Gln Arg Pro Asp Gly
 65                  70                  75                  80

Ala Leu Tyr Gly Ser Leu His Phe Asp Pro Glu Ala Cys Ser Phe Arg
                 85                  90                  95

Glu Leu Leu Leu Glu Asp Gly Tyr Asn Val Tyr Gln Ser Glu Ala His
                100                 105                 110

Gly Leu Pro Leu His Leu Pro Gly Asn Lys Ser Pro His Arg Asp Pro
            115                 120                 125

Ala Pro Arg Gly Pro Ala Arg Phe Leu Pro Leu Pro Gly Leu Pro Pro
130                 135                 140

Ala Leu Pro Glu Pro Pro Gly Ile Leu Ala Pro Gln Pro Pro Asp Val
145                 150                 155                 160

Gly Ser Ser Asp Pro Leu Ser Met Val Gly Pro Ser Gln Gly Arg Ser
                165                 170                 175

Pro Ser Tyr Ala Ser
             180
```

The terms "FGF21 protein variant," "human FGF21 variant," "FGF21 polypeptide or protein variant," "FGF21 mutant," or any like terms, are defined as comprising human FGF21 in which a naturally occurring (i.e., wild-type) FGF21 amino acid sequence has been modified, e.g., in which at least one amino acid of the wild-type protein has been substituted by another amino acid, and/or removed. Additionally, the variants may include N- and/or C-terminal truncations relative to the wild-type FGF21 protein, or internal amino acid deletions relative to wild-type human FGF21 protein. Generally speaking, a variant possesses some modified property, structural or functional, of the wild-type protein. For example, the variant may have enhanced or improved physical stability in concentrated solutions (e.g., less hydrophobic mediated aggregation), The corresponding cDNA sequence coding for the mature FGF21 polypeptide (SEQ ID NO:3) is shown below (SEQ ID NO:4):

```
  1 caccccatcc ctgactccag tcctctcctg caattcgggg gccaagtccg gcagcggtac 61 ctctacacag atgatgccca gcagacagaa gcccacctgg agatcaggga ggatgggacg 121 gtgggggggcg ctgctgacca gagccccgaa agtctcctgc agctgaaagc cttgaagccg 181 ggagttattc aaatcttggg agtcaagaca tccaggttcc tgtgccagcg gccagatggg 240 gccctgtatg gatcgctcca cttgaccct gaggcctgca gcttccggga gctgcttctt 301 gaggacggat acaatgttta ccagtccgaa gcccacggcc tcccgctgca cctgccaggg 360 aacaagtccc cacaccggga ccctgcaccc cgaggaccag ctcgcttcct gccactacca 421 ggcctgcccc ccgcactccc ggagccaccc ggaatcctgg ccccccagcc cccgatgtg 481 ggctcctcgg accctctgag catggtggga ccttcccagg gccgaagccc cagctacgct 541 tcctga
``` enhanced or improved plasma stability when incubated with blood plasma or enhanced or improved bioactivity while maintaining a favorable bioactivity profile.

Acceptable amino acid substitutions and modifications which constitute differences between the FGF21 polypeptide and protein variants and mutants of the methods provided herein and wild-type FGF21 include, but are not limited to, one or more amino acid substitutions, including substitutions with non-naturally occurring amino acid analogs, and tnmcations. Thus, FGF21 protein variants include, but are not limited to, site-directed FGF21 mutants, truncated FGF21 polypeptides, proteolysis-resistant FGF21 mutants, aggregation-reducing FGF21 mutants, FGF21 combination mutants, FGF21 conjugates (e.g., fatty acid-FGF21 conjugate, PEG-FGF21 conjugate) and FGF21 fusion proteins (e.g., Fc domain fusion protein, human serum albumin fusion protein), as described herein.

The variant may possess increased compatibility with pharmaceutical preservatives (e.g., m-cresol, phenol, benzyl alcohol), thus enabling the preparation of a preserved pharmaceutical formulation that maintains the physiochemical properties and biological activity of the protein during storage. Accordingly, variants with enhanced pharmaceutical stability relative to wild-type FGF21 have improved physical stability in concentrated solutions under both physiological and preserved pharmaceutical formulation conditions, while maintaining biological potency. As a set of non-limiting examples, variants provided herein may be more resistant to proteolysis and enzymatic degradation; may have improved stability; and may be less likely to aggregate, than their wild-type counterparts. As used herein, these terms are not mutually exclusive or limiting, it being entirely possible that a given variant has one or more modified properties of the wild-type protein.

In specific aspects, FGF21 protein variants are biologically active variants of the wild-type FGF21 protein that exhibits one or more bioactivity of wild-type FGF21. Bioactivity of wild-type FGF21 that has been reported previously includes, but is not limited to, the following: (i) FGF21 has been shown to induce insulin-independent glucose uptake; (ii) FGF21 has also been shown to ameliorate hyperglycemia in a range of diabetic rodent models; (iii) transgenic mice over-expressing FGF21 were found to be resistant to diet-induced metabolic abnormalities, and demonstrated decreased body weight and fat mass, and enhancements in insulin sensitivity (Badman, M. K. et al. (2007) Cell Metab 5, 426-37); (iv) administration of FGF21 to diabetic non-human primates caused a decline in fasting plasma glucose, triglycerides, insulin and glucagon levels, and led to significant improvements in lipoprotein profiles including a nearly 80% increase in HDL cholesterol (Kharitonenkov, A. et al., 2007, Endocrinology 148, 774-81); (v) FGF21 as an important endocrine hormone that helps to control adaptation to the fasting state (Badman et al., 2009, Endocrinology 150, 4931; Inagaki et al., 2007, Cell Metabolism 5, 415); and (vi) FGF21 can modulate downstream markers which include, without limitation, glucose or 2-deoxy-glucose uptake, pERK and other phosphorylated or acetylated proteins or NAD levels.

The term "native Fe" refers to molecule or sequence comprising the sequence of a non-antigen-binding fragment resulting from digestion of whole antibody or produced by other means, whether in monomeric or multimeric form, and can contain the hinge region. The original immunoglobulin source of the native Fc is preferably of human origin and can be any of the immunoglobulins, although IgG1 and IgG2 are preferred. Native Fc molecules are made up of monomeric polypeptides that can be linked into dimeric or multimeric forms by covalent (i.e., disulfide bonds) and non-covalent association. The number of intermolecular disulfide bonds between monomeric subunits of native Fc molecules ranges from 1 to 4 depending on class (e.g., IgG, IgA, and IgE) or subclass (e.g., IgG1, IgG2, IgG3, IgA1, and IgGA2). One example of a native Fc is a disulfide-bonded dieter resulting from papain digestion of an IgG (see Ellison et al., 1982, Nucleic Acids Res. 10: 4071-9). The term "native Fe" as used herein is generic to the monomeric, dimeric, and multimeric forms.

The term "Fc variant" refers to a molecule or sequence that is modified from a native Fc but still comprises a binding site for the salvage receptor, FcRn (neonatal Fc receptor). International Publication Nos. WO 97/34631 and WO 96/32478 describe exemplary Fc variants, as well as interaction with the salvage receptor, and are hereby incorporated by reference for this purpose. Thus, the term "Fe variant" can comprise a molecule or sequence that is humanized from a non-human native Fe. Furthermore, a native Fc comprises regions that can be removed because they provide structural features or biological activity that are not required for the fusion molecules of the fusion proteins of the invention. Thus, the term "Fe variant" comprises a molecule or sequence that lacks one or more native Fc sites or residues, or in which one or more Fc sites or residues has be modified, that affect or are involved in: (1) disulfide bond formation, (2) incompatibility with a selected host cell, (3) N-terminal heterogeneity upon expression in a selected host cell, (4) glycosylation, (5) interaction with complement, (6) binding to an Fc receptor other than a salvage receptor, and/or (7) antibody-dependent cellular cytotoxicity (ADCC). Fc variants are described in further detail hereinafter.

The term "Fe domain" encompasses native Fc and Fc variants and sequences as defined above. As with Fc variants and native Fc molecules, the term "Fe domain" includes molecules in monomeric or multimeric form, whether digested from whole antibody or produced by other means. In some embodiments of the present invention, an Fc domain can be fused to FGF21 or a FGF21 mutant (including a truncated form of FGF21 or a FGF21 mutant) via, for example, a covalent bond between the Fc domain and the FGF21 sequence. Such fusion proteins can form multimers via the association of the Fc domains and both these fusion proteins and their multimers are an aspect of the present invention.

The term "modified Fc fragment", as used herein, shall mean an Fc fragment of an antibody comprising a modified sequence. The Fc fragment is a portion of an antibody comprising the CH2, CH3 and part of the hinge region. The modified Fc fragment can be derived from, for example, IgG1, IgG2, IgG3, or IgG4. FcLALA is a modified Fc fragment with a LALA mutation (L234A, L235A), which triggers ADCC with lowered efficiency, and binds and activates human complement weakly. Hessell et al. 2007 Nature 449:101-104. Additional modifications to the Fc fragment are described in, for example, U.S. Pat. No. 7,217,798, which is incorporated by reference for this purpose.

The term "acute myocardial infarction" refers to myocardial necrosis resulting from interruption of the blood supply to a part of the heart, for example, due to acute obstruction of a coronary artery. The resulting ischemia and oxygen shortage, if left untreated for a sufficient period of time, can cause damage or death (infarction) of the heart muscle tissue (myocardium).

The term "atherosclerosis" is a vascular disease characterized by irregularly distributed lipid deposits in the intima of large and medium-sized arteries, causing narrowing of arterial lumens and proceeding eventually to fibrosis and calcification. Lesions are usually focal and progress slowly and intermittently. Limitation of blood flow accounts for most clinical manifestations, which vary with the distribution and severity of lesions.

The term "cardiovascular diseases" are diseases related to the heart or blood vessels.

The term "cardiovascular risk" refers to a combination of factors associated with a higher probability of cardiovascular event (e.g., stroke or heart attack) occurring. Such factors may include, but are not limited to, weight, BMI, cholesterol level, blood pressure, triglyceride levels, diet, exercise routine, age, sex, family history, obesity, diabetes, and/or other metabolic factors. Guidelines for assessing and managing cardiovascular risk have been described. For example, the American College of Cardiology (ACC) and the American Heart Association (AHA) have collaborated with the National Heart, Lung, and Blood Institute (NHLBI) and stakeholder and professional organizations to develop clinical practice guidelines for assessment of cardiovascular risk, lifestyle modifications to reduce cardiovascular risk, management of blood cholesterol in adults, and management of overweight and obesity in adults (Stone et al., 2014, Journal of the American College of Cardiology, 63 (25 Part B) 2889-2934; DOI: 10.1016/j.jace.2013.11.002, which is hereby incorporated by reference for this purpose). The World Health Organization also provides guidelines for assessing cardiovascular risk, for example, individuals with persistent raised blood pressure >160/100 mm Hg, blood cholesterol >8 mmol/l, established ischemic heart disease, or diabetes with renal disease.

The term "coronary heart disease", also called coronary artery disease, is a narrowing of the small blood vessels that supply blood and oxygen to the heart.

The terms "diabetes" and "diabetic" refer to a progressive disease of carbohydrate metabolism involving inadequate production or utilization of insulin, frequently characterized by hyperglycemia and glycosuria. The terms "pre-diabetes" and "pre-diabetic" refer to a state wherein a subject does not have the characteristics, symptoms and the like typically observed in diabetes, but does have characteristics, symptoms and the like that, if left untreated, may progress to diabetes. The presence of these conditions may be determined using, for example, the fasting plasma glucose (FPG) test, the oral glucose tolerance test (OGTT), or hemoglobin A lc (HbAlc) test. For the FPG test and OGTT, both usually require a subject to fast for at least 8 hours prior to initiating the test. In the FPG test, a subject's blood glucose is measured after the conclusion of the fasting; generally, the subject fasts overnight and the blood glucose is measured in the morning before the subject cats. A healthy subject would generally have a FPG concentration between about 90 and about 100 mg/dl, a subject with "pre-diabetes" would generally have a FPG concentration between about 100 and about 125 mg/dl, and a subject with "diabetes" would generally have a FPG level above about 126 mg/dl. In the OGTT, a subject's blood glucose is measured after fasting and again two hours after drinking a glucose-rich beverage. Two hours after consumption of the glucose-rich beverage, a healthy subject generally has a blood glucose concentration below about 140 mg/dl, a pre-diabetic subject generally has a blood glucose concentration about 140 to about 199 mg/dl, and a diabetic subject generally has a blood glucose concentration about 200 mg/dl or above. While the aforementioned glycemic values pertain to human subjects, normoglycemia, moderate hyperglycemia and overt hyperglycemia are scaled differently in murine subjects. A healthy murine subject after a four-hour fast would generally have a FPG concentration between about 100 and about 150 mg/dl, a murine subject with "pre-diabetes" would generally have a FPG concentration between about 17.5 and about 2.50 mg/dl and a murine subject with "diabetes" would generally have a FPG concentration above about 250 mg/dl. For the HbAlc test, HbAlc levels <5.7% are generally considered to be in the normal range, HbAlc levels in the range of 5.7-6.4% are generally considered to be pre-diabetes levels, and HbAlc levels at 6.5% or above are generally considered to be diabetes levels (see, e.g., American Diabetes Association (ADA), Practice Guideline, Diabetes Care, 2018 supplement 1, which is hereby incorporated by reference for this purpose).

The term "dyslipidemia" is a disorder of lipoprotein metabolism, including lipoprotein overproduction or deficiency. Dyslipidemias may be manifested by elevation of the total cholesterol, low-density lipoprotein (LDL) cholesterol and triglyceride concentrations, and a decrease in high-density lipoprotein (HDL) cholesterol concentration in the blood.

The term "glucose intolerance" or "Impaired fasting glucose" (IFG) or "Impaired Glucose Tolerance" (IGT) is a pre-diabetic state of dysglycemia that is associated with increased risk of cardiovascular pathology. The pre-diabetic condition prevents a subject from moving glucose into cells efficiently and utilizing it as an efficient fuel source, leading to elevated glucose levels in blood and some degree of insulin resistance.

The term "heart failure", also called congestive heart failure, is a condition in which the heart can no longer pump enough blood to the rest of the body.

The term "hyperglycemia," also called high blood sugar, refers to a condition characterized by a higher than normal amount of glucose (a type of sugar) in the blood. Hyperglycemia can be diagnosed using methods known in the art, including measurement of fasting blood glucose levels.

The term "hypertension" or high blood pressure refers to a condition that is a transitory or sustained elevation of systemic arterial blood pressure to a level likely to induce cardiovascular damage or other adverse consequences. Hypertension has been arbitrarily defined as a systolic blood pressure (SBP) above 140 mmHg or a diastolic blood pressure (DBP) above 90 mmHg, but can also be defined based on published clinical guidance. For example, the following guidance for blood pressure has been described: normal SBP <120 mmHg or DBP<80 mmHg; Elevated SBP in the range of 120-129 mmHg or DBP<80 mmHg; hypertension (HTN) stage 1 SBP in the range of 130-139 mmHg or DBP 80-89 mmHg; and HTN SBP >140 or DBP >90.

The term "hypertriglyceridemia" refers to high (hyper-) blood levels (-emia) of triglycerides. Elevated levels of triglycerides are associated with atherosclerosis, even in the absence of hypercholesterolemia (high cholesterol levels), and predispose to cardiovascular disease (e.g., contributes to increasing cardiovascular risk). Generally, serum triglyceride levels in the range of 150 to 199 mg per dL [1.70 to 2.25 mmol per L] are considered borderline-high serum triglyceride levels; serum triglyceride levels in the range of 200 to 499 mg per dL [2.26 to 5.64 mmol per L] are considered high serum triglyceride levels; and serum triglyceride levels in the range of 500 mg per dL [5.65 mmol per L] or higher are considered very high triglyceride levels. In certain aspects, these general guidelines may be adjusted based on updated clinical guidelines for clinicians.

The term "hypoglycemia", also called low blood sugar, occurs when your blood glucose level drops too low to provide enough energy for your body's activities.

The term "hyperinsulinemia" is defined as a higher-than-normal level of insulin in the blood.

The term "insulin resistance" is defined as a state in which a normal amount of insulin produces a subnormal biologic response.

The term "kidney disease" or nephropathy is any disease of the kidney. Diabetic nephropathy refers to damage of the kidneys caused by diabetes; in severe cases it can lead to kidney failure a major cause of morbidity and mortality in people with type 1 or type 2 diabetes mellitus.

The term "metabolic syndrome" refers to a cluster of conditions—increased blood pressure, high blood sugar, excess body fat around the waist, and abnormal cholesterol or triglyceride levels—that occur together, increasing risk of heart disease, stroke and diabetes. For example, excess body fat around the waist, in most men, is associated with a 40-inch waist or greater; high blood sugar is associated with a blood sugar/glucose level of at least 110 milligrams per deciliter (mg/dl) after fasting; high triglycerides is associated with levels at least 150 mg/dL in the bloodstream; low HDL is associated with levels less than 40 mg/dl; and increased blood pressure is associated with levels 130/85 mmHg or higher.

The term "myocardial infarction" (MI), also called heart attack, is defined as the irreversible death (necrosis) of heart muscle due to prolonged lack of oxygen supply (ischemia).

The term "NAFLD" or "nonalcoholic fatty liver disease" is defined as a condition in which excess fat is stored in the liver. This buildup of fat is not caused by heavy alcohol use. When heavy alcohol use causes fat to build up in the liver, this condition is called alcoholic liver disease. Typically, there are two types of NAFLD: simple fatty liver and nonalcoholic steatohepatitis (NASH).

The term "NASH" or "nonalcoholic steatohepatitis" is defined as a form of nonalcoholic fatty liver disease (NAFLD) in which a patient has hepatitis—inflammation of the liver—and liver cell damage, in addition to fat in the liver. Inflammation and liver cell damage can cause fibrosis, or scarring, of the liver. In some cases NASH may lead to cirrhosis or liver cancer.

The term "simple fatty liver," also called nonalcoholic fatty liver (NAFL), is a form of NAFLD in which a patient has fat in the liver but little or no inflammation or liver cell damage. Simple fatty liver typically does not progress to cause liver damage or complications.

The term "pancreatitis" is inflammation of the pancreas.

"Obesity" is defined as abnormal or excessive fat accumulation that presents a risk to health. A crude population measure of obesity is the body mass index (BMI=Body weight (kg)/[Height (m)]2), a person's weight (in kilograms) divided by the square of his or her height (in meters). A person with a BMI of 30 or more is generally considered obese. In general, a person with a BMI equal to or more than 25 is considered overweight for example for Caucasians, but this guideline can be adjusted for ethnic differences. For example, with ethnic adjustment, a BMI >27.5 can be considered obese for Asian individuals (WHO Expert Consultation, 2004, Lancet, 363(9403):157-63). Asian individuals may be, for example, subjects of Asian descent or Asian ancestry.

The term "peripheral arterial disease" or "PAD" refers to a condition characterized by a narrowing of the peripheral arteries to the legs, stomach, arms, and head (most commonly in the arteries of the legs). PAD is similar to coronary artery disease (CAD) in that both PAD and CAD are caused by atherosclerosis that narrows and blocks arteries in various critical regions of the body. The narrowing of arteries is typically due to plaque that can, over time, harden and narrow the arteries limiting the flow of oxygen-rich blood to organs and other parts of the body.

The term "stroke" is any acute clinical event, related to impairment of cerebral circulation that lasts longer than 24 hours, while a shorter duration is considered a transient Ischemic Attack (TIA). A stroke involves irreversible brain damage, the type and severity of symptoms depending on the location and extent of brain tissue whose circulation has been compromised.

The term "type 1 diabetes mellitus" or "T1DM" is a condition characterized by high blood glucose levels caused by lack of insulin. This can occur when the body's immune system attacks the insulin-producing beta cells in the pancreas and destroys them. The pancreas then produces little or no insulin.

The term "type 2 diabetes" or "type 2 diabetes mellitus" or "T2D" or "T2DM" refers to is a metabolic disease that causes sugar to collect in the blood stream and is characterized by high blood glucose levels caused by either a lack of insulin or the body's inability to use insulin efficiently. Blood sugar levels are measured in milligrams per deciliter (mg/dL) or mmol/L.

The term "management" or "manage(s)" or "managing" is understood as the management and care of a patient for the purpose of combating a disease, condition or disorder, which does not result in a cure, but alleviation of one or more symptoms of a disease, condition or disorder and/or reduction in hospital stay time.

The term "prevention" or "prevent(s)" or "preventing" refers to prophylactic administration to a healthy subject or to a subject at risk of developing a disease, condition or disorder (e.g., a subject who is considered to be prediabetic) to prevent the development of one or more conditions mentioned herein. Moreover, the term "prevention" can also include prophylactic administration to patients being in a pre-stage of the conditions to be treated.

The term "treatment" or "treat(s)" or "treating" is understood as the management and care of a patient for the purpose of combating a disease, condition or disorder, for example, the reduction or amelioration of the progression, severity, and/or duration of a disease, disorder or condition. In specific aspects, treatment as used herein may include, but are not limited to, one or more of the following in the context of diseases, disorders or conditions which can be treated by administering FGF21 or FGF21 variant proteins provided herein: (i) reduction in triglyceride levels (blood/serum triglyceride levels), for example, reduction to within a manageable range or normal range as determined by a clinician or clinical guidelines; (ii) reduction in body weight, for example, reduction to within a manageable range or normal range as determined by a clinician or clinical guidelines or by at least about 5%, 6%, 7%, 8%, 9%, 10%, 11%, 12%, 13%, 14%, 15%, 20%, 25%, 30%, 35%, 40%, 50%, 55%, 60%, or more; (iii) increase in insulin-independent glucose uptake; (iv) reduction in blood/serum glucose levels (e.g., reduction to within a manageable range or normal range as determined by a clinician or clinical guidelines or by at least about 5%, 10%, 20%, 30%, 40%, 45%, 50%, 55%, 60%, 70%, 80%, 90%, or 95% or more); (v) improvement in lipoprotein profiles; (vi) increase in HDL cholesterol (HDL-C) levels (e.g., increase by at least about 5%, 10%, 20%, 30%, 40%, 50%, 60%, 70%, 80%, 90%, or more); (vii) reduction in LDL cholesterol (LDL-C) and/or total cholesterol (total-C), for example reduction to within a manageable range or normal range as determined by a clinician or clinical guidelines or by at least about 5%, 10%, 20%, 30%, 40%, or 50% or more; (viii) reduction in liver fat content, for example reduction to within a manageable range or normal range as determined by a clinician or clinical guidelines or by at least about 5%, 10%, 20%, 30%, 40%, or 50% or more; and (ix) reduction in complication rates.

The term "therapeutically effective amount" or "effective amount" refers to an amount of a drug or a therapeutic agent that will elicit the desired biological and/or medical response of a tissue, system or an animal (including man) that is being sought by a researcher or clinician. In the context of FGF21 and FGF21 variant proteins provided herein, the desired biological and/or medical response may be one or more of the following: (i) reduction in triglyceride levels (blood/serum triglyceride levels), for example, by at least about 5%, 10%, 20%, 30%, 40%, 45%, 50%, 55%, 60%, 70%, 80%, 90%, or 95% or more; (ii) reduction in body weight, for example, by at least about 5%, 6%, 7%, 8%, 9%, 10%, 11%, 12%, 13%, 14%, 15%, 20%, 25%, 30%, 35%, 40%, 50%, 55%, 60%, or more; (iii) increase in insulin-independent glucose uptake; (iv) reduction in blood/serum glucose levels (e.g., by at least about 5%, 10%, 20%, 30%, 40%, 45%, 50%, 55%, 60%, 70%, 80%, 90%, or 95% or more); (v) improvement in lipoprotein profiles; (vi) increase in HDL cholesterol (HDL-C) levels (e.g., increase by at least about 5%, 10%, 20%, 30%, 40%, 50%, 60%, 70%, 80%, 90%, or more); (vii) reduction in LDL cholesterol (LDL-C) and/or total cholesterol (total-C), for example by at least about 5%, 10%, 20%, 30%, 40%, or 50% or more; and (viii) reduction in liver fat content, for example by at least about 5%, 10%, 20%, 30%, 40%, or 50% or more. In certain embodiments, triglyceride levels may be reduced by at least about 40% or at least about 50%. In certain embodiments, triglyceride levels may be reduced by at least about 40%. In certain embodiments, triglyceride levels may be reduced by at least about 50%. In some embodiments, liver fat content may be reduced by at least about 5%, 10%, 20%, 30%, 40%, or 50% or more. In some embodiments, liver fat content may be reduced by at least about 5%. In some embodiments, liver fat content may be reduced by at least about 10%. In some embodiments, liver fat content may be reduced by at least about 20%. In some embodiments, liver fat content may be reduced by at least about 30%. In some embodiments, liver fat content may be reduced by at least about 40%. In some embodiments, liver fat content may be reduced by at least about 50%. In some embodiments, the liver fat content may be reduced to within a manageable range or normal range as determined by a clinician or clinical guidelines.

As used herein, the singular forms—a," "an" and "the" include plural references unless the content clearly dictates otherwise. Thus, for example, reference to "an antibody" includes a mixture of two or more such antibodies.

As used herein, the term "about" or "approximately" refers to +/−20%, more preferably, +/−10%, or still more preferably, +/−5% of a value.

The terms "polypeptide" and "protein", are used interchangeably and refer to a polymeric form of amino acids of any length, which can include coded and non-coded amino acids, naturally and non-naturally occurring amino acids, chemically or biochemically modified or derivatized amino acids, and polypeptides having modified peptide backbones. The term includes fusion proteins, including, but not limited to, fusion proteins with a heterologous amino acid sequence, fusions with heterologous and homologous leader sequences, with or without N-terminal methionine residues; immunologically tagged proteins; and the like.

The term "fragment" as used herein refers to a physically contiguous portion of the primary structure of a biomolecule. In the case of proteins, a portion is defined by a contiguous portion of the amino acid sequence of that protein and refers to at least 3-5 amino acids, at least 8-10 amino acids, at least 11-15 amino acids, at least 17-24 amino acids, at least 25-30 amino acids, and at least 30-45 amino acids. In the case of oligonucleotides, a portion is defined by a contiguous portion of the nucleic acid sequence of that oligonucleotide and refers to at least 9-15 nucleotides, at least 18-30 nucleotides, at least 33-45 nucleotides, at least 48-72 nucleotides, at least 75-90 nucleotides, and at least 90-130 nucleotides. In some embodiments, portions of biomolecules have a biological activity. In the context of FGF21 polypeptide, FGF21 polypeptide fragments do not comprise the entire FGF21 polypeptide sequence set forth in SEQ ID NO:3.

The terms "individual-, "subject", "host", and "patient" are used interchangeably and refer to any subject for whom diagnosis, treatment, or therapy is desired, particularly humans. Other subjects may include cattle, dogs, cats, guinea pigs, rabbits, rats, mice, horses, and the like. In some preferred embodiments the subject is a human.

As used herein, the term "sample" refers to biological material from a patient. The sample assayed by the present invention is not limited to any particular type. Samples include, as non-limiting examples, single cells, multiple cells, tissues, tumors, biological fluids, biological molecules, or supernatants or extracts of any of the foregoing. Examples include tissue removed for biopsy, tissue removed during resection, blood, urine, lymph tissue, lymph fluid, cerebrospinal fluid, mucous, and stool samples. The sample used will vary based on the assay format, the detection method and the nature of the tumors, tissues, cells or extracts to be assayed. Methods for preparing samples are well known in the art and can be readily adapted in order to obtain a sample that is compatible with the method utilized.

The term "pharmaceutically acceptable carrier" refers to a carrier for administration of a therapeutic agent, such as antibodies or a polypeptide, genes, and other therapeutic agents. The term refers to any pharmaceutical carrier that does not itself induce the production of antibodies harmful to the individual receiving the composition, and which can be administered without undue toxicity. Suitable carriers can be large, slowly metabolized macromolecules such as proteins, polysaccharides, polylactic acids, polyglycolic acids, polymeric amino acids, amino acid copolymers, lipid aggregates, and/or inactive virus particles. Such carriers are well known to those of ordinary skill in the art. Pharmaceutically acceptable carriers in therapeutic compositions can include liquids such as water, saline, glycerol, and/or ethanol. Auxiliary substances, such as wetting or emulsifying agents, pH buffering substances, and the like, can also be present in such vehicles.

Therapeutic Methods

Provided herein are methods and pharmaceutical composition for use in treating, preventing, or managing (e.g., alleviating one or more symptoms of) a metabolic disorder or a cardiovascular disorder, comprising administering to a subject in need thereof a human FGF21 protein variant (for example, an Fc-FGF21 mutant fusion protein such as V103 (SEQ ID NO: 11)) at a dose in the range of 100 mg to 600 mg, for example, once every day, once every 2, 3, 4, 5, or 6 days, once every week, once every 2 weeks, once every 3 weeks, or once every 4 weeks (or once every month). In specific aspects, the human FGF21 protein variant (for example, an Fc-FGF21 mutant fusion protein such as V103 (SEQ ID NO: 11)) is administered at a dose in the range of 200 mg to 400 mg. In specific aspects, the human FGF21 protein variant (for example, an Fc-FGF21 mutant fusion protein such as V103 (SEQ ID NO: 11)) is administered at a dose of approximately 200 mg, 250 mg, 300 mg, 350 mg, or 400 mg, for example, once every week, once every 2 weeks, once every 3 weeks or once every 4 weeks (or once a month). In specific aspects, the human FGF21 protein variant (for example, an Fc-FGF21 mutant fusion protein such as V103 (SEQ ID NO: 11)) is administered once every 4 weeks (or once a month). In certain aspects, the human FGF21 protein variant, such as V103 (SEQ ID NO: 11) is administered once every 3 weeks, once every 2 weeks, or once every week.

In a specific aspect, provided herein is a method of treating, preventing, or managing (e.g., alleviating one or more symptoms of) a metabolic disorder or a cardiovascular disorder (e.g., obesity or hypertriglyceridemia), comprising administering to a subject in need thereof a human FGF21 protein variant (for example, an Fc-FGF21 mutant fusion protein such as V103 (SEQ ID NO: 11)) at a dose in the range of 100 mg to 600 mg once every week or once every two weeks. In a specific aspect, provided herein is a method of treating, preventing, or managing (e.g., alleviating one or more symptoms of) a metabolic disorder or a cardiovascular disorder (e.g., obesity or hypertriglyceridemia), comprising administering to a subject in need thereof a human FGF21 protein variant (for example, an Fc-FGF21 mutant fusion protein such as V103 (SEQ ID NO: 11)) at a dose in the range of 100 mg to 600 mg once every three weeks or once every four weeks (or once a month).

In a specific aspect, provided herein is a method of treating, preventing, or managing (e.g., alleviating one or more symptoms of) a metabolic disorder or a cardiovascular disorder (e.g., obesity or hypertriglyceridemia), comprising administering to a subject in need thereof a human FGF21 protein variant (for example, an Fc-FGF21 mutant fusion protein such as V103 (SEQ ID NO: 11)) at a dose in the range of 200 mg to 400 mg once every week or once every two weeks. In a specific aspect, provided herein is a method of treating, preventing, or managing (e.g., alleviating one or more symptoms of) a metabolic disorder or a cardiovascular disorder (e.g., obesity or hypertriglyceridemia), comprising administering to a subject in need thereof a human FGF21 protein variant (for example, an Fc-FGF21 mutant fusion protein such as V103 (SEQ ID NO: 11)) at a dose in the range of 200 mg to 400 mg once every three weeks or once every four weeks (or once a month).

In a specific aspect, provided herein is a method of treating, preventing, or managing (e.g., alleviating one or more symptoms of) a metabolic disorder or a cardiovascular disorder (e.g., obesity or hypertriglyceridemia), comprising administering to a subject in need thereof a human FGF21 protein variant (for example, an Fc-FGF21 mutant fusion protein such as V103 (SEQ ID NO: 11)), at a dose in the range of 100 mg to 300 mg once every week or once every two weeks. In a specific aspect, provided herein is a method of treating, preventing, or managing (e.g., alleviating one or more symptoms of) a metabolic disorder or a cardiovascular disorder (e.g., obesity or hypertriglyceridemia), comprising administering to a subject in need thereof a human FGF21 protein variant (for example, an Fc-FGF21 mutant fusion protein such as V103 (SEQ ID NO: 11)) at a dose in the range of 100 mg to 300 mg once every three weeks or once every four weeks (or once a month).

In a specific aspect, provided herein is a method of treating, preventing, or managing (e.g., alleviating one or more symptoms of) a metabolic disorder or a cardiovascular disorder (e.g., obesity or hypertriglyceridemia), comprising administering to a subject in need thereof a human FGF21 protein variant (for example, an Fc-FGF21 mutant fusion protein such as V103 (SEQ ID NO: 11)) at a dose of at least about 100 mg, 150 mg, 200 mg, 250 mg, 300 mg, or 350 mg once every week or once every two weeks. In a specific aspect, provided herein is a method of treating, preventing, or managing (e.g., alleviating one or more symptoms of) a metabolic disorder or a cardiovascular disorder (e.g., obesity or hypertriglyceridemia), comprising administering to a subject in need thereof a human FGF21 protein variant (for example, an Fc-FGF21 mutant fusion protein such as V103 (SEQ ID NO: 11)) at a dose of at least about 100 mg, 150 mg, 200 mg, 250 mg, 300 mg, or 350 mg once every three weeks or once every four weeks (or once a month).

In one aspect, non-limiting examples of metabolic disorders or cardiovascular disorders to be treated, prevented or managed, by the methods provided herein include obesity, hypertriglyceridemia, dyslipidemia, nonalcoholic fatty liver disease (NAFLD), nonalcoholic steatohepatitis (NASH), diabetes, e.g., type 2 diabetes mellitus (T2DM) and type 1 diabetes mellitus (T1DM), disorders associated with severe inactivating mutations in the insulin receptor, pancreatitis, insulin resistance, hyperinsulinemia, glucose intolerance, hyperglycemia, metabolic syndrome, hypertension, cardiovascular disease, acute myocardial infarction, atherosclerosis, peripheral arterial disease, stroke, heart failure, coronary heart disease, kidney disease, diabetic complications, neuropathy, and gastroparesis.

In one aspect, non-limiting examples of metabolic disorders or cardiovascular disorders to be treated, prevented or managed, by the methods provided herein include obesity, hypertriglyceridemia and cardiac risk, insulin resistance such as patients with genetic mutations of insulin receptor and lipodystrophy, diabetes (e.g., T1DM or T2DM), and nonalcoholic fatty liver disease (NAFLD)/nonalcoholic steatohepatitis (NASH).

In one aspect, provided herein is a method of treating, preventing, or managing a metabolic disorder (e.g., obesity) or a cardiovascular disorder, comprising administering, e.g., s.c., to a subject in need thereof a human FGF21 protein variant (for example, an Fc fusion protein such as V103 (SEQ ID NO: 11)) at a dose in the range of 100 mg to 600 mg, or more specifically at a dose in the range of 100 mg to 300 mg or 200 mg to 400 mg, for example, once every day, once every 2, 3, 4, 5, or 6 days, once every week, once every 2 weeks, once every 3 weeks, or once every 4 weeks (or once every month). In one aspect, provided herein is a method of treating, preventing, or managing a metabolic disorder (e.g., obesity) or a cardiovascular disorder, comprising administering, e.g., s.c., to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example, once every day, once every 2, 3, 4, 5, or 6 days, once every week, once every 2 weeks, once every 3 weeks, or once every 4 weeks (or once every month). In a particular aspect, provided herein is a method of treating, preventing, or managing a metabolic disorder (e.g., obesity) or a cardiovascular disorder, comprising administering, e.g., s.c., to a subject in need thereof a human FGF21 protein variant (for example, an Fc fusion protein such as V103 (SEQ ID NO: 11)) at a dose of approximately 300 mg, subcutaneously, every 4 weeks (or every month). In a particular aspect, provided herein is a method of treating, preventing, or managing a metabolic disorder (e.g., obesity) or a cardiovascular disorder, comprising administering, e.g., s.c., to a subject in need thereof a human FGF21 protein variant (for example, an Fc fusion protein, such as V103 (SEQ ID NO: 11)) at a dose of approximately 300 mg, subcutaneously, every 3 weeks. In a particular aspect, provided herein is a method of treating, preventing, or managing a metabolic disorder (e.g., obesity) or a cardiovascular disorder, comprising administering, e.g., s.c., to a subject in need thereof a human FGF21 protein variant (for example, an Fc fusion protein, such as V103 (SEQ ID NO: 11)) at a dose of approximately 300 mg, subcutaneously, every 2 weeks. In a specific aspect, provided herein is a method of treating, preventing, or managing a metabolic disorder (e.g., obesity) or a cardiovascular disorder, comprising administering to a subject in need thereof a human FGF21 protein variant (for example, an Fc fusion protein, such as V103 (SEQ ID NO: 11)) at a dose in the range of approximately 200 mg to 250 mg, subcutaneously, every 3 weeks. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m², inclusive (with ethnic adjustment of greater than or equal to 27.5 kg/m² BMI for Asian subjects), and (ii) triglyceride levels in the range of 150 to 500 mg/dL (1.69-5.65 mmol/L), prior to administration of the human FGF21 protein variant.

In particular aspects, provided herein is a method of treating, preventing, or managing (e.g., alleviating one or more symptoms of) hypercholesterolemia, dyslipidemia (e.g., mixed dyslipidemia), or hypertriglyceridemia, comprising administering to a subject in need thereof a human FGF21 protein variant (for example, an Fc fusion protein such as V103 (SEQ ID NO: 11)) at a dose in the range of 100 mg to 600 mg, or more specifically at a dose in the range of 100 mg to 300 mg or 200 mg to 400 mg, for example, once every day, once every 2, 3, 4, 5, or 6 days, once every week, once every 2 weeks, once every 3 weeks, or once every 4 weeks (or once every month). In a specific aspect, provided herein is a method of treating, preventing, or managing (e.g., alleviating one or more symptoms of) hypercholesterolemia, dyslipidemia (e.g., mixed dyslipidemia), or hypertriglyceridemia, comprising administering to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example, once every day, once every 2, 3, 4, 5, or 6 days, once every week, once every 2 weeks, once every 3 weeks, or once every 4 weeks (or once every month). In a certain aspect, provided herein is a method of treating, preventing, or managing (e.g., alleviating one or more symptoms of) hypercholesterolemia, dyslipidemia (e.g., mixed dyslipidemia), or hypertriglyceridemia, comprising administering to a subject in need thereof a human FGF21 protein variant (for example, an Fc fusion protein such as V103 (SEQ ID NO: 11)) at a dose of approximately 300 mg, subcutaneously, once every 4 weeks (or once every month). In a certain aspect, provided herein is a method of treating, preventing, or managing (e.g., alleviating one or more symptoms of) hypercholesterolemia, dyslipidemia (e.g., mixed dyslipidemia), or hypertriglyceridemia, comprising administering to a subject in need thereof a human FGF21 protein variant (for example, an Fc fusion protein such as V103 (SEQ ID NO: 11)) at a dose of approximately 300 mg, subcutaneously, once every 3 weeks. In a certain aspect, provided herein is a method of treating, preventing, or managing (e.g., alleviating one or more symptoms of) hypercholesterolemia, dyslipidemia (e.g., mixed dyslipidemia), or hypertriglyceridemia, comprising administering to a subject in need thereof a human FGF21 protein variant (for example, an Fc fusion protein such as V103 (SEQ ID NO: 11)) at a dose of approximately 300 mg, subcutaneously, once every 2 weeks. In a certain aspect, provided herein is a method of treating, preventing, or managing (e.g., alleviating one or more symptoms of) hypercholesterolemia, dyslipidemia (e.g., mixed dyslipidemia), or hypertriglyceridemia, comprising administering to a subject in need thereof a human FGF21 protein variant (for example, an Fc fusion protein such as V103 (SEQ ID NO: 11)) at a dose of approximately 300 mg, subcutaneously, once every week. In a certain aspect, provided herein is a method of treating, preventing, or managing (e.g., alleviating one or more symptoms of) hypercholesterolemia, dyslipidemia (e.g., mixed dyslipidemia), or hypertriglyceridemia, comprising administering to a subject in need thereof a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m², inclusive (with ethnic adjustment of greater than or equal to 27.5 kg/m² BMI for Asian subjects), and (ii) triglyceride levels in the range of 150 to 500 mg/dL (1.69-5.65 mmol/L), prior to administration of the human FGF21 protein variant.

In specific aspects, provided herein is a method of reducing body weight (e.g., reducing body weight by at least 5%, 6%, 7%, 8%, 9%, 10%, 15%, or 20%, or more), comprising administering to a subject in need thereof of a human FGF21 protein variant (for example, an Fc fusion protein such as V103 (SEQ ID NO: 11)) at a dose in the range of 100 mg to 600 mg, or more specifically at a dose in the range of 200 mg to 400 mg or 100 mg to 300 mg, for example once every day, once every 2, 3, 4, 5, or 6 days, once every week, once every 2 weeks, once every 3 weeks, or once every 4 weeks (or once every month). In a certain aspect, provided herein is a method of reducing body weight (e.g., reducing body weight by at least 5%, 6%, 7%, 8%, 9%, 10%, 15%, or 20% or more), comprising administering to a subject in need thereof of a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example once every day, once every 2, 3, 4, 5, or 6 days, once every week, once every 2 weeks, once every 3 weeks, or once every 4 weeks (or once every month). In a certain aspect, provided herein is a method of reducing body weight (e.g., reducing body weight by at least 5%, 6%, 7%, 8%, 9%, 10%, 15%, or 20% or more), comprising administering to a subject in need thereof of a human FGF21 protein variant (for example, an Fc fusion protein such as V103 (SEQ ID NO: 11)) at a dose of approximately 300 mg, subcutaneously, once every 4 weeks (or once a month). In a certain aspect, provided herein is a method of reducing body weight (e.g., reducing body weight by at least 5%, 6%, 7%, 8%, 9%, 10%, 15%, or 20% or more), comprising administering to a subject in need thereof of a human FGF21 protein variant (for example, an Fe fusion protein such as V103 (SEQ ID NO: 11)) at a dose of approximately 300 mg, subcutaneously, once every 3 weeks. In a certain aspect, provided herein is a method of reducing body weight (e.g., reducing body weight by at least 5%, 6%, 7%, 8%, 9%, 10%, 15%, or 20% or more), comprising administering to a subject in need thereof of a human FGF21 protein variant (for example, an Fc fusion protein such as V103 (SEQ ID NO: 11)) at a dose of approximately 300 mg, subcutaneously, once every 2 weeks. In a certain aspect, provided herein is a method of reducing body weight (e.g., reducing body weight by at least 5%, 6%, 7%, 8%, 9%, 10%, 15%, or 20% or more), comprising administering to a subject in need thereof of a human FGF21 protein variant (for example, an Fc fusion protein such as V103 (SEQ ID NO: 11)) at a dose of approximately 300 mg, subcutaneously, once every week. In a certain aspect, provided herein is a method of reducing body weight (e.g., reducing body weight by at least 5%, 6%, 7%, 8%, 9%, 10%, 15%, or 20% or more), comprising administering to a subject in need thereof of a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m$^2$, inclusive (with ethnic adjustment of greater than or equal to 27.5 kg/m$^2$ BMI for Asian subjects), and (ii) triglyceride levels in the range of 150 to 500 mg/dL (1.69-5.65 mmol/L), at screening prior to administration of the human FGF21 protein variant.

In particular aspects, provided herein is a method of treating, preventing, or managing (e.g., alleviating one or more symptoms of) obesity, comprising administering to a subject in need thereof a human FGF21 protein variant (for example, an Fc fusion protein such as V103 (SEQ ID NO: 11)) at a dose in the range of 100 mg to 600 mg, or more specifically at a dose in the range of 200 mg to 400 mg or 100 mg to 300 mg, for example once every day, once every 2, 3, 4, 5, or 6 days, once every week, once every 2 weeks, once every 3 weeks, or once every 4 weeks (or once every month). In a specific aspect, provided herein is a method of treating, preventing, or managing (e.g., alleviating one or more symptoms of) obesity, comprising administering to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example once every day, once every 2, 3, 4, 5, or 6 days, once every week, once every 2 weeks, once every 3 weeks, or once every 4 weeks (or once every month). In a certain aspect, provided herein is a method of treating, preventing, or managing (e.g., alleviating one or more symptoms of) obesity, comprising administering to a subject in need thereof a human FGF21 protein variant (for example, an Fc fusion protein such as V103 (SEQ ID NO: 11)) at a dose of approximately 300 mg, subcutaneously, once every 4 weeks (once a month). In a certain aspect, provided herein is a method of treating, preventing, or managing (e.g., alleviating one or more symptoms of) obesity, comprising administering to a subject in need thereof a human FGF21 protein variant (for example, an Fc fusion protein such as V103 (SEQ ID NO: 11)) at a dose of approximately 300 mg, subcutaneously, once every 3 weeks. In a certain aspect, provided herein is a method of treating, preventing, or managing (e.g., alleviating one or more symptoms of) obesity, comprising administering to a subject in need thereof a human FGF21 protein variant (for example, an Fc fusion protein such as V103 (SEQ ID NO: 11)) at a dose of approximately 300 mg, subcutaneously, once every 2 weeks. In a certain aspect, provided herein is a method of treating, preventing, or managing (e.g., alleviating one or more symptoms of) obesity, comprising administering to a subject in need thereof a human FGF21 protein variant (for example, an Fc fusion protein such as V103 (SEQ ID NO: 11)) at a dose of approximately 300 mg, subcutaneously, once every 1 week. In a certain aspect, provided herein is a method of treating, preventing, or managing (e.g., alleviating one or more symptoms of) obesity, comprising administering to a subject in need thereof a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m$^2$, inclusive (with ethnic adjustment of greater than or equal to 27.5 kg/m$^2$ BMI for Asian subjects), and (ii) triglyceride levels in the range of 150 to 500 mg/dL (1.69-5.65 mmol/L), at screening prior to administration of the human FGF21 protein variant.

In particular aspects, provided herein is a method of treating, preventing, or managing (e.g., alleviating one or more symptoms of) NASH, comprising administering to a subject in need thereof a human FGF21 protein variant (for example, an Fc fusion protein such as V103 (SEQ ID NO: 11)) at a dose in the range of 100 mg to 600 mg, or more specifically at a dose in the range of 200 mg to 400 mg or 100 mg to 300 mg, for example once every day, once every 2, 3, 4, 5, or 6 days, once every week, once every 2 weeks, once every 3 weeks, or once every 4 weeks (or once every month). In a specific aspect, provided herein is a method of treating, preventing, or managing (e.g., alleviating one or more symptoms of) NASH, comprising administering to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 3.50 mg, for example once every day, once every 2, 3, 4, 5, or 6 days, once every week, once every 2 weeks, once every 3 weeks, or once every 4 weeks (or once every month). In a certain aspect, provided herein is a method of treating, preventing, or managing (e.g., alleviating one or more symptoms of) NASH, comprising administering to a subject in need thereof a human FGF21 protein variant (for example, an Fc fusion protein such as V103 (SEQ ID NO: 11)) at a dose of approximately 300 mg, subcutaneously, once every 4 weeks (or once a month). In a certain aspect, provided herein is a method of treating, preventing, or managing (e.g., alleviating one or more symptoms of) NASH, comprising administering to a subject in need thereof a human FGF21 protein variant (for example, an Fc fusion protein such as V103 (SEQ ID NO: 11)) at a dose of approximately 300 mg, subcutaneously, once every 3 weeks. In a certain aspect, provided herein is a method of treating, preventing, or managing (e.g., alleviating one or more symptoms of) NASH, comprising administering to a subject in need thereof a human FGF21 protein variant (for example, an Fc fusion protein such as V103 (SEQ ID NO: 11)) at a dose of approximately 300 mg, subcutaneously, once every 2 weeks. In a certain aspect, provided herein is a method of treating, preventing, or managing (e.g., alleviating one or more symptoms of) NASH, comprising administering to a subject in need thereof a human FGF21 protein variant (for example, an Fc fusion protein such as V103 (SEQ ID NO: 11)) at a dose of approximately 300 mg, subcutaneously, once every week. In a certain aspect, provided herein is a method of treating, preventing, or managing (e.g., alleviating one or more symptoms of) NASH, comprising administering to a subject in need thereof a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m², inclusive (with ethnic adjustment of greater than or equal to 27.5 kg/m² BMI for Asian subjects), and (ii) triglyceride levels in the range of 150 to 500 mg/dL (1.69-5.65 mmol/L), prior to administration of the human FGF21 protein variant.

In particular aspects, provided herein is a method of treating, preventing, or managing (e.g., alleviating one or more symptoms of) NAFLD, comprising administering to a subject in need thereof a human FGF21 protein variant (for example, an Fc fusion protein such as V103 (SEQ ID NO: 11)) at a dose in the range of 100 mg to 600 mg, or more specifically at a dose in the range of 200 mg to 400 mg or 100 mg to 300 mg, for example once every day, once every 2, 3, 4, 5, or 6 days, once every week, once every 2 weeks, once every 3 weeks, or once every 4 weeks (or once every month). In a specific aspect, provided herein is a method of treating, preventing, or managing (e.g., alleviating one or more symptoms of) NAFLD, comprising administering to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 3.50 mg, for example once every day, once every 2, 3, 4, 5, or 6 days, once every week, once every 2 weeks, once every 3 weeks, or once every 4 weeks (or once every month). In a certain aspect, provided herein is a method of treating, preventing, or managing (e.g., alleviating one or more symptoms of) NAFLD, comprising administering to a subject in need thereof a human FGF21 protein variant (for example, an Fc fusion protein such as V103 (SEQ ID NO: 11)) at a dose of approximately 300 mg, subcutaneously, once every 4 weeks (or once a month). In a certain aspect, provided herein is a method of treating, preventing, or managing (e.g., alleviating one or more symptoms of) NAFLD, comprising administering to a subject in need thereof a human FGF21 protein variant (for example, an Fc fusion protein such as V103 (SEQ ID NO: 11)) at a dose of approximately 300 mg, subcutaneously, once every 3 weeks. In a certain aspect, provided herein is a method of treating, preventing, or managing (e.g., alleviating one or more symptoms of) NAFLD, comprising administering to a subject in need thereof a human FGF21 protein variant (for example, an Fc fusion protein such as V103 (SEQ ID NO: 11)) at a dose of approximately 300 mg, subcutaneously, once every 2 weeks. In a certain aspect, provided herein is a method of treating, preventing, or managing (e.g., alleviating one or more symptoms of) NAFLD, comprising administering to a subject in need thereof a human FGF21 protein variant (for example, an Fc fusion protein such as V103 (SEQ ID NO: 11)) at a dose of approximately 300 mg, subcutaneously, once every week. In a certain aspect, provided herein is a method of treating, preventing, or managing (e.g., alleviating one or more symptoms of) NAFLD, comprising administering to a subject in need thereof a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m², inclusive (with ethnic adjustment of greater than or equal to 27.5 kg/m² BMI for Asian subjects), and (ii) triglyceride levels in the range of 150 to 500 mg/dL (1.69-5.65 mmol/L), prior to administration of the human FGF21 protein variant.

In particular aspects, provided herein is a method of reducing fat or lipids in the liver, comprising administering to a subject in need thereof (e.g., a subject with NASH or NAFLD) a human FGF21 protein variant (for example, an Fc fusion protein such as V103 (SEQ ID NO: 11)) at a dose in the range of 100 mg to 600 mg, or more specifically at a dose in the range of 200 mg to 400 mg or 100 mg to 300 mg, for example once every day, once every 2, 3, 4, 5, or 6 days, once every week, once every 2 weeks, once every 3 weeks, or once every 4 weeks (or once every month). In a specific aspect, provided herein is a method of reducing fat or lipids in the liver, comprising administering to a subject in need thereof (e.g., a subject with NASH or NAFLD) a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example once every day, once every 2, 3, 4, 5, or 6 days, once every week, once every 2 weeks, once every 3 weeks, or once every 4 weeks (or once every month). In a certain aspect, provided herein is a method of reducing fat or lipids in the liver, comprising administering to a subject in need thereof (e.g., a subject with NASH or NAFLD) a human FGF21 protein variant (for example, an Fc fusion protein such as V103 (SEQ ID NO: 11)) at a dose of approximately 300 mg, subcutaneously, once every 4 weeks (or once a month). In a certain aspect, provided herein is a method of reducing fat or lipids in the liver, comprising administering to a subject in need thereof (e.g., a subject with NASH or NAFLD) a human FGF21 protein variant (for example, an Fc fusion protein such as V103 (SEQ ID NO: 11)) at a dose of approximately 300 mg, subcutaneously, once every 3 weeks. In a certain aspect, provided herein is a method of reducing fat or lipids in the liver, comprising administering to a subject in need thereof (e.g., a subject with NASH or NAFLD) a human FGF21 protein variant (for example, an Fc fusion protein such as V103 (SEQ ID NO: 11)) at a dose of approximately 300 mg, subcutaneously, once every 2 weeks. In a certain aspect, provided herein is a method of reducing fat or lipids in the liver, comprising administering to a subject in need thereof (e.g., a subject with NASH or NAFLD) a human FGF21 protein variant (for example, an Fc fusion protein such as V103 (SEQ ID NO: 11)) at a dose of approximately 300 mg, subcutaneously, once every week. In a certain aspect, provided herein is a method of reducing fat or lipids in the liver, comprising administering to a subject in need thereof (e.g., a subject with NASH or NAFLD) a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks. In specific aspects, methods provided herein are for treating a human subject with NASH or NAFLD. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m², inclusive (with ethnic adjustment of greater than or equal to 27.5 kg/m² BMI for Asian subjects), and (ii) triglyceride levels in the range of 150 to 500 mg/dL (1.69-5.65 mmol/L), at screening prior to administration of the human FGF21 protein variant.

In specific aspects, provided herein is a method of reducing elevated LDL cholesterol (LDL-C), total cholesterol (total-C), triglyceride, and/or Apo B, comprising administering to a subject in need thereof a human FGF21 protein variant (for example, an Fc fusion protein such as V103 (SEQ ID NO: 11)) at a dose in the range of 100 mg to 600 mg, for example once every day, once every 2, 3, 4, 5, or 6 days, once every week, once every 2 weeks, once every 3 weeks, or once every 4 weeks (or once every month). In particular aspects, provided herein is a method of reducing elevated LDL-C, total-C, triglyceride, and/or Apo B, comprising administering to a subject in need thereof a human FGF21 protein variant (for example, an Fc fusion protein such as V103 (SEQ ID NO: 11)) at a dose in the range of 100 mg to 600 mg, or more specifically at a dose in the range of 200 mg to 400 mg or 100 mg to 300 mg. In a specific aspect, provided herein is a method of reducing elevated LDL-C, total-C, triglyceride, and/or Apo B, comprising administering to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example once every day, once every 2, 3, 4, 5, or 6 days, once every week, once every 2 weeks, once every 3 weeks, or once every 4 weeks (or once every month). In a certain aspect, provided herein is a method of reducing elevated LDL-C, total-C, triglyceride, and/or Apo B, comprising administering to a subject in need thereof a human FGF21 protein variant (for example, an Fc fusion protein such as V103 (SEQ ID NO: 11)) at a dose of approximately 300 mg, subcutaneously, once every 4 weeks (or once a month). In a certain aspect, provided herein is a method of reducing elevated LDL-C, total-C, triglyceride, and/or Apo B, comprising administering to a subject in need thereof a human FGF21 protein variant (for example, an Fc fusion protein such as V103 (SEQ ID NO: 11)) at a dose of approximately 300 mg, subcutaneously, once every 3 weeks. In a certain aspect, provided herein is a method of reducing elevated LDL-C, total-C, triglyceride, and/or Apo B, comprising administering to a subject in need thereof a human FGF21 protein variant (for example, an Fc fusion protein such as V103 (SEQ ID NO: 11)) at a dose of approximately 300 mg, subcutaneously, once every 2 weeks. In a certain aspect, provided herein is a method of reducing elevated LDL-C, total-C, triglyceride, and/or Apo B, comprising administering to a subject in need thereof a human FGF21 protein variant (for example, an Fc fusion protein such as V103 (SEQ ID NO: 11)) at a dose of approximately 300 mg, subcutaneously, once every week. In a certain aspect, provided herein is a method of reducing elevated LDL-C, total-C, triglyceride, and/or Apo B, comprising administering to a subject in need thereof a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks. In a specific aspect, methods provided herein reduce elevated LDL-C, total-C, triglyceride, and/or Apo B by at least about 5%, 6%, 7%, 8%, 9%, 10%, 11%, 12%, 13%, 14%, 15%, 20%, 25%, 30%, 35%, 40%, 45%, 50%, 55%, 60%, 65%, 70%, 75%, 80%, 85%, or 90% or more. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m$^2$, inclusive (with ethnic adjustment of greater than or equal to 27.5 kg/m$^2$ BMI for Asian subjects), and (ii) triglyceride levels in the range of 150 to 500 mg/dL (1.69-5.65 mmol/L), at screening prior to administration of the human FGF21 protein variant.

In specific aspects, provided herein is a method of increasing HDL-C (e.g., increasing HDL-C by at least 5%, 10%, 15%, 20%, 25%, 30%, 35%, 40%, 45%, or 50%), comprising administering to a subject in need thereof a therapeutically effective amount of a fusion protein comprising a human FGF21 protein variant (for example, an Fc fusion protein such as V103 (SEQ ID NO: 11)) at a dose in the range of 100 mg to 600 mg, for example once every day, once every 2, 3, 4, 5, or 6 days, once every week, once every 2 weeks, once every 3 weeks, or once every 4 weeks (or once every month). In particular aspects, provided herein is a method of increasing HDL-C (e.g., increasing HDL-C by at least 5%, 10%, 15%, 20%, 25%, 30%, 35%, 40%, 45%, or 50%), comprising administering to a subject in need thereof a human FGF21 protein variant (for example, an Fc fusion protein such as V103 (SEQ ID NO: 11)) at a dose in the range of about 200 mg to 400 mg. In a specific aspect, provided herein is a method of increasing HDL-C (e.g., increasing HDL-C by at least 5%, 10%, 15%, 20%, 25%, 30%, 35%, 40%, 45%, or 50%), comprising administering to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example once every day, once every 2, 3, 4, 5, or 6 days, once every week, once every 2 weeks, once every 3 weeks, or once every 4 weeks (or once every month). In a certain aspect, provided herein is a method of increasing HDL-C (e.g., increasing HDL-C by at least 5%, 10%, 15%, 20%, 25%, 30%, 35%, 40%, 45%, or 50%), comprising administering to a subject in need thereof a human FGF21 protein variant (for example, an Fc fusion protein such as V103 (SEQ ID NO: 11)) at a dose of approximately 300 mg, subcutaneously, once every 4 weeks (or once a month) or once every 3 weeks or once every 2 weeks. In a certain aspect, provided herein is a method of increasing HDL-C (e.g., increasing HDL-C by at least 5%, 10%, 15%, 20%, 25%, 30%, 35%, 40%, 45%, or 50%), comprising administering to a subject in need thereof a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m$^2$, inclusive (with ethnic adjustment of greater than or equal to 27.5 kg/m$^2$ BMI for Asian subjects), and (ii) triglyceride levels in the range of 150 to 500 mg/dL (1.69-5.65 mmol/L), at screening prior to administration of the human FGF21 protein variant.

In particular aspects, provided herein is a method of reducing triglyceride levels, for example fasting triglyceride levels, (e.g., reducing blood/serum triglyceride levels by at least 20%, 30%, 40%, 50%, 60%, 70%, 80%, or 90% or more), comprising administering to a subject in need thereof a human FGF21 protein variant (for example, an Fc fusion protein such as V103 (SEQ ID NO: 11)) at a dose in the range of 100 mg to 600 mg, for example once every day, once every 2, 3, 4, 5, or 6 days, once every week, once every 2 weeks, once every 3 weeks, or once every 4 weeks (or once every month). In particular aspects, provided herein is a method of reducing triglyceride levels (e.g., reducing blood/serum triglyceride levels by at least 20%, 30%, 40%, 50%, 60%, 70%, 80%, or 90% or more), comprising administering to a subject in need thereof a human FGF21 protein variant (for example, an Fc fusion protein such as V103 (SEQ ID NO: 11)) at a dose in the range of about 200 mg to 400 mg. In a specific aspect, provided herein is a method of reducing triglyceride levels, for example fasting triglyceride levels, (e.g., reducing blood/serum triglyceride levels by at least 20%, 30%, 40%, 50%, 60%, 70%, 80%, or 90% or more), comprising administering to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example once every day, once every 2, 3, 4, 5, or 6 days, once every week, once every 2 weeks, once every 3 weeks, or once every 4 weeks (or once every month). In a certain aspect, provided herein is a method of reducing triglyceride levels, for example fasting triglyceride levels, (e.g., reducing blood/serum triglyceride levels by at least 20%, 30%, 40%, 50%, 60%, 70%, 80%, or 90% or more), comprising administering to a subject in need thereof a human FGF21 protein variant (for example, an Fc fusion protein such as V103 (SEQ ID NO: 11)) at a dose of approximately 300 mg, subcutaneously, once every 4 weeks (or once a month), or once every 3 weeks or once every 2 weeks. In a certain aspect, provided herein is a method of reducing triglyceride levels, for example fasting triglyceride levels, (e.g., reducing blood/serum triglyceride levels by at least 20%, 30%, 40%, 50%, 60%, 70%, 80%, or 90% or more), comprising administering to a subject in need thereof a human FGF21 protein variant (for example, an Fc fusion protein such as V103 (SEQ ID NO: 11)) at a dose in the range of approximately 200 mg to 250 mg, subcutaneously, once every 3 weeks or once every 2 weeks or once every week. In a specific aspect, methods provided herein are able to reduce triglyceride levels, for example fasting triglyceride levels, by at least about 40% or at least about 50% for a period of at least 1-4 weeks. In a certain aspect, provided herein is a method of reducing triglyceride levels, for example fasting triglyceride levels, by at least about 40% to 60% (e.g., at least about 50%) for a period of at least 1-4 weeks, comprising administering to a subject in need thereof a human FGF21 protein variant (for example, an Fc fusion protein such as V103 (SEQ ID NO: 11)) at a dose of approximately 300 mg, subcutaneously, once every 4 weeks (or once a month) or once every 3 weeks or once every 2 weeks. In a certain aspect, provided herein is a method of reducing triglyceride levels, for example fasting triglyceride levels, by at least about 40% to 60% (e.g., at least about 50%) for a period of at least 1-4 weeks, comprising administering to a subject in need thereof a human FGF21 protein variant (for example, an Fc fusion protein such as V103 (SEQ ID NO: 11)) at a dose of in the range of 200 mg to 300 mg (e.g., at least 220 mg, 230 mg, 240 mg, 250 mg, 260 mg, 270 mg, or 280 mg), subcutaneously, once every 4 weeks (or once a month) or once every 3 weeks or once every 2 weeks. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m$^2$, inclusive (with ethnic adjustment of greater than or equal to 27.5 kg/m$^2$ BMI for Asian subjects), and (ii) triglyceride levels in the range of 150 to 500 mg/dL (1.69-5.65 mmol/L), at screening prior to administration of the human FGF21 protein variant.

In a specific aspect, methods provided herein are able to reduce triglyceride levels, for example fasting triglyceride levels, by at least about 40% or at least about 50%, for example for a period of at least 1-4 weeks, said method comprising administering to a subject in need thereof a human FGF21 protein variant (for example, an Fc fusion protein such as V103 (SEQ ID NO: 11)) at a dose in the range of approximately 250 mg to 300 mg (e.g., 300 mg), subcutaneously, once every 4 weeks (or once a month) or once every 3 weeks. In a certain aspect, provided herein is a method of reducing triglyceride levels, for example fasting triglyceride levels, by at least about 40% to 60% (e.g., at least about 50%), for example for a period of at least 1-4 weeks, said method comprising administering to a subject in need thereof a human FGF21 protein variant (for example, an Fc fusion protein such as V103 (SEQ ID NO: 11)) at a dose in the range of approximately 250 mg to 300 mg (e.g., 300 mg), subcutaneously, once every 4 weeks (or once a month) or once every 3 weeks or once every 2 weeks.

In particular aspects, provided herein is a method of reducing cardiovascular risk (e.g., by at least about 5%, 10%, 15%, 20%, 25%, 30%, 35%, 40%, 45%, or 50% or more), comprising administering to a subject in need thereof a therapeutically effective amount of a human FGF21 protein variant (for example, an Fc fusion protein such as V103 (SEQ ID NO: 11)) at a dose in the range of 100 mg to 600 mg, for example once every day, once every 2, 3, 4, 5, or 6 days, once every week, once every 2 weeks, once every 3 weeks, or once every 4 weeks (or once every month). In particular aspects, provided herein is a method of reducing cardiovascular risk (e.g., by at least about 5%, 10%, 15%, 20%, 25%, 30%, 35%, 40%, 45%, or 50% or more), comprising administering to a subject in need thereof a human FGF21 protein variant (for example, an Fc fusion protein such as V103 (SEQ ID NO: 11)) at a dose in the range of about 200 mg to 400 mg or 100 mg to 300 mg, for example once a week, once every 2 weeks, once every 3 weeks, or once every 4 weeks. In a specific aspect, provided herein is a method of reducing cardiovascular risk (e.g., by at least about 5%, 10%, 15%, 20%, 25%, 30%, 35%, 40%, 45%, or 50% or more), comprising administering to a subject in need thereof a human FGF21 protein variant (for example, an Fc fusion protein such as V103 (SEQ ID NO: 11)) at a dose of approximately 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, for example once every day, once every 2, 3, 4, 5, or 6 days, once every week, once every 2 weeks, once every 3 weeks, or once every 4 weeks (or once every month). In a certain aspect, provided herein is a method of reducing cardiovascular risk (e.g., by at least about 5%, 10%, 15%, 20%, 25%, 30%, 35%, 40%, 45%, or 50% or more), comprising administering to a subject in need thereof a human FGF21 protein variant (for example, an Fc fusion protein such as V103 (SEQ ID NO: 11)) at a dose of approximately 300 mg, subcutaneously, once every 4 weeks (or once every month). In a certain aspect, provided herein is a method of reducing cardiovascular risk (e.g., by at least about 5%, 10%, 15%, 20%, 25%, 30%, 35%, 40%, 45%, or 50% or more), comprising administering to a subject in need thereof a human FGF21 protein variant (for example, an Fc fusion protein such as V103 (SEQ ID NO: 11)) at a dose of approximately 300 mg, subcutaneously, once every 3 weeks. In a certain aspect, provided herein is a method of reducing cardiovascular risk (e.g., by at least about 5%, 10%, 15%, 20%, 25%, 30%, 35%, 40%, 45%, or 50%), comprising administering to a subject in need thereof a human FGF21 protein variant (for example, an Fc fusion protein such as V103 (SEQ ID NO: 11)) at a dose in the range of approximately 200 mg to 250 mg, subcutaneously, every 3 weeks. In a certain aspect, provided herein is a method of reducing cardiovascular risk (e.g., by at least about 5%, 10%, 15%, 20%, 25%, 30%, 35%, 40%, 45%, or 50% or more), comprising administering to a subject in need thereof a human FGF21 protein variant (for example, an Fc fusion protein such as V103 (SEQ ID NO: 11)) at a dose of approximately 300 mg, subcutaneously, once every 2 weeks or once every week. In specific aspects, methods provided herein are for treating a human subject with hypercholesterolemia (e.g., primary hypercholesterolemia) or dyslipidemia (e.g., mixed dyslipidemia). In particular aspects, methods provided herein are for treating a human subject with hypertriglyceridemia, in particular, severe hypertriglyceridemia. In certain aspects, methods provided herein are for treating a human subject with type 2 diabetes or a human subject who is obese. In specific aspects, methods provided herein are for treating a human subject 18 to 55 years of age, who has (i) a BMI within the range of 30-45 kg/m$^2$, inclusive (with ethnic adjustment of greater than or equal to 27.5 kg/m$^2$ BMI for Asian subjects), and (ii) triglyceride levels in the range of 150 to 500 mg/dL (1.69-5.65 mmol/L), prior to administration of the human FGF21 protein variant.

In specific aspects, methods provided herein are for treating a human subject 18 to 55 years of age, who has (i) a BMI within the range of 30-45 kg/m$^2$, inclusive (with ethnic adjustment of greater than or equal to 27.5 kg/m$^2$ BMI for Asian subjects), and (ii) triglyceride levels in the range of 150 to 500 mg/dL (1.69-5.65 mmol/L), at screening prior to administration of the human FGF21 protein variant.

In various aspects, methods provided herein are for treating a human subject at least 18 years of age. In other aspects, methods provided herein are for treating a human subject at least 55 years of age. In other aspects, methods provided herein are for treating a human subject at least 60 years of age. In other aspects, methods provided herein are for treating a human subject at least 65 years of age.

In specific aspects, methods provided herein are for treating a human subject who has a BMI within the range of 30 to 45 kg/m². In certain aspects, methods provided herein are for treating a human subject who has a BMI greater than or equal to 25 kg/m². In certain aspects, methods provided herein are for treating a human subject who has a BMI greater than or equal to 30 kg/m². In certain aspects, methods provided herein are for treating a human subject who has a BMI greater than or equal to 35 kg/m². In some aspects, methods provided herein are for treating a human subject with a BMI (with ethnic adjustment) ≥27.5 for Asian individuals.

In particular aspects, methods provided herein are for treating a human subject who has triglyceride levels in the range of 150-500 mg/dL (1.69-5.65 mmol/L), prior to administration of a human FGF21 protein variant. In particular aspects, methods provided herein are for treating a human subject who has triglyceride levels that is at least 1.50 mg/dL (at least 1.69 mmol/L), prior to administration of a human FGF21 protein variant. In particular aspects, methods provided herein are for treating a human subject who has triglyceride levels that is at least 200 mg/dL, at screening prior to administration of a human FGF21 protein variant. In particular aspects, methods provided herein are for treating a human subject who has triglyceride levels that is at least 500 mg/dL (at least 5.65 mmol/L), prior to administration of a human FGF21 protein variant.

In certain aspects, human subject with one or more of the following are not treated according to the methods provided herein:

History of hepatobilliary disease, cholelithiasis, or biliary sludge by history or at screening ultrasound, hepatic encephalopathy, esophageal varices, or porticaval shunt;

Liver disease or liver injury as indicated by abnormal liver function tests (ALT, AST, GGT, alkaline phosphatase, or serum bilirubin) above upper limit of normal at screening or baseline;

Chronic infection with Human Immunodeficiency Virus (HIV), Hepatitis B (HBV) or Hepatitis C (HCV);

A positive HBV surface antigen (HBsAg) test, or if standard local practice, a positive HBV core antigen test.

Positive (detectable) HCV RNA;

History of pancreatic injury or pancreatitis, or other pancreatic disease;

Amylase or lipase above ULN at screening or baseline;

History of hypersensitivity to drugs of similar biological class, FGF21 protein analogue, or Fc fusion proteins;

History of bone disorders including but not limited to osteoporosis, osteopenia, osteomalacia, severe vitamin D deficiency; and Plasma 25-hydroxyvitamin D level is below the lower limit of the normal range at screening.

In one aspect, provided herein are combination therapies for treating, preventing, or managing a metabolic disorder or a cardiovascular disorder comprising administering a therapeutically effective amount of an FGF21 protein variant described herein (e.g., Fc fusion protein such as V103) and one or more additional therapeutically active agents (e.g., therapeutic agents for metabolic disorders or cardiovascular disorders). Non-limiting examples of other therapeutically active agents for use in combination with FGF21 protein variants provided herewith include obesity therapies (e.g., phentermine/topiramate, orlistat, lorcaserin, liraglutide, buproprion/naltrexone), high blood pressure therapies (e.g., diuretics, beta-blockers, alpha-blockers, ACE inhibitors, Angiotensin II Receptor Blockers (ARBs), direct renin inhibitors, calcium channel blockers, central agonists, peripheral adrenergic blockers, vasodialators, and combinations), diabetic therapies (e.g., insulin, alpha-glucosidase inhibitors, biguanides, dopamine agonist, DPP-4 inhibitors, glucagon-like peptides, meglitinides, sodium glucose transporter (SGLT) inhibitors, sulfonylureas, thiazolidinediones, amylinomimetics), NAFLD/NASH and cardiovascular therapies (e.g., statins, fibrates, aspirin, anticoagulants).

In one aspect, provided herein are combination therapies for treating, preventing, or managing a metabolic disorder or a cardiovascular disorder comprising administering a therapeutically effective amount of an FGF21 protein variant described herein (e.g., Fc fusion protein such as V103) and one or more therapeutically active agents selected from the following: amiloride (Midamor), bumetanide (Bumex), chlorthalidone (Hygroton), chlorothiazide (Diuril), furosemide (Lasix), hydrochlorothiazide or HCTZ (Esidrix, Hydrodiuril, Microzide), indapamide (Lozol), metolazone (Mykrox, Zaroxolyn), spironolactone (Aldactone), triamterene (Dyrenium), Acebutolol (Sectral), Atenolol (Tenormin), Betaxolol (Kerlone), Bisoprolol (Zebeta), Carteolol (Cartrol), Metoprolol (Lopressor, Toprol XL), Nadolol (Corgard), Nebivolol (Bystolic), Penbutolol (Levatol), Pindolol (Viskcn), Propranolol (Inderal), Sotalol (Betapace), Timolol (Blocadren), Doxazosin (Cardura), Prazosin (Minipress), Terazosin (Hytrin), Benazepril (Lotensin), Captopril (Capoten), Enalapril (Vasotec), Fosinopril (Monopril), Lisinopril (Prinivil, Zestril), Moexipril (Univasc), Perindopril (Aceon), Quinapril (Accupril), Ramipril (Altace), Trandolapril (Mavik), Norvasc (amlodipine), Plendil (felodipine), DynaCirc (isradipine), Cardene (nicardipine), Procardia XL, Adalat (nifedipine), Cardizem, Dilacor, Tiazac, Diltia XL (diltiazem), Sular (Nisoldipine), Isoptin, Calan, Verelan, Covera-HS (verapamil), Capoten (captopril), Vasotec (enalapril), Prinivil, Zestril (lisinopril), Lotensin (benazepril), Monopril (fosinopril), Altace (ramipril), Accupril (quinapril), Aceon (perindopril), Mavik (trandolapril), Univasc (moexipril), Atacand (candesartan), Avapro (irbesartan), Benicar (olmesartan), Cozaar (losartan), Diovan (valsartan), Micardis (telmisartan), Teveten (cprosartan), Chlorthalidonc (Hygroton), Chlorothiazidc (Diuril), Hydrochlorothiazidc or HCTZ (Esidrix, Hydrodiuril, Microzide), Indapamide (Lozol), Metolazone (Mykrox, Zaroxolyn), Amiloride (Midamor), Bumetanide (Bumex), Furosemide (Lasix), Spironolactone (Aldactone), Triamterene (Dyrenium), Acebutolol (Sectral), Atenolol (Tenormin), Betaxolol (Kerlone), Bisoprolol (Zebeta, Ziac), Carteolol (Cartrol), Carvedilol (Coreg), Labetalol (Normodyne, Trandate), Metoprolol (Lopressor, Toprol-XL), Nadolol (Corgard), Nebivolol (Bystolic), Penbutolol (Levatol), Pindolol (Visken), Propranolol (Inderal), Sotalol (Betapace), Timolol (Blocadren), fibric acid derivatives, niacin, and omega-3 fatty acids, fenofibrate, gemfibrozil, atorvastatin, fluvastatin, lovastatin, pitavastatin, pravastatin, rosuvastatin, simvastatin, pramlintide, acarbose (Precose), miglitol (Glyset), metformin, bromocriptine, alogliptin, linagliptin, saxagliptin, sitagliptin, albiglutide (Tanzeum), dulaglutidc (Trulicity), excnatide (Byctta), cxcnatidc extended-release (Bydureon), liraglutide (Victoza), nateglinide (Starlix), repaglinide (Prandin), repaglinide-metformin (Prandimet), dapagliflozin (Farxiga), dapagliflozin-metformin (Xigduo XR), canagliflozin (Invokana), canagliflozin-metformin (Invokamet), empagliflozin (Jardiance), empagliflozin-linagliptin (Glyxambi), empagliflozin-metformin (Synjardy), sotagliflozin, tofogliflozin, remogliflozin, luseogliflozin, ipragliflozin, atigliflozin, bexagliflozin, henagliflozin, licogliflozin, glimepiride (Amaryl), glimepiride-pioglitazone (Duetact), glimeperiderosiglitazone (Avandaryl), gliclazide, glipizide-metformin (Metaglip), glyburide (DiaBeta, Glynase, Micronase), glyburide-metformin (Glucovance), chlorpropamide (Diabinese), tolazamide (Tolinase), tolbutamide (Orinase, Tol-Tab), rosiglitazone (Avandia), rosiglitazone-glimepiride (Avandaryl), rosiglitizone-metformin (Amaryl M), pioglitazone (Actos), pioglitazone-alogliptin (Oseni), pioglitazone-glimepiride (Duetact), and pioglitazone-metformin (Actoplus Met, Actoplus Met XR).

In some embodiments, the sodium glucose transporter (SGLT) inhibitor is selected from dapagliflozin, empagliflozin, canagliflozin, ertugliflozin, sotagliflozin, tofogliflozin, remogliflozin, luseogliflozin, ipragliflozin, atigliflozin, bexagliflozin, henagliflozin, licogliflozin, and a pharmaceutically acceptable salt of any of these. In some embodiments, the sodium glucose transporter (SGLT) inhibitor is dapagliflozin. In some embodiments, the sodium glucose transporter (SGLT) inhibitor is empagliflozin. In some embodiments, the sodium glucose transporter (SGLT) inhibitor is canagliflozin. In some embodiments, the sodium glucose transporter (SGLT) inhibitor is ertugliflozin. In some embodiments, the sodium glucose transporter (SGLT) inhibitor is licogliflozin.

In some embodiments, the sodium glucose transporter (SGLT) inhibitor is dapagliflozin or a pharmaceutically acceptable salt thereof. In some embodiments, the sodium glucose transporter (SGLT) inhibitor is empagliflozin or a pharmaceutically acceptable salt thereof. In some embodiments, the sodium glucose transporter (SGLT) inhibitor is canagliflozin or a pharmaceutically acceptable salt thereof. In some embodiments, the sodium glucose transporter (SGLT) inhibitor is ertugliflozin or a pharmaceutically acceptable salt thereof. In some embodiments, the sodium glucose transporter (SGLT) inhibitor is licogliflozin or a pharmaceutically acceptable salt thereof.

In specific aspects, methods provided herein comprising administering an FGF21 protein variant (e.g., Fc fusion protein such as V103) are for use as an adjunct to diet (e.g., healthy diet, calorie restricted diet), exercise, and/or other lifestyle modifications.

FGF21 Variants

Modifications to FGF21 can improve the half-life and/or potency over wild-type FGF21 to provide an FGF21 therapeutic for treating or managing (e.g., alleviating one or more symptoms of a disorder) metabolic or cardiovascular disorders or for reducing cardiovascular risk, with clinically preferred dosing regimens.

In specific aspects, provided herein are FGF21 protein variants, for example FGF21 protein variants described in Table 1, for use in the methods for treating or managing (e.g., alleviating one or more symptoms of a disorder) metabolic or cardiovascular disorders or for reducing cardiovascular risk.

Acceptable amino acid substitutions and modifications which constitute differences between the FGF21 polypeptide and protein variants and mutants of the methods provided herein and wild-type FGF21 include, but are not limited to, one or more amino acid substitutions, including substitutions with non-naturally occurring amino acid analogs, and truncations. Thus, FGF21 protein variants include, but are not limited to, site-directed FGF21 mutants, truncated FGF21 polypeptides, proteolysis-resistant FGF21 mutants, aggregation-reducing FGF21 mutants, FGF21 combination mutants, FGF21 conjugates (e.g., fatty acid-FGF21 conjugate, PEG-FGF21 conjugate) and FGF21 fusion proteins (e.g., Fc domain fusion protein, human serum albumin fusion protein).

In one aspect, an FGF21 protein variant comprises substitutions at one or more or all of the following residues made relative to wild type FGF21 according to the numbering scheme of SEQ ID NO: 1: Q55, R105, G148, K150, P158, S195, P199, and G202.

In one aspect, an FGF21 protein variant comprises one or more or all of the following substitutions made relative to wild type FGF21 according to the numbering scheme of SEQ ID NO: 1: Q55C, R105K, G148C, K150R, P158S, S195A, P199G, and G202A.

Exemplary fusion protein sequences provided herein are listed in Table 1. The descriptions of said fusions include the FGF21 variant and, where applicable, a linker. The changes or substitutions employed by the FGF21 variant are numbered and described relative to wild-type FGF21.

By way of example, "Variant 101 (V101)" (SEQ ID NO:10) is an Fc-FGF21 fusion with a two amino acid linker and the following substitutions made relative to wild type FGF21 according to the numbering scheme of SEQ ID NO: 1: Q55C, A109T, G148C, K150R, P158S, P174L, S195A, P199G, G202A.

By way of another example, "Variant 103 (V103)" (SEQ ID NO:11) is an Fc-FGF21 fusion with a two amino acid linker (GS) and the following substitutions made relative to wild type FGF21 according to the numbering scheme of SEQ ID NO: 1: Q55C, RI05K, G148C, KI50R, P158S, S195A, P199G, G202A.

TABLE 1

Exemplary FGF21 Variants

| SEQ ID NO: | Sequence | Description* |
|---|---|---|
| 7 | DKTHTCPPCP APEAAGGPSV FLFPPKPKDT LMISRTPEVT CVVVDVSHED PEVKFNWYVD GVEVHNAKTK PREEQYNSTY RVVSVLTVLH QDWLNGKEYK CKVSNKALPA PIEKTISKAK GQPREPQVYT LPPSREEMTK NQVSLTCLVK GFYPSDIAVE WESNGQPENN YKTTPPVLDS DGSFFLYSKL TVDKSRWQQG NVFSCSVMHE ALHNHYTQKS LSLSPGKGSD SSPLLQFGGQ VRQRYLYTDD AQQTEAHLEI REDGTVGGAA DQSPESLLQL KALKPGVIQI LGVKTSRFLC QRPDGALYGS LHFDPEACSF RELLLEDGYN VYQSEAHGLP LHLPGNKSPH RDPAPRGPAR FLPLPGLPPA LPEPPGILAP QPPDVGSSDP LSMVGPSQGR SPSYAS | Full Length N-term Fc-Fusion with 2 AA Linker (GS) and WT FGF21 |

TABLE 1 -continued

Exemplary FGF21 Variants

| SEQ ID NO: | Sequence | Description* |
|---|---|---|
| 8 | DKTHTCPPCP APEAAGGPSV FLFPPKPKDT LMISRTPEVT CVVVDVSHED PEVKFNWYVD GVEVHNAKTK PREEQYNSTY RVVSVLTVLH QDWLNGKEYK CKVSNKALPA PIEKTISKAK GQPREPQVYT LPPSREEMTK NQVSLTCLVK GFYPSDIAVE WESNGQPENN YKTTPPVLDS DGSFFLYSKL TVDKSRWQQG NVFSCSVMHE ALHNHYTQKS LSLSPGK<u>GGG GSGGGGSGGG GS</u>DSSPLLQF GGQVRQRYLY TDDAQQTEAH LEIREDGTVG GAADQSPESL LQLKALKPGV IQILGVKTSR FLCQRPDGAL YGSLHFDPEA CSFRELLLED GYNVYQSEAH GLPLHLPGNK SPHRDPAPRG RARFLPLPGL PPALPEPPGI LAPQPPDVGS SDPLSMVGPS QGRSPSYAS | Full Length N-term Fc-Fusion with 15 AA Linker (GGGGS x 3) between Fc and WT FGF21 |
| 9 | DSSPLLQFGG QVRQRYLYTD DAQETEAHLE IREDTVGGA AHQSPESLLE LKALKPGVIQ ILGVKTSRFL CQKPDGALYG SLHFDPEACS FRELLLEDGY NVYQSEAHGL PLHLPGNRSP HCDPAPQGPA RFLPLPGLPP ALPEPPGILA PQPPDVGSSD PLAMVGPSQG RSPSYAS | Variant #76 (V76) = Protein with 9 total mutations relative to wild-type FGF21 (as in W001/018172) |
| 10 | DKTHTCPPCP APEAAGGPSV FLFPPKPKDT LMISRTPEVT CVVVDVSHED PEVKFNWYVD GVEVHNAKTK PREEQYNSTY RVVSVLTVLH QDWLNGKEYK CKVSNKALPA PIEKTISKAK GQPREPQVYT LPPSREEMTK NQVSLTCLVK GFYPSDIAVE WESNGQPENN YKTTPPVLDS DGSFFLYSKL TVDKSRWQQG NVFSCSVMHE ALHNHYTQKS LSLSPGK<u>GS</u>D SSPLLQFGGQ VRQRYLYTDD ACQTEAHLEI REDGTVGGAA DQSPESLLQL KALKPGVIQI LGVKTSRFLC QRPDGTLYGS LHFDPEACSF RELLLEDGYN VYQSEAHGLP LHLPCNRSPH RDPASRGPAR FLPLPGLPPA LPEPPGILAP QPPDVGSSDP LAMVGGSQAR SPSYAS | Variant #101 (V101) = N-term Fc Fusion with the 2 AA linker (GS) between Fc and FGF21 = (Q55C, A109T, G148C, K150R, P158S, S195A, P199G, G202A) |
| 11 | DKTHTCPPCP APEAAGGPSV FLFPPKPKDT LMISRTPEVT CVVVDVSHED PEVKFNWYVD GVEVHNAKTK PREEQYNSTY RVVSVLTVLH QDWLNGKEYK CKVSNKALPA PIEKTISKAK GQPREPQVYT LPPSREEMTK NQVSLTCLVK GFYPSDIAVE WESNGQPENN YKTTPPVLDS DGSFFLYSKL TVDKSRWQQG NVFSCSVMHE ALHNHYTQKS LSLSPGK<u>GS</u>D SSPLLQFGGQ VRQRYLYTDD ACQTEAHLEI REDGTVGGAA DQSPESLLQL KALKPGVIQI LGVKTSRFLC QKPDGALYGS LHFDPEACSF RELLLEDGYN VYQSEAHGLP LHLPCNRSPH RDPASRGPAR FLPLPGLPPA LPEPPGILAP QPPDVGSSDP LAMVGGSQAR SPSYAS | Variant #103 (V103) = N-term Fc Fusion with the 2 AA linker (GS) =(Q55C, R105K, G148C, K150R, P158S, S195A, P199G, G202A) |
| 12 | DKTHTCPPCP APEAAGGPSV FLFPPKPKDT LMISRTPEVT CVVVDVSHED PEVKFNWYVD GVEVHNAKTK PREEQYNSTY RVVSVLTVLH QDWLNGKEYK CKVSNKALPA PIEKTISKAK GQPREPQVYT LPPSREEMTK NQVSLTCLVK GFYPSDIAVE WESNGQPENN YKTTPPVLDS DGSFFLYSKL TVDKSRWQQG NVFSCSVMHE ALHNHYTQKS LSLSPGK<u>GGG GSGGGGSGGG GS</u>DSSPLLQF GGQVRQRYLY TDDACQTEAH LEIREDGTVG GAADQSPESL LQLKALKPGV IQILGVKTSR FLCQKPDGAL YGSLHFDPEA CSFRELLLED GYNVYQSEAH GLPLHLPCNR SPHRDPASRG RARFLPLPGL PPALPEPPGI LAPQPPDVGS SDPLAMVGGS QARSPSYAS | Variant #188 = V103 with 15 AA Linker (GGGGS x 3) between Fc and FGF21 =(Q55C, R105K, G148C, K150R, P158S, S195A, P199G, G202A) |

TABLE 1 -continued

Exemplary FGF21 Variants

| SEQ ID NO: | Sequence | Description* |
|---|---|---|
| 13 | DKTHTCPPCP APEAAGGPSV FLFPPKPKDT LMISRTPEVT CVVVDVSHED PEVKFNWYVD GVEVHNAKTK PREEQYNSTY RVVSVLTVLH QDWLNGKEYK CKVSNKALPA PIEKTISKAK GQPREPQVYT LPPSREEMTK NQVSLTCLVK GFYPSDIAVE WESNGQPENN YKTTPPVLDS DGSFFLYSKL TVDKSRWQQG NVFSCSVMHE ALHNHYTQKS LSLSPGKGGG GSGGGGSGGG GSDSSPLLQF GGQVRQRYLY TDDACQTEAH LEIREDGTVG GAADQSPESL LQLKALKPGV IQILGVKTSR FLCQRPDGTL YGSLHFDPEA CSFRELLLED GYNVYQSEAH GLPLHLPCNR SPHRDPASRG RARFLPLPGL PPALPEPPGI LAPQPPDVGS SDPLAMVGGS QARSPSYAS | Variant #204 = V101 with 15 AA Linker (GGGGS x 3) between Fc and FGF21 = (Q55C, A109T, G148C, K150R, P158S, S195A, P199G, G202A) |

*-Note that the FGF21 wild-type sequence in this table refers to NCBI reference sequence number NP_061986.1 (SEQ ID NO: 1) unless otherwise specified.

All mutations in the FGF21 moiety and corresponding amino acid numbering of said mutations refers back to (SEQ ID NO: 1) not to the full-length sequences in this table which may also include Fc and linker regions.

In specific aspects, provided herein are methods of treating, preventing or managing a metabolic disorder or cardiovascular disorder (e.g., obesity, NALFD, NASH, or diabetes), said methods comprises administering a human FGF21 protein variant, which is a fusion protein comprising a human Fc region (e.g., modified human Fc region) fused to a mature human FGF21 protein or a fragment thereof comprising one or more mutations selected from: Q55C, R105K, G148C, K150R, P158S, S195A, P199G, and G202A, according to the number of SEQ ID NO: 1.

In specific aspects, provided herein are methods of treating, preventing or managing a metabolic disorder or cardiovascular disorder (e.g., obesity, NALFD, NASH, or diabetes), said methods comprises administering a human FGF21 protein variant, which is a fusion protein comprising a human Fc region (e.g., modified human Fc region) fused to a mature human FGF21 protein or a fragment thereof, such as V103 comprising the amino acid sequence of SEQ ID NO: 11.

Functional assays to determine or measure the bioactivity of FGF21 or a variant thereof or a fragment thereof have been described, for example, see PCT Publication No. WO 2013/049247, which is incorporated by reference herewith in its entirety. In specific aspects, functional assays are in vitro assays. In other aspects, functional assays are in vivo assays. In certain aspects, functional assays are ex vivo assays.

In specific aspects FGF21 downstream biomarkers can be assessed to determine the bioactivity of FGF21 or a variant thereof or a fragment thereof. A "FGF21 downstream biomarker," as used herein, is a gene or gene product, or measurable indicia of a gene or gene product. In some aspects, a gene or activity that is a downstream marker of FGF21 exhibits an altered level of expression, or in a vascular tissue. In some aspects, an activity of the downstream marker is altered in the presence of an FGF21 modulator. In some aspects, the downstream markers exhibit altered levels of expression when FGF21 is perturbed with an FGF2I modulator. FGF21 downstream markers include, without limitation, glucose or 2-deoxy-glucose uptake, pERK and other phosphorylated or acetylated proteins or NAD levels.

Pharmaceutical Compositions and Formulations

In specific aspects, provided herein are pharmaceutical compositions comprising an FGF21 protein variants, for example FGF21 protein variants described in Table 1, e.g., V103 (SEQ ID NO: 11), for use in methods of treating, preventing, and/or managing metabolic or cardiovascular disorders, for example hypertriglyceridemia and cardiac risk, insulin resistance such as patients with genetic mutations of insulin receptor and lipodystrophy, diabetes, obesity, and nonalcoholic fatty liver disease (NAFLD)/nonalcoholic steatohepatitis (NASH).

Pharmaceutical compositions described herein can comprise a therapeutically effective amount of an FGF21 protein variant and a pharmaceutically or physiologically acceptable carrier. The carrier is generally selected to be suitable for the intended mode of administration and can include agents for modifying, maintaining, or preserving, for example, the pH, osmolarity, viscosity, clarity, color, isotonicity, odor, sterility, stability, rate of dissolution or release, adsorption, and/or penetration of the composition. Typically, these carriers include aqueous or alcoholic/aqueous solutions, emulsions or suspensions, including saline and/or buffered media.

Suitable agents for inclusion in the pharmaceutical compositions include, but are not limited to, amino acids (such as glycine, glutamine, asparagine, arginine, histidine, or lysine), antimicrobials, antioxidants (such as ascorbic acid, sodium sulfite, or sodium hydrogen-sulfite), buffers (such as borate, bicarbonate, Tris-HCl, citrates, phosphates, or other organic acids), bulking agents (such as mannitol or glycine), chelating agents (such as ethylenediamine tetraacetic acid (EDTA)), complexing agents (such as caffeine, polyvinylpyrrolidone, beta-cyclodextrin, or hydroxypropyl-beta-cyclodextrin), fillers, monosaccharides, disaccharides, and other carbohydrates (such as glucose, mannose, or dextrins), proteins (such as free serum albumin, gelatin, or immunoglobulins), coloring, flavoring and diluting agents, emulsifying agents, hydrophilic polymers (such as polyvinylpyrrolidone), low molecular weight polypeptides, salt-forming counterions (such as sodium), preservatives (such as benzalkonium chloride, benzoic acid, salicylic acid, thimerosal, phenethyl alcohol, methylparaben, propylparaben, chlorhexidine, sorbic acid, or hydrogen peroxide), solvents (such as glycerin, propylene glycol, or polyethylene glycol), sugar alcohols (such as mannitol or sorbitol), suspending agents, surfactants or wetting agents (such as pluronics; PEG; sorbitan esters; polysorbates such as Polysorbate 20 or Polysorbate 80; Triton; tromethamine; lecithin; cholesterol or tyloxapal), stability enhancing agents (such as sucrose or sorbitol), tonicity enhancing agents (such as alkali metal halides, such as sodium or potassium chloride, or mannitol sorbitol), delivery vehicles, diluents, excipients and/or pharmaceutical adjuvants Parenteral vehicles include sodium chloride solution, Ringer's dextrose, dextrose and sodium chloride and lactated Ringer's. Suitable physiologically-acceptable thickeners such as carboxymethylcellulose, polyvinylpyrrolidone, gelatin and alginates may be included. Intravenous vehicles include fluid and nutrient replenishers and electrolyte replenishers, such as those based on Ringer's dextrose. In some cases, it will be preferable to include agents to adjust tonicity of the composition, for example, sugars, polyalcohols such as mannitol, sorbitol, or sodium chloride in a pharmaceutical composition. For example, in many cases it is desirable that the composition is substantially isotonic. Preservatives and other additives, such as antimicrobials, antioxidants, chelating agents and inert gases, may also be present. The precise formulation will depend on the route of administration. Additional relevant principle, methods and components for pharmaceutical formulations are well known. (See, e.g., Allen, Loyd V. Ed, (2012) Remington's Pharmaceutical Sciences, 22th Edition, which is incorporated by reference for this purpose)

When parenteral administration is contemplated, the pharmaceutical compositions are usually in the form of a sterile, pyrogen-free, parenterally acceptable composition. A particularly suitable vehicle for parenteral injection is a sterile, isotonic solution, properly preserved. The pharmaceutical composition can be in the form of a lyophilizate, such as a lyophilized cake.

In certain aspects, a pharmaceutical composition provided herein (e.g., a composition comprising FGF21 protein variant V103) is for subcutaneous administration. Suitable formulation components and methods for subcutaneous administration of polypeptide therapeutics (e.g., antibodies, fusion proteins and the like) are known in the art. See, e.g., Published United States Patent Application No 2011/0044977 and U.S. Pat. Nos. 8,465,739 and 8,476,239, each of which is incorporated by reference for this purpose. Typically, pharmaceutical compositions for subcutaneous administration contain suitable stabilizers (e.g., amino acids, such as methionine, and or saccharides such as sucrose), buffering agents, and/or tonicifying agents.

In specific aspects, provided herein is a pharmaceutical composition comprising an FGF21 protein variant (for example, an FGF21 protein variant set forth in Table 1 such as V103) as a lyophilisate. In particular aspects, a pharmaceutical composition provided herein comprising an FGF21 protein variant (for example, an FGF21 protein variant set forth in Table 1 such as V103) as a lyophilized formulation is reconstituted as a solution prior to administration (e.g., subcutaneous administration) to a subject.

In particular aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising 100 mg/mL of the FGF21 protein variant such as V103. In some aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising at least about 50 mg/mL, 60 mg/mL, 70 mg/mL, 80 mg/mL, 90 mg/mL, 100 mg/mL, 110 mg/mL, 120 mg/mL, 130 mg/mL, 140 mg/mL, or 150 mg/mL of the FGF21 protein variant such as V103. In some aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising about 50 mg/mL to 150 mg/mL or 100 mg/mL to 150 mg/mL of the FGF21 protein variant such as V103. In one aspect, a pharmaceutical composition provided herein comprising an FGF21 protein variant (for example, an FGF21 protein variant set forth in Table 1 such as V103) is in the form of a solution (e.g., after reconstitution of a lyophilisate) comprising about 75 mg/mL to 150 mg/mL of V103, for example 100 mg/mL V103 (SEQ ID NO: 11).

In some aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising trometamol buffer, for example, at a concentration of 10 mM, 20 mM, 30 mM, 40 mM, or 50 mM trometamol buffer. In some aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising trometamol buffer, for example, at a concentration of 10 mM to 50 mM trometamol buffer, for example 30 mM trometamol buffer.

In some aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising sucrose, for example, at least about 200 mM, 210 mM, 220 mM, 230 mM, 240 mM, 250 mM, 260 mM, 270 mM, 280 mM, 290 mM, or 300 mM sucrose. In some aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising sucrose, for example, at least about 250 mM to 300 mM sucrose, for example 270 mM.

In some aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising Polysorbate, such as Polysorbate 20. In specific aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising at least about 0.01%, 0.02%, 0.03%, 0.04%, 0.05%, 0.06%, 0.07%, 0.08%, 0.09%, or 0.10% Polysorbate 20. In specific aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising 0.02% to 0.10% Polysorbate 20, for example 0.06% Polysorbate 20.

In some aspects, a pharmaceutical composition provided herein comprising an FGF21 protein variant (for example, an FGF21 protein variant set forth in Table 1 such as V103) is in the form of a solution (e.g., after reconstitution of a lyophilisate) at a pH in the range of 6.5 to 9, for example a pH of 8.0. In some aspects, a pharmaceutical composition provided herein comprising an FGF21 protein variant (for example, an FGF21 protein variant set forth in Table 1 such as V103) is in the form of a solution (e.g., after reconstitution of a lyophilisate) at a pH of at least about 6.0, 6.5, 7.0, 7.5, 8.0, 8.5, 9.0 or 9.5.

In some aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising trometamol buffer, sucrose, and Polysorbate 20.

In particular aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising about 80 mg/mL to 100 mg/mL of the FGF21 protein variant such as V103 (SEQ ID NO: 11), about 30 mM of trometamol buffer, 270 mM sucrose, and 0.06% Polysorbate 20, at pH 7.5 to 8.5, for example pH 8.0.

In particular aspects, a pharmaceutical composition provided herein comprising an FGF21 protein variant (for example, an FGF21 protein variant set forth in Table 1 such as V103) is in the form of a solution (e.g., after reconstitution of a lyophilisate) comprising about 100 mg/mL of the FGF21 protein variant such as V103 (SEQ ID NO: 11), about 30 mM of trometamol buffer, 270 mM sucrose, and 0.06% Polysorbate 20, at pH 8.0.

In certain aspects, provided herein is a method of preparing a pharmaceutical composition comprising an FGF21 protein variant (for example, an FGF21 protein variant set forth in Table 1 such as V103), said method comprises formulating the FGF21 protein variant as a lyophilisate suitable for reconstitution into a solution.

In certain aspects, provided herein is a method of preparing a pharmaceutical composition comprising an FGF21 protein variant (for example, an FGF21 protein variant set forth in Table 1 such as V103), said method comprises reconstituting a lyophilisate into a solution described herein, for example, a solution comprising up to about 100 mg/mL (e.g., about 50 mg/mL to about 100 mg/mL of the FGF21 protein variant such as V103 (SEQ ID NO: 11), about 30 mM of trometamol buffer, 270 mM sucrose, and 0.06% Polysorbate 20, at pH 8.0.

In certain aspects, provided herein is a method of preparing a pharmaceutical composition comprising an FGF21 protein variant (for example, an FGF21 protein variant set forth in Table 1 such as V103), said method comprises preparing a solution comprising about 100 mg/mL of the FGF21 protein variant such as V103 (SEQ ID NO: 11), about 30 mM of trometamol buffer, 270 mM sucrose, and 0.06% Polysorbate 20, at pH 8.0.

In a particular aspect, a method of preparing a pharmaceutical composition described herein comprises the step of diluting a solution containing an FGF21 protein variant (for example, an FGF21 protein variant set forth in Table 1 such as V103), to a concentration in the range of 10 mg/mL to 90 mg/mL. In a specific aspect, the solution is diluted with saline solution, for example, 0.9% saline solution.

EXAMPLES

The following examples are intended to illustrate the invention and are not to be construed as being limitations thereon. Abbreviations are used as is conventional in the art.

Example 1

An Fc-FGF21 variant fusion protein, e.g., V103 comprising SEQ ID NO: 11, has been described, see, e.g., PCT Publication No. WO2013/049247. For example, V103 has been reported to induce 2-deoxyglucose update by mouse 3T3L1 adipocytes, to induce ERK signaling in cell-based ERK phosphorylation assays, and to reduce total plasma glucose, plasma insulin, and body weight in ob/ob mice (mice lacking functional leptin as a mouse model for type 2 diabetes). V103 has also been reported to have a longer half-life and to be more thermodynamically stable, for example as assessed by melting temperature.

The PK characteristics of V103 in cynomolgus monkeys have been determined in a 2-dose IV and SC injection toxicity study with a 4-week recovery period and in a 13-week IV and SC injection toxicity study with a 13-week recovery period, respectively.

Pharmacokinetics of V103 was similar in both studies, with no apparent gender differences. A moderate accumulation of V103 was observed in 13-week GLP toxicity study (accumulation index 1.15-2.36 across the four dose groups, as measured by Cmax and AUC 0-7 d after the first and last dose).

Exposures to V103 (Cmax and AUC) increased approximately dose-proportionally over the dose range of 0.3-100 mg/kg. Pharmacokinetics following intravenous was bi-exponential, with a linear terminal elimination phase. V103 was absorbed slowly after subcutaneous administration (100 mg/kg) and the maximum exposure was observed 1-4 days after the SC administration. The terminal elimination phase was not absorption limited and estimated subcutaneous bioavailability was 60-90%. Table 2 below summarizes the mean toxicokinetic parameters calculated for the penultimate (Day 8.5) and the ultimate dose (Day 92) of the 13-week GLP-compliant toxicology study.

TABLE 2

Mean TK parameters obtained for the penultimate (Day 85) and the ultimate dose (Day 92) of the 13-week GLP-compliant toxicity study in cynomolgus monkey

| Study day | TK parameter | Group 2 0.3 mg/kg iv Mean | ± SD | Group 3 3.0 mg/kg iv Mean | ± SD | Group 4 30 mg/kg iv Mean | ± SD | Group 5 30 mg/kg sc Mean | ± SD |
|---|---|---|---|---|---|---|---|---|---|
| 85 | Tmax (h) | 0.25 | 0.00 | 5.50 | 9.58 | 1.54 | 3.16 | 22.7 | 12.6 |
| 85 | Cmax (µg/mL) | 20.7 | 4.20 | 231 | 87.0 | 2290 | 1110 | 1440 | 257 |
| 85 | Cmax/Dose | 69.0 | 14.0 | 76.9 | 28.9 | 76.4 | 37.0 | 48.1 | 8.55 |
| 85 | AUC0-7 d | 1990 | 408 | 19200 | 6680 | 189000 | 96100 | 186000 | 31200 |
| 85 | AUC0-7 d/Dose | 6630 | 1360 | 6390 | 2230 | 6300 | 3190 | 6190 | 1040 |
| 92 | Tmax (h) | | | | | 2.19 | 3.88 | 48.0 | 27.7 |
| 92 | Cmax (µg/mL) | | | | | 2020 | 256 | 1190 | 158 |

TABLE 2-continued

Mean TK parameters obtained for the penultimate (Day 85) and the ultimate dose (Day 92) of the 13-week GLP-compliant toxicity study in cynomolgus monkey

| Study day | TK parameter | Group 2 0.3 mg/kg iv Mean ± SD | | Group 3 3.0 mg/kg iv Mean ± SD | | Group 4 30 mg/kg iv Mean ± SD | | Group 5 30 mg/kg sc Mean ± SD | |
|---|---|---|---|---|---|---|---|---|---|
| 92 | Cmax/Dose | | | | | 67.3 | 8.52 | 39.5 | 5.25 |
| 92 | AUC0-7 d | | | | | 189000 | 6920 | 154000 | 33300 |
| 92 | AUC0-7 d/Dose | | | | | 6310 | 231 | 5140 | 1110 |

Day 85, n = 6 animals per main group 0.3, 3.0, 30 mg/kg iv and 30 mg/kg sc V103. Day 92, n = 4 animals per recovery group 30 mg/kg iv and 30 mg/kg sc V103.
Cmax/Dose ((μg/mL)/(mg/kg)); AUC0-7 d (μg × h/mL); AUC0-7 d/Dose ((μg × h/mL)/(mg/kg))
The GLP validated MSD-based PK assay used for determination of V103 concentrations in cynomolgus monkey serum quantifies the bioactive but partially also the truncated/inactive forms of V103.

In agreement with the rat pharmacokinetics, HPLC-MS/MS assessments confirmed that in vivo in cynomolgus monkeys, the central part of FGF21 subdomain of V103 is more stable ($T_{1/2}$~9-12 days) than the C-terminal subdomain, required for FGF21 receptor binding and activity ($T_{1/2}$~5-8 days). Table 3 below summarizes the pharmacokinetic properties of bioactive and truncated/inactive forms of V103 determined in the 13-week GLP-compliant toxicology study.

TABLE 3

In-vivo integrity of V103 following weekly IV and SC administration in the 13-week GLP-compliant toxicity study in cynomolgus monkeys

| | TK parameter | V103[a] | V103 (C-terminal peptide of FGF21)[b] | V103 (Central peptide of FGF21)[b] |
|---|---|---|---|---|
| Group 5 30 mg/kg SC | AUC* | 423000 | 224000 | 483000 |
| | T1/2 (Days) | 10.0 | 8.2 | 12.3 |

TK parameters were calculated from the mean TK-profiles after the last dose (Day 92)
*AUC0-90 days (μg × h/mL)
[a]as measured by the MSD-based assay
[b]as measured by the LC-MS/MS-based assay Anti-V103 antibodies (ADAs) were observed in a number of animals. In most cases, the treatment-related ADA response was associated with an accelerated clearance of V103, however, the overall impact on total and sustained exposure to V103 in these studies was minimal. Selectivity of ADA response was assessed during the 13-week GLP toxicity study and none of the ADA positive samples was cross-reactive with the endogenous wild-type FGF21.

Example 2

The clinical study purpose is to evaluate the safety and tolerability of multiple doses of V103 administered subcutaneously over 3 months in obese subjects. In addition, the study will also determine early efficacy signals in various metabolic diseases associated with elevated triglycerides and/or obesity, and whether V103 displays the clinical safety and efficacy profile as a therapeutic suitable for development in the metabolic diseases of hypertriglyceridemia, obesity, and/or non-alcoholic fatty liver disease.

Objectives and Endpoints

The primary objective(s) is to assess the safety and tolerability in obese subjects following repeated dosing of V103 by subcutaneous (SC) injection over 12 weeks. Endpoints related to this objective include:

Adverse events (AE)
Vital signs
Liver function tests aspartate transaminase (AST), alanine transaminase (ALT), total bilirubin (Total Bili) and alkaline phosphatase (ALP)
24 hour urinary cortisol
Electrolytes Secondary objectives include:
To assess the effects of V103 on triglycerides and lipid profiles at 12 weeks of treatment.
To assess the potential effects of V103 on bone biomarkers of resorption, bone formation and balance of resorption to deposition at 12 weeks of treatment.
To assess the effects of V103 on weight as measured by body weight, body mass index (BMI) and waist circumference at 12 weeks.

Endpoints related to these objectives include:
Total cholesterol, LDL-C, HDL-C and Triglyceride (fasting) at 12 weeks
Biomarkers of bone resorption (serum CTX-1, urine NTX-1) at 12 weeks
and Biomarkers bone formation (serum BSAP, P1NP, and osteocalcin) at 12 weeks
Weight, Body mass index (BMI), waist circumference, and percent liver fat fraction as measured by MRI at 12 weeks Other study objectives include:
To assess pharmacokinetics (PK) of V103 in obese subjects following repeated dosing over 12 weeks.
To assess immunogenicity of V103 after repeat SC dosing of V103.
To assess the potential glycemic metabolic effects of V103.

Non-limiting examples of endpoints related to these other study objectives include:
PK parameters will be determined, including: AUClast, Cmax, and Tmax;
Fasting glucose, insulin, glucagon, and C-peptide, and derived estimates of insulin sensitivity and secretion (HOMA) up to 12 weeks;
HbA1c, glycated albumin;
Adiponectin; and
Pre and post-dose anti-drug antibodies (ADAs) over 26 weeks.

Study Design:
The study is designed as a non-confirmatory, multicenter, randomized, investigator- and subject-blinded, placebo-controlled safety study in obese subjects with V103 or placebo administered subcutaneously with repeated dosing over 3 months.

Approximately 60 subjects will be randomized (1:1, active:placebo) to receive V103 300 mg q 4 weeks for three doses by subcutaneous (SC) injection, or a matching placebo.

The trial consists of three main periods: (1) screening, which will last ranging from 1 to 4 weeks, (2) a subject- and investigator-blinded randomized treatment period, projected to last 12 weeks, and (3) an end-of-study evaluation, about 120 days (approximately 6 half-lives) after last dose of study drug.

Cohort expansion: After interim analysis (e.g., after approximately 15 subjects in each group reached the end of treatment (Day 84)), a lower dose cohort may be evaluated if there is evidence of efficacy and a need to evaluate additional doses to inform future studies prior to population expansion.

Population:

The study population will be comprised of approximately 60 adult male and female obese subjects 18 to 55 years of age (inclusive).

Key Inclusion criteria:
Male and female subjects 18 to 55 years of age inclusive;
Body mass index (BMI) within the range of 30 to 45 kg/m², inclusive, with ethnic adjustment ≥27.5 for Asian individuals (WHO Expert Consultation, 2004, Lancet, 363(9403):157-63); BMI=Body weight (kg)/ Height (m)] 2, inclusive; and
Triglyceride 150-500 mg/dL (1.69-5.65 mmol/L), inclusive, at screening.

Key Exclusion criteria:
History of hepatobilliary disease, cholelithiasis, or biliary sludge by history or at screening ultrasound, hepatic encephalopathy, esophageal varices, or porticaval shunt;
Liver disease or liver injury as indicated by abnormal liver function tests (ALT, AST, GGT, alkaline phosphatase, or serum bilirubin) above upper limit of normal at screening or baseline;
Chronic infection with Human Immunodeficiency Virus (HIV), Hepatitis B (HBV) or Hepatitis C (HCV). A positive HBV surface antigen (HBsAg) test, or if standard local practice, a positive HBV core antigen test, excludes a subject. Subjects with a positive HCV antibody test should have HCV RNA levels measured. Subjects with positive (detectable) HCV RNA should be excluded;
Fasting triglycerides greater than or equal to 500 mg/dL [5.65 mmol/L], or concomitant use of drug treatment for hypertriglyceridemia (fibrates, omega-3 fatty acids, nicotinic acid);
History of pancreatic injury or pancreatitis, or other pancreatic disease. Amylase or lipase above ULN at screening or baseline;
History of hypersensitivity to drugs of similar biological class, FGF21 protein analogue, or Fc fusion proteins;
History of bone disorders including but not limited to osteoporosis, osteopenia, osteomalacia, severe vitamin D deficiency;
Plasma 25-hydroxyvitamin D level is below the lower limit of the normal range at screening;
Contraindications to MRI;
Change in body weight (more than 5% self-reported OR 5 kg self-reported change during the previous 3 months);
Use of weight loss drugs: Orlistat (Xenical, Alli), lorcaserin (Belviq), phentermine-topiramate (Qsymia), naltrexone-bupropion (Contrave), or liraglutide (Victoza or Saxenda) or other glucagon-like peptide-1 (GLP1) receptor agonists (exenatide (Byetta/Bydureon), lixisenatide (Luxumia), albiglutide (Tanzeum) or dulaglutide (Trulicity) or others); and
Enrollment in a diet, weight loss or exercise programs with the specific intent of losing weight, within 3 months prior to randomization, OR clinical diagnosis of any eating disorder is also an exclusion.

Pharmacokinetic assessments: Cmax, Tmax, Clast, Tlast, AUClast, AUCtau, AUCinf, T½, Vz/F and CL/F from the serum concentration-time data, if feasible Efficacy/PD assessments:
Fasting triglycerides
Body weight
Key safety assessments
Adverse event and Serious adverse event monitoring
Bone biomarkers
Liver function
Ultrasound
Pancreatic function
Pituitary-adrenal function
Other pituitary-endocrine safety monitoring
Physical examinations and vital signs
Monitoring of routine laboratory markers in blood and urine
Electrocardiogram
Columbia-Suicide Severity Rating Scale (C-SSRS)
Mechanistic biomarkers and biomarkers of inflammation Additional Embodiments In one aspect, provided herein is a method of treating, preventing, or managing a metabolic disorder or a cardiovascular disorder, comprising administering to a subject in need thereof a human FGF21 protein variant at a dose in the range of 100 mg to 600 mg.

In another aspect, provided herein is a method of treating, preventing, or managing hypercholesterolemia, mixed dyslipidemia, or hypertriglyceridemia, comprising administering to a subject in need thereof a human FGF21 protein variant at a dose in the range of 100 mg to 600 mg.

In another aspect, provided herein is a method of reducing body weight, comprising administering to a subject in need thereof of a human FGF21 protein variant at a dose in the range of 100 mg to 600 mg.

In another aspect, provided herein is a method of reducing elevated LDL-C, total-C, triglyceride, and/or Apo B, comprising administering to a subject in need thereof a human FGF21 protein variant at a dose in the range of 100 mg to 600 mg.

In another aspect, provided herein is a method of increasing HDL-C, comprising administering to a subject in need thereof a human FGF21 protein variant at a dose in the range of 100 mg to 600 mg.

In another aspect, provided herein is a method of reducing triglyceride levels, comprising administering to a subject in need thereof a human FGF21 protein variant at a dose in the range of 100 mg to 600 mg.

In another aspect, provided herein is a method of reducing cardiovascular risk, comprising administering to a subject in need thereof a human FGF21 protein variant at a dose in the range of 100 mg to 600 mg.

In one aspect, provided herein is a human FGF21 protein variant for use in a method of treating, preventing, or managing a metabolic disorder or a cardiovascular disorder, said method comprising administering to a subject in need thereof the human FGF21 protein variant at a dose in the range of 100 mg to 600 mg.

In one aspect, provided herein is a human FGF21 protein variant for use in a method of treating, preventing, or managing hypercholesterolemia, mixed dyslipidemia, or hypertriglyceridemia, said method comprising administering to a subject in need thereof the human FGF21 protein variant at a dose in the range of 100 mg to 600 mg.

In one aspect, provided herein is a human FGF21 protein variant for use in a method of reducing body weight, said method comprising administering to a subject in need thereof of the human FGF21 protein variant at a dose in the range of 100 mg to 600 mg.

In one aspect, provided herein is a human FGF21 protein variant for use in a method of reducing elevated LDL-C, total-C, triglyceride, and/or Apo B, comprising administering to a subject in need thereof the human FGF21 protein variant at a dose in the range of 100 mg to 600 mg.

In one aspect, provided herein is a human FGF21 protein variant for use in a method of increasing HDL-C, said method comprising administering to a subject in need thereof the human FGF21 protein variant at a dose in the range of 100 mg to 600 mg.

In one aspect, provided herein is a human FGF21 protein variant for use in a method of reducing triglyceride levels, said method comprising administering to a subject in need thereof the human FGF21 protein variant at a dose in the range of 100 mg to 600 mg.

In one aspect, provided herein is a human FGF21 protein variant for use in a method of reducing cardiovascular risk, said method comprising administering to a subject in need thereof the human FGF21 protein variant at a dose in the range of 100 mg to 600 mg.

In one aspect, provided herein is a use of a human FGF21 protein variant in the preparation of a medicament for use in a method of treating, preventing, or managing a metabolic disorder or a cardiovascular disorder, said method comprising administering to a subject in need thereof the human FGF21 protein variant at a dose in the range of 100 mg to 600 mg.

In one aspect, provided herein is a use of a human FGF21 protein variant in the preparation of a medicament for use in a method of treating, preventing, or managing hypercholesterolemia, mixed dyslipidemia, or hypertriglyceridemia, said method comprising administering to a subject in need thereof the human FGF21 protein variant at a dose in the range of 100 mg to 600 mg.

In one aspect, provided herein is a use of a human FGF21 protein variant in the preparation of a medicament for use in a method of reducing body weight, said method comprising administering to a subject in need thereof of the human FGF21 protein variant at a dose in the range of 100 mg to 600 mg.

In one aspect, provided herein is a use of a human FGF21 protein variant in the preparation of a medicament for use in a method of reducing elevated LDL-C, total-C, triglyceride, and/or Apo B, comprising administering to a subject in need thereof the human FGF21 protein variant at a dose in the range of 100 mg to 600 mg.

In one aspect, provided herein is a use of a human FGF21 protein variant in the preparation of a medicament for use in a method of increasing HDL-C, said method comprising administering to a subject in need thereof the human FGF21 protein variant at a dose in the range of 100 mg to 600 mg.

In one aspect, provided herein is a use of a human FGF21 protein variant in the preparation of a medicament for use in a method of reducing triglyceride levels, said method comprising administering to a subject in need thereof the human FGF21 protein variant at a dose in the range of 100 mg to 600 mg.

In one aspect, provided herein is a use of a human FGF21 protein variant in the preparation of a medicament for use in a method of reducing cardiovascular risk, said method comprising administering to a subject in need thereof the human FGF21 protein variant at a dose in the range of 100 mg to 600 mg.

In one aspect, provided herein is a use of a human FGF21 protein variant in the preparation of a medicament for use in a method of reducing cardiovascular risk, said method comprising administering to a subject in need thereof the human FGF21 protein variant at a dose in the range of 100 mg to 600 mg.

In one aspect, provided herein is a use of a human FGF21 protein variant at an amount in the range of 100 mg to 600 mg in the preparation of a medicament for use in a method of treating, preventing, or managing a metabolic disorder or a cardiovascular disorder.

In one aspect, provided herein is a use of a human FGF21 protein variant at an amount in the range of 100 mg to 600 mg in the preparation of a medicament for use in a method of treating, preventing, or managing hypercholesterolemia, mixed dyslipidemia, or hypertriglyceridemia.

In one aspect, provided herein is a use of a human FGF21 protein variant at an amount in the range of 100 mg to 600 mg in the preparation of a medicament for use in a method of reducing body weight.

In one aspect, provided herein is a use of a human FGF21 protein variant at an amount in the range of 100 mg to 600 mg in the preparation of a medicament for use in a method of reducing elevated LDL-C, total-C, triglyceride, and/or Apo B.

In one aspect, provided herein is a use of a human FGF21 protein variant at an amount in the range of 100 mg to 600 mg in the preparation of a medicament for use in a method of increasing HDL-C.

In one aspect, provided herein is a use of a human FGF21 protein variant at an amount in the range of 100 mg to 600 mg in the preparation of a medicament for use in a method of reducing triglyceride levels.

In one embodiment, the method reduces triglyceride levels by at least about 40% or at least about 50%.

In one aspect, provided herein is a use of a human FGF21 protein variant at an amount in the range of 100 mg to 600 mg in the preparation of a medicament for use in a method of reducing cardiovascular risk.

In one aspect, provided herein is a use of a human FGF21 protein variant at an amount in the range of 100 mg to 600 mg in the manufacture of a medicament for use in treating, preventing, or managing a metabolic disorder or a cardiovascular disorder.

In one aspect, provided herein is a use of a human FGF21 protein variant at an amount in the range of 100 mg to 600 mg in the manufacture of a medicament for use in treating, preventing, or managing hypercholesterolemia, mixed dyslipidemia, or hypertriglyceridemia.

In one aspect, provided herein is a use of a human FGF21 protein variant at an amount in the range of 100 mg to 600 mg in the manufacture of a medicament for use in reducing body weight.

In one aspect, provided herein is a use of a human FGF21 protein variant at an amount in the range of 100 mg to 600 mg in the manufacture of a medicament for use in reducing elevated LDL-C, total-C, triglyceride, and/or Apo B.

In one aspect, provided herein is a use of a human FGF21 protein variant at an amount in the range of 100 mg to 600 mg in the manufacture of a medicament for use in increasing HDL-C.

In one aspect, provided herein is a use of a human FGF21 protein variant at an amount in the range of 100 mg to 600 mg in the manufacture of a medicament for use in reducing triglyceride levels.

In one embodiment, the method reduces triglyceride levels by at least about 40% or at least about 50%.

In one aspect, provided herein is a use of a human FGF21 protein variant at an amount in the range of 100 mg to 600 mg in the manufacture of a medicament for use in reducing cardiovascular risk.

In one aspect, provided herein is a use of a human FGF21 protein variant in the manufacture of a medicament for the treatment of a metabolic disorder or a cardiovascular disorder, wherein the unit dose of the human FGF21 protein variant is in the range of 100 mg to 600 mg.

In one aspect, provided herein is a use of a human FGF21 protein variant in the manufacture of a medicament for the treatment of hypercholesterolemia, mixed dyslipidemia, or hypertriglyceridemia, wherein the unit dose of the human FGF21 protein variant is in the range of 100 mg to 600 mg.

In one aspect, provided herein is a use of a human FGF21 protein variant in the manufacture of a medicament for use in reducing body weight, wherein the unit dose of the human FGF21 protein variant is in the range of 100 mg to 600 mg.

In one aspect, provided herein is a use of a human FGF21 protein variant in the manufacture of a medicament for use in reducing LDL-C, total-C, triglyceride, and/or Apo B levels, wherein the unit dose of the human FGF21 protein variant is in the range of 100 mg to 600 mg.

In one aspect, provided herein is a use of a human FGF21 protein variant in the manufacture of a medicament for use in a method of increasing HDL-C, wherein the unit dose of the human FGF21 protein variant is in the range of 100 mg to 600 mg.

In one aspect, provided herein is a use of a human FGF21 protein variant in the manufacture of a medicament for use in reducing triglyceride levels, wherein the unit dose of the human FGF21 protein variant is in the range of 100 mg to 600 mg.

In one aspect, provided herein is a use of a human FGF21 protein variant in the manufacture of a medicament for use in a method of reducing cardiovascular risk, wherein the unit dose of the human FGF21 protein variant is in the range of 100 mg to 600 mg.

In one aspect, provided herein is a human FGF21 protein variant for use in a method of treating, preventing, or managing a metabolic disorder or a cardiovascular disorder in a human subject, wherein the human FGF21 protein variant is provided for administration at a dose in the range of 100 mg to 600 mg. In one aspect, provided herein is a human FGF21 protein variant for use in a method of treating, preventing, or managing a metabolic disorder or a cardiovascular disorder in a human subject, wherein the human FGF21 protein variant is provided for administration at an amount in the range of 100 mg to 600 mg.

In some embodiments of these aspects, the metabolic disorder or cardiovascular disorder is selected from hypercholesterolemia, dyslipidemia, hypertriglyceridemia, nonalcoholic fatty liver disease (NAFLD), nonalcoholic steatohepatitis (NASH), type 2 diabetes, and obesity.

In some embodiments of these aspects, treating, preventing, or managing the metabolic disorder or cardiovascular disorder comprises or is characterized by reducing one or more of the following: body weight, liver fat content, elevated LDL-C, total-C, triglyceride, and Apo B levels in the subject. In certain embodiments, treating, preventing, or managing the metabolic disorder or cardiovascular disorder comprises or is characterized by increasing HDL-C levels in the subject.

In some embodiments of these aspects, treating, preventing, or managing the metabolic disorder or cardiovascular disorder comprises or is characterized by reducing triglyceride levels in the subject by at least about 40% or at least about 50%. In some embodiments, treating, preventing, or managing the metabolic disorder or cardiovascular disorder comprises or is characterized by reducing triglyceride levels in the subject by at least about 40%. In some embodiments, treating, preventing, or managing the metabolic disorder or cardiovascular disorder comprises or is characterized by reducing triglyceride levels in the subject by at least about 50%.

In some embodiments of these aspects, treating, preventing, or managing the metabolic disorder or cardiovascular disorder comprises or is characterized by reducing cardiovascular risk in the subject.

In some embodiments of these aspects, the metabolic disorder or cardiovascular disorder is dyslipidemia, optionally mixed dyslipidemia, hypertriglyceridemia, optionally severe hypertriglyceridemia, or hypercholesterolemia, optionally primary hypercholesterolemia. In some embodiments, the metabolic disorder or cardiovascular disorder is nonalcoholic fatty liver disease (NAFLD) or nonalcoholic steatohepatitis (NASH). In certain embodiments, the subject is 18 to 55 years of age. In some embodiments, the subject has a body mass index (BMI) within the range of 30 to 45 kg/m$^2$, inclusive, with ethnic adjustment >27.5 for a subject of Asian descent or Asian ancestry. In some embodiments, the subject has a body mass index (BMI) within the range of 30 to 45 kg/m$^2$, inclusive, optionally wherein the BMI is >27.5 for a subject of Asian descent or Asian ancestry. In some embodiments, the subject has triglyceride levels in the range of 150-500 mg/dL (1.69-5.65 mmol/L) when measured prior to administration of the human FGF21 protein variant.

In some embodiments of these aspects, the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1. In certain embodiments, the human FGF21 protein variant comprises the amino acid sequence of SEQ ID NO: 11.

In some embodiments of these aspects, the human FGF21 protein variant is provided for administration at a dose of at least 100 mg, 1.50 mg, 200 mg, 2.50 mg, 300 mg, 350 mg, or 400 mg. In some embodiments, the human FGF21 protein variant is provided for administration at a dose of approximately 100 mg, 110 mg, 120 mg, 130 mg, 140 mg, 150 mg, 160 mg, 170 mg, 180 mg, or 190 mg, optionally wherein the human FGF21 protein variant is provided at a dose of approximately 100 mg or 150 mg. In some embodiments, the human FGF21 protein variant is provided for administration at a dose of approximately 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided at a dose of approximately 200, 250 mg, or 300 mg. In some embodiments, the human FGF21 protein variant is provided for administration at a dose of at least 100 mg. In some embodiments, the human FGF21 protein variant is provided for administration at a dose of approximately 100 mg. In some embodiments, the human FGF21 protein variant is provided for administration at a dose of at least 150 mg. In some embodiments, the human FGF21 protein variant is provided for administration at a dose of approximately 150 mg. In some embodiments, the human FGF21 protein variant is provided for administration at a dose of at least 200 mg. In some embodiments, the human FGF21 protein variant is provided for administration at a dose of approximately 200 mg. In some embodiments, the human FGF21 protein variant is provided for administration at a dose of at least 250 mg. In some embodiments, the human FGF21 protein variant is provided for administration at a dose of approximately 250 mg. In some embodiments, the human FGF21 protein variant is provided for administration at a dose of 250 mg. In some embodiments, the human FGF21 protein variant is provided for administration at a dose of at least 300 mg. In some embodiments, the human FGF21 protein variant is provided for administration at a dose of approximately 300 mg. In some embodiments, the human FGF21 protein variant is provided for administration at a dose of 300 mg.

In some embodiments of these aspects, the human FGF21 protein variant is provided for administration at an amount of at least 100 mg, 150 mg, 200 mg, 250 mg, 300 mg, 350 mg, or 400 mg. In some embodiments, the human FGF21 protein variant is provided for administration at an amount of approximately 100 mg, 110 mg, 120 mg, 130 mg, 140 mg, 150 mg, 160 mg, 170 mg, 180 mg, or 190 mg, optionally wherein the human FGF21 protein variant is provided at a amount of approximately 100 mg or 150 mg. In some embodiments, the human FGF21 protein variant is provided for administration at an amount of approximately 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided at an amount of approximately 200 mg, 2.50 mg, or 300 mg. In some embodiments, the human FGF21 protein variant is provided for administration at an amount of at least 100 mg. In some embodiments, the human FGF21 protein variant is provided for administration at an amount of approximately 100 mg. In some embodiments, the human FGF21 protein variant is provided for administration at an amount of at least 150 mg. In some embodiments, the human FGF21 protein variant is provided for administration at an amount of approximately 150 mg. In some embodiments, the human FGF21 protein variant is provided for administration at an amount of at least 200 mg. In some embodiments, the human FGF21 protein variant is provided for administration at an amount of approximately 200 mg. In some embodiments, the human FGF21 protein variant is provided for administration at an amount of at least 250 mg. In some embodiments, the human FGF21 protein variant is provided for administration at an amount of approximately 250 mg. In some embodiments, the human FGF21 protein variant is provided for administration at an amount of 250 mg. In some embodiments, the human FGF21 protein variant is provided for administration at an amount of at least 300 mg. In some embodiments, the human FGF21 protein variant is provided for administration at an amount of approximately 300 mg. In some embodiments, the human FGF21 protein variant is provided for administration at an amount of 300 mg.

In some embodiments, the human FGF21 protein variant is provided in a form for subcutaneous administration. In some embodiments, the human FGF21 protein variant is provided for administration once a month or once every 4 weeks, once every 3 weeks, once every 2 weeks, or once every week. In some embodiments, the human FGF21 protein variant is provided in a form for administration once a month or once every 4 weeks, once every 3 weeks, once every 2 weeks, or once every week. In some embodiments, the human FGF21 protein variant is provided in a form to be administered subcutaneously.

In one aspect, provided herein is a method of treating, preventing, or managing a metabolic disorder or a cardiovascular disorder in a human subject, wherein the method comprises administering a human FGF21 protein variant at a dose in the range of 100 mg to 600 mg to the subject. In one aspect, provided herein is a method of treating, preventing, or managing a metabolic disorder or a cardiovascular disorder in a human subject, wherein the method comprises administering a human FGF21 protein variant at an amount in the range of 100 mg to 600 mg to the subject.

In some embodiments, the metabolic disorder or cardiovascular disorder is selected from hypercholesterolemia, dyslipidemia, hypertriglyceridemia, nonalcoholic fatty liver disease (NAFLD), nonalcoholic steatohepatitis (NASH), type 2 diabetes, and obesity.

In some embodiments, treating, preventing, or managing the metabolic disorder or cardiovascular disorder comprises or is characterized by reducing one or more of the following: body weight, liver fat content, elevated LDL-C, total-C, triglyceride, and Apo B levels in the subject. In certain embodiments, treating, preventing, or managing the metabolic disorder or cardiovascular disorder comprises or is characterized by increasing HDL-C levels in the subject.

In some embodiments, treating, preventing, or managing the metabolic disorder or cardiovascular disorder comprises or is characterized by reducing triglyceride levels in the subject by at least about 40% or at least about 50%. In some embodiments, treating, preventing, or managing the metabolic disorder or cardiovascular disorder comprises or is characterized by reducing triglyceride levels in the subject by at least about 40%. In some embodiments, treating, preventing, or managing the metabolic disorder or cardiovascular disorder comprises or is characterized by reducing triglyceride levels in the subject by at least about 50%.

In some embodiments, treating, preventing, or managing the metabolic disorder or cardiovascular disorder comprises or is characterized by reducing cardiovascular risk in the subject.

In some embodiments, the metabolic disorder or cardiovascular disorder is dyslipidemia, hypertriglyceridemia, or hypercholesterolemia. In some embodiments, the metabolic disorder or cardiovascular disorder is dyslipidemia. In some embodiments, the metabolic disorder or cardiovascular disorder is hypertriglyceridemia. In some embodiments, the metabolic disorder or cardiovascular disorder is hypercholesterolemia. In some embodiments, the metabolic disorder or cardiovascular disorder is mixed dyslipidemia. In some embodiments, the metabolic disorder or cardiovascular disorder is severe hypertriglyceridemia. In some embodiments, the metabolic disorder or cardiovascular disorder is primary hypercholesterolemia. In some embodiments, the metabolic disorder or cardiovascular disorder is nonalcoholic fatty liver disease (NAFLD) or nonalcoholic steatohepatitis (NASH). In some embodiments, the metabolic disorder or cardiovascular disorder is nonalcoholic fatty liver disease (NAFLD). In some embodiments, the metabolic disorder or cardiovascular disorder is nonalcoholic steatohepatitis (NASH). In certain embodiments, the subject is 18 to 55 years of age. In some embodiments, the subject has a body mass index (BMI) within the range of 30 to 45 kg/m$^2$, inclusive, with ethnic adjustment >27.5 for a subject of Asian descent or Asian ancestry. In some embodiments, the subject has a body mass index (BMI)

In one aspect, provided herein is a human FGF21 protein variant for use in a method of treating, preventing, or managing hypercholesterolemia in a human subject, wherein the human FGF21 protein variant is provided for administration at a dose or an amount in the range of 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided at a dose of approximately 100 mg, 150 mg, 200 mg, 250 mg, or 300 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided at a dose of approximately 100 mg, 150 mg, 200 mg, 250 mg, or 300 mg for administration once per week. In one embodiment thereof, the human FGF21 variant is provided at a dose of approximately 100 mg, 150 mg, 200 mg, 250 mg, or 300 mg for administration once every two weeks. In one embodiment thereof, the human FGF21 variant is provided at a dose of approximately 100 mg, 150 mg, 200 mg, 250 mg, or 300 mg for administration once every three weeks. In one embodiment thereof, the human FGF21 variant is provided at a dose of approximately 100 mg, 150 mg, 200 mg, 250 mg, or 300 mg for administration once every four weeks or once per month.

In one aspect, provided herein is a human FGF21 protein variant for use in a method of treating, preventing, or managing dyslipidemia in a human subject, wherein the human FGF21 protein variant is provided for administration at a dose or an amount in the range of 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided at a dose of approximately 100 mg, 150 mg, 200 mg, 250 mg, or 300 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided at a dose of approximately 100 mg, 1.50 mg, 200 mg, 250 mg, or 300 mg for administration once per week. In one embodiment thereof, the human FGF21 variant is provided at a dose of approximately 100 mg, 150 mg, 200 mg, 250 mg, or 300 mg for administration once every two weeks. In one embodiment thereof, the human FGF21 variant is provided at a dose of approximately 100 mg, 150 mg, 200 mg, 250 mg, or 300 mg for administration once every three weeks. In one embodiment thereof, the human FGF21 variant is provided at a dose of approximately 100 mg, 150 mg, 200 mg, 250 mg, or 300 mg for administration once every four weeks or once per month.

In one aspect, provided herein is a human FGF21 protein variant for use in a method of treating, preventing, or managing hypertriglyceridemia in a human subject, wherein the human FGF21 protein variant is provided for administration at a dose or an amount in the range of 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided at a dose of approximately 100 mg, 150 mg, 200 mg, 250 mg, or 300 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided at a dose of approximately 100 mg, 150 mg, 200 mg, 250 mg, or 300 mg for administration once per week. In one embodiment thereof, the human FGF21 variant is provided at a dose of approximately 100 mg, 1.50 mg, 200 mg, 2.50 mg, or 300 mg for administration once every two weeks. In one embodiment thereof, the human FGF21 variant is provided at a dose of approximately 100 mg, 150 mg, 200 mg, 250 mg, or 300 mg for administration once every three weeks. In one embodiment thereof, the human FGF21 variant is provided at a dose of approximately 100 mg, 150 mg, 200 mg, 250 mg, or 300 mg for administration once every four weeks or once per month.

In one aspect, provided herein is a human FGF21 protein variant for use in a method of treating, preventing, or managing nonalcoholic fatty liver disease (NAFLD) in a human subject, wherein the human FGF21 protein variant is provided for administration at a dose or an amount in the range of 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 3.50 mg, optionally wherein the human FGF21 protein variant is provided at a dose of approximately 100 mg, 150 mg, 200 mg, 250 mg, or 300 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided at a dose of approximately 100 mg, 150 mg, 200 mg, 250 mg, or 300 mg for administration once per week. In one embodiment thereof, the human FGF21 variant is provided at a dose of approximately 100 mg, 150 mg, 200 mg, 250 mg, or 300 mg for administration once every two weeks. In one embodiment thereof, the human FGF21 variant is provided at a dose of approximately 100 mg, 150 mg, 200 mg, 250 mg, or 300 mg for administration once every three weeks. In one embodiment thereof, the human FGF21 variant is provided at a dose of approximately 100 mg, 150 mg, 200 mg, 250 mg, or 300 mg for administration once every four weeks or once per month.

In one aspect, provided herein is a human FGF21 protein variant for use in a method of treating, preventing, or managing nonalcoholic steatohepatitis (NASH) in a human subject, wherein the human FGF21 protein variant is provided for administration at a dose or an amount in the range of 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided at a dose of approximately 100 mg, 150 mg, 200 mg, 2.50 mg, or 300 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided at a dose of approximately 100 mg, 150 mg, 200 mg, 250 mg, or 300 mg for administration once per week. In one embodiment thereof, the human FGF21 variant is provided at a dose of approximately 100 mg, 150 mg, 200 mg, 250 mg, or 300 mg for administration once every two weeks. In one embodiment thereof, the human FGF21 variant is provided at a dose of approximately 100 mg, 150 mg, 200 mg, 250 mg, or 300 mg for administration once every three weeks. In one embodiment thereof, the human FGF21 variant is provided at a dose of approximately 100 mg, 150 mg, 200 mg, 250 mg, or 300 mg for administration once every four weeks or once per month.

In one aspect, provided herein is a human FGF21 protein variant for use in a method of treating, preventing, or managing type 2 diabetes in a human subject, wherein the human FGF21 protein variant is provided for administration at a dose or an amount in the range of 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided at a dose of approximately 100 mg, 150 mg, 200 mg, 250 mg, or 300 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided at a dose of approximately 100 mg, 150 mg, 200 mg, 250 mg, or 300 mg for administration once per week. In one embodiment thereof, the human FGF21 variant is provided at a dose of approximately 100 mg, 150 mg, 200 mg, 250 mg, or 300 mg for administration once every two weeks. In one embodiment thereof, the human FGF21 variant is provided at a dose of approximately 100 mg, 150 mg, 200 mg, 250 mg, or 300 mg for administration once every three weeks. In one embodiment thereof, the human FGF21 variant is provided at a dose of approximately 100 mg, 150 mg, 200 mg, 250 mg, or 300 mg for administration once every four weeks or once per month.

In one aspect, provided herein is a human FGF21 protein variant for use in a method of treating, preventing, or managing obesity in a human subject, wherein the human FGF21 protein variant is provided for administration at a dose or an amount in the range of 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, or 350 mg, optionally wherein the human FGF21 protein variant is provided at a dose of approximately 100 mg, 150 mg, 200 mg, 250 mg, or 300 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided at a dose of approximately 100 mg, 150 mg, 200 mg, 250 mg, or 300 mg for administration once per week. In one embodiment thereof, the human FGF21 variant is provided at a dose of approximately 100 mg, 150 mg, 200 mg, 250 mg, or 300 mg for administration once every two weeks. In one embodiment thereof, the human FGF21 variant is provided at a dose of approximately 100 mg, 150 mg, 200 mg, 250 mg, or 300 mg for administration once every three weeks. In one embodiment thereof, the human FGF21 variant is provided at a dose of approximately 100 mg, 150 mg, 200 mg, 250 mg, or 300 mg for administration once every four weeks or once per month.

In one aspect, provided herein is a human FGF21 protein variant for use in a method of treating, preventing, or managing hypercholesterolemia, dyslipidemia, hypertriglyceridemia, nonalcoholic fatty liver disease (NAFLD), nonalcoholic steatohepatitis (NASH), type 2 diabetes, or obesity in a human subject, wherein the human FGF21 protein variant is provided for administration at a dose or an amount in the range of 100 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided for administration once per week. In one embodiment thereof, the human FGF21 variant is provided for administration once every two weeks. In one embodiment thereof, the human FGF21 variant is provided for administration once every three weeks. In one embodiment thereof, the human FGF21 variant is provided for administration once every four weeks or once per month.

In one aspect, provided herein is a human FGF21 protein variant for use in a method of treating, preventing, or managing hypercholesterolemia, dyslipidemia, hypertriglyceridemia, nonalcoholic fatty liver disease (NAFLD), nonalcoholic steatohepatitis (NASH), type 2 diabetes, or obesity in a human subject, wherein the human FGF21 protein variant is provided for administration at a dose or an amount in the range of 150 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided for administration once per week. In one embodiment thereof, the human FGF21 variant is provided for administration once every two weeks. In one embodiment thereof, the human FGF21 variant is provided for administration once every three weeks. In one embodiment thereof, the human FGF21 variant is provided for administration once every four weeks or once per month.

In one aspect, provided herein is a human FGF21 protein variant for use in a method of treating, preventing, or managing hypercholesterolemia, dyslipidemia, hypertriglyceridemia, nonalcoholic fatty liver disease (NAFLD), nonalcoholic steatohepatitis (NASH), type 2 diabetes, or obesity in a human subject, wherein the human FGF21 protein variant is provided for administration at a dose or an amount in the range of 200 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided for administration once per week. In one embodiment thereof, the human FGF21 variant is provided for administration once every two weeks. In one embodiment thereof, the human FGF21 variant is provided for administration once every three weeks. In one embodiment thereof, the human FGF21 variant is provided for administration once every four weeks or once per month.

In one aspect, provided herein is a human FGF21 protein variant for use in a method of treating, preventing, or managing hypercholesterolemia, dyslipidemia, hypertriglyceridemia, nonalcoholic fatty liver disease (NAFLD), nonalcoholic steatohepatitis (NASH), type 2 diabetes, or obesity in a human subject, wherein the human FGF21 protein variant is provided for administration at a dose or an amount in the range of 250 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided for administration once per week. In one embodiment thereof, the human FGF21 variant is provided for administration once every two weeks. In one embodiment thereof, the human FGF21 variant is provided for administration once every three weeks. In one embodiment thereof, the human FGF21 variant is provided for administration once every four weeks or once per month.

In one aspect, provided herein is a human FGF21 protein variant for use in a method of treating, preventing, or managing nonalcoholic steatohepatitis (NASH) in a human subject, wherein the human FGF21 protein variant is provided for administration at a dose or an amount in the range of 300 mg, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the human FGF21 variant is provided for administration once per week. In one embodiment thereof, the human FGF21 variant is provided for administration once every two weeks. In one embodiment thereof, the human FGF21 variant is provided for administration once every three weeks. In one embodiment thereof, the human FGF21 variant is provided for administration once every four weeks or once per month.

In one aspect, provided herein is a human FGF21 protein variant for use in a method of treating, preventing, or managing hypercholesterolemia, dyslipidemia, hypertriglyceridemia, nonalcoholic fatty liver disease (NAFLD), nonalcoholic steatohepatitis (NASH), type 2 diabetes, or obesity in a human subject, wherein the human FGF21 protein variant is provided for administration at a dose or an amount in the range of 100 mg or 150 mg once per week, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing hypercholesterolemia, dyslipidemia, hypertriglyceridemia, nonalcoholic fatty liver disease (NAFLD), nonalcoholic steatohepatitis (NASH), type 2 diabetes, or obesity in a human subject, wherein the human FGF21 protein variant is provided for administration at a dose or an amount in the range of 150 mg or 200 mg once every two weeks, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11

In one aspect, provided herein is a human FGF21 protein variant for use in a method of treating, preventing, or managing hypercholesterolemia, dyslipidemia, hypertriglyceridemia, nonalcoholic fatty liver disease (NAFLD), nonalcoholic steatohepatitis (NASH), type 2 diabetes, or obesity in a human subject, wherein the human FGF21 protein variant is provided for administration at a dose or an amount in the range of 200 mg or 250 mg once every three weeks, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing hypercholesterolemia, dyslipidemia, hypertriglyceridemia, nonalcoholic fatty liver disease (NAFLD), nonalcoholic steatohepatitis (NASH), type 2 diabetes, or obesity in a human subject, wherein the human FGF21 protein variant is provided for administration at a dose or an amount in the range of 250 mg or 300 mg once every four weeks or once per month, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing hypercholesterolemia in a human subject, wherein the human FGF21 protein variant is provided for administration in combination with one or more additional therapeutically active agents, wherein the one or more additional therapeutically active agents is a SGLT inhibitor selected from the group consisting of dapagliflozin, empagliflozin, canagliflozin, ertugliflozin, sotagliflozin, tofogliflozin, remogliflozin, luseogliflozin, ipragliflozin, atigliflozin, bexagliflozin, henagliflozin, licogliflozin, and a pharmaceutically acceptable salt of any of these, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the SGLT inhibitor is licogliflozin.

In one aspect, provided herein is a human FGF21 protein variant for use in a method of treating, preventing, or managing dyslipidemia in a human subject, wherein the human FGF21 protein variant is provided for administration in combination with one or more additional therapeutically active agents, wherein the one or more additional therapeutically active agents is a SGLT inhibitor selected from the group consisting of dapagliflozin, empagliflozin, canagliflozin, ertugliflozin, sotagliflozin, tofogliflozin, remogliflozin, luscogliflozin, ipragliflozin, atigliflozin, bcxagliflozin, hcnagliflozin, licogliflozin, and a pharmaceutically acceptable salt of any of these, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the SGLT inhibitor is licogliflozin.

In one aspect, provided herein is a human FGF21 protein variant for use in a method of treating, preventing, or managing hypertriglyceridemia in a human subject, wherein the human FGF21 protein variant is provided for administration in combination with one or more additional therapeutically active agents, wherein the one or more additional therapeutically active agents is a SGLT inhibitor selected from the group consisting of dapagliflozin, empagliflozin, canagliflozin, crtugliflozin, sotagliflozin, tofogliflozin, remogliflozin, luseogliflozin, ipragliflozin, atigliflozin, bexagliflozin, henagliflozin, licogliflozin, and a pharmaceutically acceptable salt of any of these, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the SGLT inhibitor is licogliflozin.

In one aspect, provided herein is a human FGF21 protein variant for use in a method of treating, preventing, or managing nonalcoholic fatty liver disease (NAFLD) in a human subject, wherein the human FGF21 protein variant is provided for administration in combination with one or more additional therapeutically active agents, wherein the one or more additional therapeutically active agents is a SGLT inhibitor selected from the group consisting of dapagliflozin, empagliflozin, canagliflozin, ertugliflozin, sotagliflozin, tofogliflozin, remogliflozin, luseogliflozin, ipragliflozin, atigliflozin, bexagliflozin, henagliflozin, licogliflozin, and a pharmaceutically acceptable salt of any of these, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the SGLT inhibitor is licogliflozin.

In one aspect, provided herein is a human FGF21 protein variant for use in a method of treating, preventing, or managing nonalcoholic steatohepatitis (NASH) in a human subject, wherein the human FGF21 protein variant is provided for administration in combination with one or more additional therapeutically active agents, wherein the one or more additional therapeutically active agents is a SGLT inhibitor selected from the group consisting of dapagliflozin, empagliflozin, canagliflozin, ertugliflozin, sotagliflozin, tofogliflozin, remogliflozin, luseogliflozin, ipragliflozin, atigliflozin, bexagliflozin, henagliflozin, licogliflozin, and a pharmaceutically acceptable salt of any of these, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the SGLT inhibitor is licogliflozin.

In one aspect, provided herein is a human FGF21 protein variant for use in a method of treating, preventing, or managing type 2 diabetes in a human subject, wherein the human FGF21 protein variant is provided for administration in combination with one or more additional therapeutically active agents, wherein the one or more additional therapeutically active agents is a SGLT inhibitor selected from the group consisting of dapagliflozin, empagliflozin, canagliflozin, ertugliflozin, sotagliflozin, tofogliflozin, remogliflozin, luseogliflozin, ipragliflozin, atigliflozin, bexagliflozin, henagliflozin, licogliflozin, and a pharmaceutically acceptable salt of any of these, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the SGLT inhibitor is licogliflozin.

In one aspect, provided herein is a human FGF21 protein variant for use in a method of treating, preventing, or managing obesity in a human subject, wherein the human FGF21 protein variant is provided for administration in combination with one or more additional therapeutically active agents, wherein the one or more additional therapeutically active agents is a SGLT inhibitor selected from the group consisting of dapagliflozin, empagliflozin, canagliflozin, ertugliflozin, sotagliflozin, tofogliflozin, remogliflozin, luseogliflozin, ipragliflozin, atigliflozin, bexagliflozin, henagliflozin, licogliflozin, and a pharmaceutically acceptable salt of any of these, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11. In one embodiment thereof, the SGLT inhibitor is licogliflozin.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 100 mg once per week and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF2I protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 100 mg once every two weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 100 mg once every three weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 100 mg once every four weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 150 mg once per week and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 150 mg once every two weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 1.50 mg once every three weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 150 mg once every four weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 200 mg once per week and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 200 mg once every two weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 200 mg once every three weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 200 mg once every four weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 250 mg once per week and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 250 mg once every two weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 250 mg once every three weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 250 mg once every four weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 300 mg once per week and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 300 mg once every two weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 300 mg once every three weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) or nonalcoholic steatohepatitis (NASH), wherein the human FGF21 protein variant is provided for administration at a dose or an amount in the range of 300 mg once every four weeks and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic fatty liver disease (NAFLD) in a human subject, wherein the human FGF21 protein variant is provided for administration in combination with licogliflozin or a pharmaceutically acceptable salt thereof, and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing nonalcoholic steatohepatitis (NASH) in a human subject, wherein the human FGF21 protein variant is provided for administration in combination with licogliflozin or a pharmaceutically acceptable salt thereof, and wherein liver fat content of the subject is reduced to within a manageable range or normal range as determined by a clinician or clinical guidelines or by at least about 5%, 10%, 20%, 30%, 40%, or 50% or more, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing triglyceridemia, wherein the human FGF21 protein variant is provided for administration at a dose or an amount in the range of 100 mg once per week, once every two weeks, once every three weeks, once every four weeks, or once monthly and wherein triglyceride levels in the subject are reduced by at least about 40% or at least about 50%, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing triglyceridemia, wherein the human FGF21 protein variant is provided for administration at a dose or an amount in the range of 150 mg once per week, once every two weeks, once every three weeks, once every four weeks, or once monthly and wherein triglyceride levels in the subject are reduced by at least about 40% or at least about 50%, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing triglyceridemia, wherein the human FGF21 protein variant is provided for administration at a dose or an amount in the range of 200 mg once per week, once every two weeks, once every three weeks, once every four weeks, or once monthly and wherein triglyceride levels in the subject are reduced by at least about 40% or at least about 50%, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing triglyceridemia, wherein the human FGF21 protein variant is provided for administration at a dose or an amount in the range of 250 mg once per week, once every two weeks, once every three weeks, once every four weeks, or once monthly and wherein triglyceride levels in the subject are reduced by at least about 40% or at least about 50%, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

In one aspect, provided herein is a human FGF21 protein variant for use in a method of treating, preventing, or managing triglyceridemia, wherein the human FGF21 protein variant is provided for administration at a dose or an amount in the range of 300 mg once per week, once every two weeks, once every three weeks, once every four weeks, or once monthly and wherein triglyceride levels in the subject are reduced by at least about 40% or at least about 50%, and wherein the human FGF21 variant is a fusion protein comprising a human Fc region fused to a mature human FGF21 protein or a fragment thereof comprising one or more mutations selected from: Q55C, R105K, G148C, K150R, P158S, S195A, P199G, and G202A according to the numbering of SEQ ID NO: 1, optionally wherein the human FGF21 protein variant comprises the amino acid sequence of SEQ ID NO: 11.

Each of the foregoing aspects and embodiments, as well as other elements described herein, may be combined in any manner without limitation.

The invention claimed is:

1. A method of treating a metabolic disorder in a human subject in need thereof comprising:
subcutaneously administering a pharmaceutical composition comprising a human fibroblast growth factor 21 (FGF21) protein variant Fc fusion protein consisting of the amino acid sequence of SEQ ID NO: 11,
at a dose of 300 mg and a frequency of every 4 weeks, wherein the metabolic disorder is selected from nonalcoholic steatohepatitis (NASH) and nonalcoholic fatty liver disease (NAFLD).

2. The method of claim 1, wherein the metabolic disorder is nonalcoholic steatohepatitis (NASH).

3. The method of claim 1, wherein the metabolic disorder is nonalcoholic fatty liver disease (NAFLD).

4. The method of claim 1, wherein the treating comprises or is characterized by reducing one or more of the following: liver fat content, elevated low-density lipoprotein cholesterol-C (LDL-C), total-C, and triglyceride in the human subject.

5. The method of claim 1, wherein the treating comprises or is characterized by increasing high-density lipoprotein cholesterol-C (HDL-C) levels in the human subject.

6. The method of claim 1, wherein the treating comprises or is characterized by reducing triglyceride levels in the human subject by at least about 40% or at least about 50%.

7. The method of claim 1, wherein the treating comprises or is characterized by reducing cardiovascular risk in the human subject.

8. The method of claim 1, wherein the human subject is 18 to 55 years of age.

9. The method of claim 1, wherein the human subject has a body mass index (BMI) within the range of 30 to 45 kg/m$^2$, inclusive, with ethnic adjustment ≥27.5 for a subject of Asian descent or Asian ancestry.

10. The method of claim 1, wherein the human subject has triglyceride levels in the range of 150-500 mg/dL (1.69-5.65 mmol/L) when measured prior to administration of the human FGF21 protein variant Fc fusion protein.

11. The method of claim 1, wherein the pharmaceutical composition is provided in combination with one or more additional therapeutically active agents.

12. The method of claim 11, wherein the one or more additional therapeutically active agents is selected from compounds for treating obesity, diuretics, beta-blockers, alpha-blockers, angiotensin converting enzyme (ACE) inhibitors, Angiotensin II Receptor Blockers (ARBs), direct renin inhibitors, calcium channel blockers, central agonists, peripheral adrenergic blockers, vasodilators, insulin, alpha-glucosidase inhibitors, biguanides, dopamine agonist, dipeptidyl peptidase-4 (DPP-4) inhibitors, glucagon-like peptides, meglitinides, sodium glucose transporter (SGLT) inhibitors, sulfonylureas, thiazolidinediones, amylinomimetics, statins, fibrates, aspirin, anticoagulants, or combination thereof.

13. The method of claim 12, wherein the sodium glucose transporter (SGLT) inhibitor is selected from dapagliflozin, empagliflozin, canagliflozin, ertugliflozin, sotagliflozin, tofogliflozin, remogliflozin, luseogliflozin, ipragliflozin, atigliflozin, bexagliflozin, henagliflozin, licogliflozin, or a pharmaceutically acceptable salt thereof, or combination thereof.

* * * * *